US008880631B2

(12) United States Patent
Logan et al.

(10) Patent No.: US 8,880,631 B2
(45) Date of Patent: Nov. 4, 2014

(54) APPARATUS AND METHODS FOR MULTI-MODE ASYNCHRONOUS COMMUNICATION

(71) Applicant: Contact Solutions LLC, Reston, VA (US)

(72) Inventors: Paul Logan, Arlington, VA (US); Mike Hibbard, Clear Brook, VA (US); Joshua Gray, Reston, VA (US); Vete Clements, Herndon, VA (US)

(73) Assignee: Contact Solutions LLC, Reston, VA (US)

( * ) Notice: Subject to any disclaimer, the term of this patent is extended or adjusted under 35 U.S.C. 154(b) by 0 days.

(21) Appl. No.: 14/248,843

(22) Filed: Apr. 9, 2014

(65) Prior Publication Data

US 2014/0237061 A1    Aug. 21, 2014

Related U.S. Application Data

(63) Continuation of application No. 13/795,868, filed on Mar. 12, 2013.

(60) Provisional application No. 61/636,923, filed on Apr. 23, 2012.

(51) Int. Cl.
*G06F 15/16* (2006.01)
*G06F 15/173* (2006.01)
*H04L 29/06* (2006.01)
*H04L 29/08* (2006.01)
*H04M 3/51* (2006.01)

(52) U.S. Cl.
CPC .............. *H04L 63/08* (2013.01); *H04L 67/02* (2013.01); *H04M 3/5191* (2013.01)
USPC ........................... 709/206; 709/224; 709/239

(58) Field of Classification Search
USPC ......... 709/203, 206, 217, 218, 219, 223, 224, 709/239; 705/75
See application file for complete search history.

(56) References Cited

U.S. PATENT DOCUMENTS 4,797,925 A    1/1989   Lin
5,493,608 A    2/1996   O'Sullivan
(Continued)

FOREIGN PATENT DOCUMENTS

WO     WO 2013/163169      10/2013

OTHER PUBLICATIONS

Bruce Balentine, "It's Better to Be a Good Machine Than a Bad Person: Speech Recognition and Other exotic User Interfaces at the Twilight of the Jetsonian Age," ICMI Press, Feb. 1, 2007.

(Continued)

*Primary Examiner* — Quang N Nguyen
(74) *Attorney, Agent, or Firm* — Cooley LLP

(57) ABSTRACT

A method includes receiving at a host device a first communication associated with a transaction from at least one electronic device included in a set of electronic devices. The host device includes at least a memory, a processor, and a database. The first communication received at a first time and via a first communication mode. The method includes sending a response to the first communication at a second time after the first time and independent of the first time. The host devices receives a second communication associated with the transaction from the at least one electronic device at a third time. The first communication, the response to the first communication, and the second communication are displayable in a persistent record of the transaction regardless of a difference between the first time and the third time.

15 Claims, 65 Drawing Sheets

(56) References Cited

U.S. PATENT DOCUMENTS

| | | | |
|---|---|---|---|
| 5,562,453 | A | 10/1996 | Wen |
| 5,600,776 | A | 2/1997 | Johnson et al. |
| 5,615,257 | A | 3/1997 | Pezzullo et al. |
| 5,870,709 | A | 2/1999 | Bernstein |
| 5,874,962 | A | 2/1999 | De Judicibus et al. |
| 6,035,018 | A | 3/2000 | Kaufman |
| 6,069,939 | A | 5/2000 | Fung et al. |
| 6,146,147 | A | 11/2000 | Wasowicz |
| 6,226,364 | B1 | 5/2001 | O'Neil |
| 6,401,075 | B1 | 6/2002 | Mason et al. |
| 6,459,776 | B1 | 10/2002 | Aktas et al. |
| 6,462,759 | B1 | 10/2002 | Kurtzberg et al. |
| 6,487,277 | B2 | 11/2002 | Beyda et al. |
| 6,496,692 | B1 | 12/2002 | Shanahan |
| 6,856,333 | B2 | 2/2005 | Ullmann et al. |
| 6,981,242 | B2 | 12/2005 | Lehmeier et al. |
| 6,985,865 | B1 | 1/2006 | Packingham et al. |
| 7,024,366 | B1 | 4/2006 | Deyoe et al. |
| 7,039,168 | B1 | 5/2006 | Potts |
| 7,146,419 | B1 * | 12/2006 | O'Rourke et al. ............ 709/224 |
| 7,194,409 | B2 | 3/2007 | Balentine et al. |
| 7,221,933 | B2 | 5/2007 | Sauer et al. |
| 7,385,997 | B2 | 6/2008 | Gorti et al. |
| 7,447,662 | B2 * | 11/2008 | Gibson ........................... 705/75 |
| 7,457,395 | B2 | 11/2008 | Creamer et al. |
| 7,498,860 | B2 | 3/2009 | Bhattacharya et al. |
| 7,515,695 | B1 | 4/2009 | Chan et al. |
| 7,519,049 | B2 | 4/2009 | Masuda |
| 7,525,970 | B2 | 4/2009 | Mangin et al. |
| 7,573,986 | B2 | 8/2009 | Balentine et al. |
| 7,620,894 | B1 | 11/2009 | Kahn |
| 7,653,543 | B1 | 1/2010 | Blair et al. |
| 7,729,915 | B2 | 6/2010 | Balentine et al. |
| 7,787,543 | B2 | 8/2010 | Yamaguchi |
| 7,801,284 | B1 | 9/2010 | Chakra et al. |
| 7,808,918 | B2 | 10/2010 | Bugenhagen |
| 7,809,569 | B2 | 10/2010 | Attwater et al. |
| 7,817,784 | B2 | 10/2010 | Wang et al. |
| 7,836,409 | B2 | 11/2010 | Denoue et al. |
| 7,865,841 | B2 | 1/2011 | Morikawa |
| 7,903,792 | B2 | 3/2011 | Balentine et al. |
| 7,904,387 | B2 | 3/2011 | Geering |
| 7,920,682 | B2 | 4/2011 | Byrne et al. |
| 7,970,615 | B2 | 6/2011 | Attwater et al. |
| 8,000,689 | B2 | 8/2011 | Featherstone et al. |
| 8,027,255 | B2 | 9/2011 | Kahn et al. |
| 8,046,420 | B2 | 10/2011 | Pan |
| 8,068,609 | B2 | 11/2011 | Puranik et al. |
| 8,090,867 | B2 | 1/2012 | Katis et al. |
| 8,094,788 | B1 | 1/2012 | Eberle et al. |
| 8,096,657 | B2 | 1/2012 | Pompilio et al. |
| 8,107,999 | B2 | 1/2012 | Pandruvada |
| 8,131,553 | B2 | 3/2012 | Attwater et al. |
| 8,155,948 | B2 | 4/2012 | Ruano et al. |
| 8,213,579 | B2 | 7/2012 | Balentine et al. |
| 8,223,945 | B2 | 7/2012 | Drovdahl et al. |
| 8,254,552 | B2 | 8/2012 | Harton et al. |
| 8,495,244 | B2 * | 7/2013 | Bonar et al. .................. 709/239 |
| 2002/0080938 | A1 | 6/2002 | Alexander, III et al. |
| 2002/0090062 | A1 | 7/2002 | Mohamed Alhadad et al. |
| 2002/0116466 | A1 | 8/2002 | Trevithick et al. |
| 2002/0124258 | A1 | 9/2002 | Fritsch |
| 2003/0064716 | A1 | 4/2003 | Gailey et al. |
| 2003/0191639 | A1 | 10/2003 | Mazza |
| 2004/0045036 | A1 | 3/2004 | Terasaki |
| 2004/0258223 | A1 | 12/2004 | Rahamim |
| 2005/0047556 | A1 | 3/2005 | Somerville et al. |
| 2005/0058149 | A1 | 3/2005 | Howe |
| 2005/0100022 | A1 | 5/2005 | Ramprashad |
| 2006/0126803 | A1 | 6/2006 | Patel et al. |
| 2006/0271367 | A1 | 11/2006 | Hirabayashi et al. |
| 2007/0036323 | A1 | 2/2007 | Travis |
| 2007/0053346 | A1 | 3/2007 | Bettis et al. |
| 2007/0250318 | A1 | 10/2007 | Waserblat et al. |
| 2008/0004881 | A1 | 1/2008 | Attwater et al. |
| 2008/0123627 | A1 | 5/2008 | Moreman et al. |
| 2009/0327422 | A1 | 12/2009 | Katis et al. |
| 2010/0002692 | A1 | 1/2010 | Bims |
| 2010/0166158 | A1 | 7/2010 | Costello et al. |
| 2010/0310059 | A1 | 12/2010 | Davis et al. |
| 2011/0159854 | A1 | 6/2011 | Kedefors et al. |
| 2011/0164744 | A1 | 7/2011 | Olshansky et al. |
| 2012/0310652 | A1 | 12/2012 | O'Sullivan |
| 2013/0069858 | A1 | 3/2013 | O'Sullivan |
| 2013/0070910 | A1 | 3/2013 | O'Sullivan |
| 2013/0070911 | A1 | 3/2013 | O'Sullivan |
| 2013/0282844 | A1 | 10/2013 | Logan et al. |

OTHER PUBLICATIONS

International Search Report and Written Opinion mailed Jul. 5, 2013 for PCT Application No. PCT/US2013/37779.

Office Action issued in U.S. Appl. No. 11/211,875, mailed on Mar. 5, 2013.

Office Action issued in U.S. Appl. No. 11/211,875, mailed on Sep. 30, 2013, 14 pages.

Office Action issued in U.S. Appl. No. 11/781,255, mailed on Mar. 15, 2013.

Office Action issued in U.S. Appl. No. 11/781,255, mailed on Nov. 8, 2013, 8 pages.

Office Action issued in U.S. Appl. No. 12/171,196, mailed on Mar. 15, 2013.

Office Action issued in U.S. Appl. No. 12/171,196, mailed on Nov. 18, 2013, 9 pages.

Office Action issued in U.S. Appl. No. 12/475,681, mailed on Oct. 23, 2012.

Office Action issued in U.S. Appl. No. 12/475,681, mailed on Feb. 5, 2013.

Office Action issued in U.S. Appl. No. 12/475,681, mailed on Sep. 25, 2013.

Office Action issued in U.S. Appl. No. 12/475,681, mailed on Apr. 15, 2014.

Office Action issued in U.S. Appl. No. 11/781,255, mailed on Aug. 14, 2014.

* cited by examiner

Did you complete your goal?

☆ ☆ ☆ ☆ ☆

Would you reccomend us?

[ Yes ]   [ No ]

○ Good
○ Bad
◉ Neutral

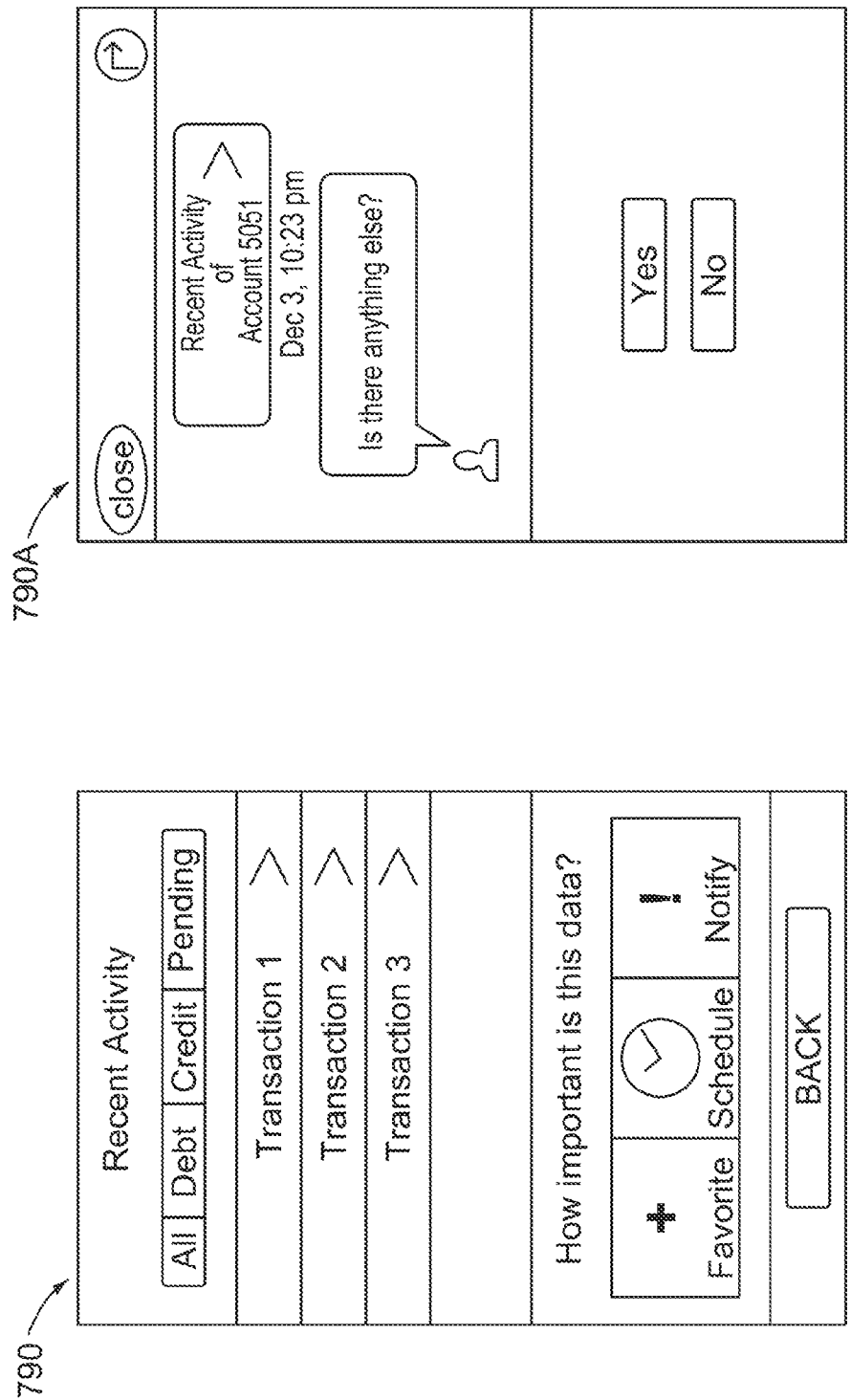

APPARATUS AND METHODS FOR MULTI-MODE ASYNCHRONOUS COMMUNICATION

CROSS-REFERENCE TO RELATED APPLICATIONS

This application is a continuation of U.S. patent application Ser. No. 13/795,868, entitled "Apparatus and Methods for Multi-Mode Asynchronous Communication," filed Mar. 12, 2013, which claims priority to and the benefit of U.S. Provisional Patent Application Ser. No. 61/636,923, entitled "Methods of Multi-Mode Asynchronous Communication," filed on Apr. 23, 2012, each of which is incorporated herein by reference in its entirety.

BACKGROUND

Embodiments described herein relate generally to voice and data communications and more particularly to apparatus and methods for multi-mode asynchronous communications.

In today's society, advances in technology allow individuals to use multiple modes of communication from a home or office and while on the go. Individuals can communicate using voice, text messaging, instant message, email, or the like. Accordingly, infrastructure exists to support these modes of communication; yet, the infrastructure is often designed to support an uninterrupted conversation through a single mode of communication. Thus, it is difficult to have a unified multi-mode communication that spans a series of interactions that might be required to complete a transaction.

In addition, the advances in technology have enabled some individuals to perform multiple tasks simultaneously. As a result, a cultural shift has begun toward a more fast paced, efficient, and user controlled customer self-service. However, many enterprises offer a customer service system that is inadequate, unreliable, synchronous, and/or not sufficiently customer friendly. For example, in some instances an individual may be interrupted while in the progress of interacting with a customer support organization or system (e.g., an interactive voice response (IVR) system) by other obligations, thereby negating the value of at least a portion of the progress made. Furthermore, most customer service systems require a single mode of communication be used to fully complete a specific task.

Thus, a need exists for improved methods of multi-mode asynchronous communication.

SUMMARY

Apparatus and methods for multi-mode asynchronous communication are described herein. In some embodiments, a method includes receiving at a host device a first communication associated with a transaction from at least one electronic device included in a set of electronic devices. The host device includes at least a memory, a processor, and a database. The first communication is received at a first time and via a first communication mode. The method includes sending a response to the first communication at a second time after the first time and independent of the first time. The host device receives a second communication associated with the transaction from the at least one electronic device at a third time. The first communication, the response to the first communication, and the second communication are displayable in a persistent record of the transaction regardless of a difference between the first time and the third time.

BRIEF DESCRIPTION OF THE DRAWINGS

FIGS. 24-63 are various screen shots and illustration of a display of an electronic device demonstrating the flow diagram of FIGS. 10-23, according to an embodiment.

FIGS. 69-75 are screen shots of a host device exemplifying a process of providing a customer service, according to an embodiment.

DETAILED DESCRIPTION

Figure 1:
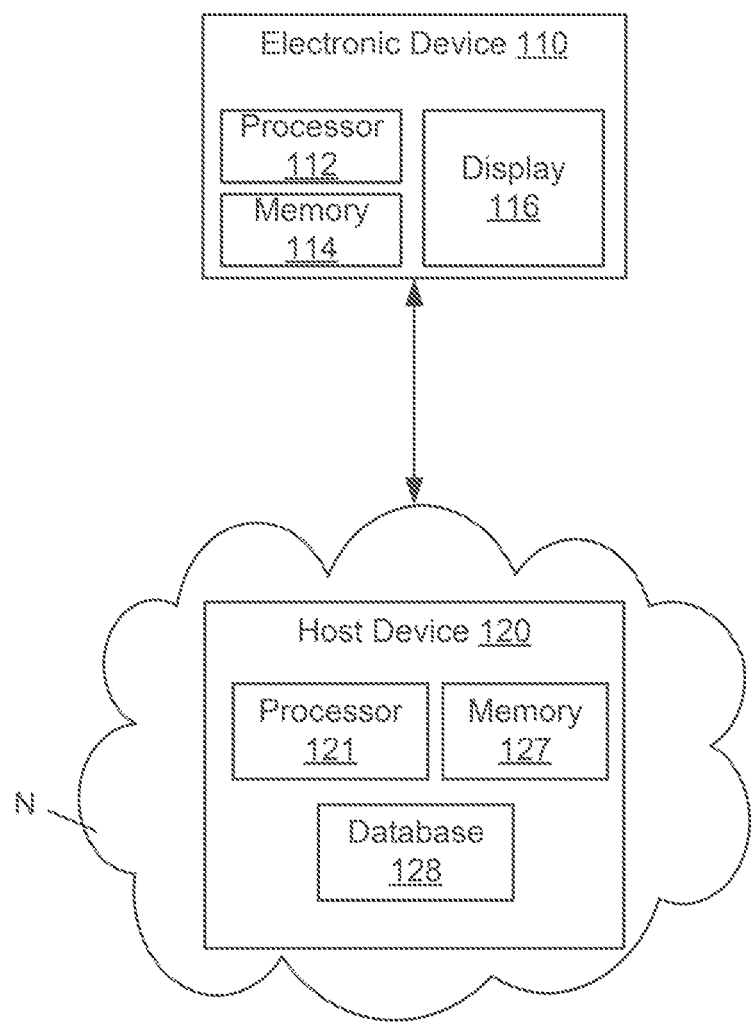
FIG. 1 is a schematic illustration of an electronic device in communication with a host device via a network, according to an embodiment.

In some embodiments, a method includes receiving at a host device a first communication associated with a transaction from at least one electronic device included in a set of electronic devices. The host device includes at least a memory, a processor, and a database. The first communication is received at a first time and via a first communication mode. The method includes sending a response to the first communication at a second time after the first time and independent of the first time. The host device receives a second communication associated with the transaction from the at least one electronic device at a third time. The first communication and the second communication are displayable in a persistent record of the transaction regardless of a difference between the first time and the third time.

In some embodiments, a method includes sending from an electronic device a first communication associated with a customer service transaction at a first time. The electronic device receives a response to the first communication at a second time. The method includes sending from the electronic device a second communication associated with the transaction at a third time. The first communication, the response, and the second communication are displayable on the electronic device in a persistent record of the transaction regardless of a difference between the first time and the third time.

In some embodiments, a non-transitory processor-readable storage medium includes code to cause a processor of a host device to receive a first communication associated with a transaction from at least one electronic device included in a set of electronic devices. The host device includes at least the non-transitory processor-readable storage medium, the processor, and a database. The first communication being received at a first time via a first communication mode. The code including code to cause the processor to send a response the first communication at a second time after the first time and independent of the first time. The code includes code to cause the processor to receive a second communication associated with the transaction from the at least one electronic device at a third time. The first communication and the second communication being displayable in a persistent record of the transaction regardless of a difference between the first time and the third time.

As used in this specification, the term "communication mode" generally refers to a method of communication between a first electronic device and a second electronic device. For example, a communication mode can be one of email, text messages (e.g., short message service (SMS) messages), instant messages, optical pattern transmissions (e.g., a high capacity color barcode, a QR code, a two-dimensional barcode, a one-dimensional barcode, a black light pattern, etc.), RF pattern transmissions, a mobile device application, a website, a personal computer (PC) application, an interactive advertisement (e.g., a Flash advertisement on a website), an interactive television (ITV) application (e.g., user uses their TV remote to select and/or enter process ID), TCP/IP transmissions, interactive voice response (e.g., via touch tones and/or voice recognition), and/or the like. Furthermore, the presented examples of communication modes are not an exhaustive list of suitable communication modes. Thus, the embodiments described herein are not limited to the use of the aforementioned communication modes and can use any suitable communication mode.

As used in this specification, the term "asynchronous" generally refers to events occurring at different time periods. In addition, asynchronous communication, as described herein, relates to sending, receiving, and/or accessing a first set of data at a first time period and sending, receiving, and/or accessing subsequent sets of data at later time periods, independent of the previous time periods.

As used herein, the term "customer service" generally refers to a good or service provided to a customer. For example, customer service can refer to processing reservations, shopping (e.g., online grocery shopping, retail shopping, etc.), and/or the like. Furthermore, customer service can refer to a support function (e.g., technical support, sales support, and/or the like). As used herein, customer service systems can employ live persons, interactive voice recognition, online interface (e.g., webpage), and/or the like.

As used in this specification, the singular forms "a," "an" and "the" include plural referents unless the context clearly dictates otherwise. Thus, for example, the term "module" is intended to mean a single module or a combination of modules.

FIG. 1 is a schematic illustration of an electronic device 110 in communication with a host device 120 via a network N, according to an embodiment. The electronic device 110 can be, for example, a personal computer (PC), a personal digital assistant (PDA), a smart phone, a video game console and/or the like. The host device 120 can be any suitable host device (e.g., a web server, a network management device, and/or the like). The network N can be any type of network (e.g., a public switched network (PSTN), a local area network (LAN), a wide area network (WAN), a virtual network, a cellular network, and/or the internet) implemented as a wired network and/or a wireless network. As described in further detail herein, in some embodiments, the electronic device 110 can be a personal computer connected to the host device 120 via an Internet Service Provider (ISP) and the Internet (e.g., network N).

In some embodiments, the electronic device 110 (also referred to herein as "client device") can communicate with the host device 120 and the network N via intermediate networks and/or alternate networks. Such intermediate networks and/or alternate networks can be of a same type and/or a different type of network as the network N. As such, in some embodiments, the electronic device 110 can send data to and/or receive data from the host device 120 using multiple communication modes (defined above) that may or may not be transmitted to the host device 120 using a common network. For example, the electronic device 110 can be a mobile telephone (e.g., smart phone) connected to the host device 120 via a cellular network and the Internet (e.g., network N).

The electronic device 110 includes at least a processor 112, a memory 114, and a display 116. The memory 114 can be, for example, a random access memory (RAM), a memory buffer, a hard drive, a read-only memory (ROM), an erasable programmable read-only memory (EPROM), and/or so forth. In some embodiments, the memory 114 of the electronic device 110 stores instructions to cause the processor 112 to execute modules, processes, and/or functions associated with using a personal computer application, mobile application, an internet web browser, and/or the like. Furthermore, the memory 114 stores instructions to cause the processor 112 to send signal information to the display 116.

The processor 112 of the client device 110 can be any suitable processing device configured to run and/or execute a set of instructions or code. For example, the processor can be a general purpose processor, a central processing unit (CPU), an accelerated processing unit (APU), and/or the like. The processor 112 can be configured to run and/or execute a set of instructions or code stored in the memory 114 associated with using a personal computer application, a mobile application, an internet web browser, telephonic or cellular communication, and/or the like. More specifically, in some instances, the processor 112 can execute a set of instructions or code stored in the memory 114 associated with an asynchronous communication with, for example, the host device 120.

The display 116 (FIG. 1) of the client device 110 can be any suitable display configured to provide a user interface to the client device 110. For example, the display 116 can be a cathode ray tube (CRT) monitor, a liquid crystal display (LCD) monitor, a light emitting diode (LED) monitor, and/or the like. The display 116 can be configured to provide the user interface for a personal computer application, mobile application, internet web browser, and/or the like. In such embodiments, the display 116 can be configured to graphically represent any suitable portion of a customer service system and/or process (e.g., a webpage, contact information, an instant message interface, an email interface, and/or the like). In some embodiments, the display 116 can be and/or include a touch screen.

While not shown in FIG. 1, in some embodiments, the electronic device 110 can include one or more network interface devices (e.g., a network interface card) configured to connect the electronic device 110 to the network N. For example, the network interface device can include a Wifi and/or cellular transceiver.

The host device 120 can be any type of device configured to send data over the network N to and/or receive data from one or more client device 110. In some embodiments, the host device 120 can be configured to function as, for example, a server device (e.g., a web server device), a network management device, and/or so forth. The host device 120 includes at least a processor 121, a memory 127, and a database 128. The memory 127 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 127 of the host device 120 includes a set of instructions used to perform a user-defined task. In such instances, for example, the host device 120 is configured to communicate with multiple electronic devices using one or more suitable communication modes. In some instances, the memory 127 stores instructions to cause the processor 121 to execute modules, processes and/or functions associated with a customer service.

The processor 121 of the host device 120 can be any suitable processor such as, for example, a general purpose processor, a CPU, an APU, a network processor, a front end processor, and/or the like. Thus, the processor 121 can perform a set of instructions stored in the memory 127. For example, the processor 121 can be configured to update the database 128 with user-information received from an electronic device (e.g., the electronic device 110) via one or more communication modes, as further described herein.

The database 128 of the host device 120 can be any suitable database such as, for example, a relational database, an object database, an object-relational database, a hierarchical database, a network database, an entity-relationship database, and/or the like. In some embodiments, the database 128 can be stored in, for example, the memory 127. While shown in FIG. 1 as being included in the host device 120, in other embodiments the database 128 can be operably coupled to the host device 120. For example, the host device 120 can be in communication with the database 128 over any suitable network (e.g., the network N). In such embodiments, the database 128 can be included in or stored by a network attached storage device (NAS). In such embodiments, the NAS and/or the database 128 can communicate with the host device 120 over any suitable network can be any suitable network (e.g., network N).

The database 128 can store and/or maintain data associated with user information (e.g., user-preferences, user-communications, user-status, user-requests, and/or the like). More specifically, and as described in further detail herein, the database 128 stores and/or maintains a relationship between a user identifier and various methods of identifying that user. For example, the database 128 can store a relationship between a user identifier and that user's email address, telephone number, login name, instant message identifier, a communication device identifier (e.g., a mobile phone identifier, an internet protocol (IP) address, a media access control (MAC) address, etc.), and/or the like. Accordingly, if the host device 120 receives a text message and/or a voice message from a telephone number, the host device 120 can query and/or search the database 128, using the telephone number, for the user identifier with which that telephone number is associated. Similarly, if the host device 120 receives an email message from an email address or instant text message from a user having a text message identifier, the host device 120 can query and/or search the database 128, using the email address or the text message identifier, respectively, for the user identifier with which that email address or text message identifier is associated. Thus, the host device 120 can correlate information and/or data received from a user via multiple communication modes with a single user account associated with that user.

In addition, the database 128 can store an identifier (e.g., a status identifier) associated with any step in a customer service process. For example, in some instances, the host device 120 can be in communication with the electronic device 110 to provide a user a customer service associated with booking an airline flight. In such instances, the host device 120 can store, in the database 128, an identifier associated with the completion of a process step (e.g., login, flight request, travel dates, flight confirmation, and/or the like). Thus, if the customer service process is interrupted at a process step (e.g., the user ends the communication between the electronic device 110 and the host device 120), the host device 120 can be configured to resume the customer service at the process step when the host device 120 is again placed in communication with the electronic device 110. Similarly stated, the database 128 can store any suitable user information such that the host device 120 can provide an asynchronous customer service, as further described herein.

Figure 2:
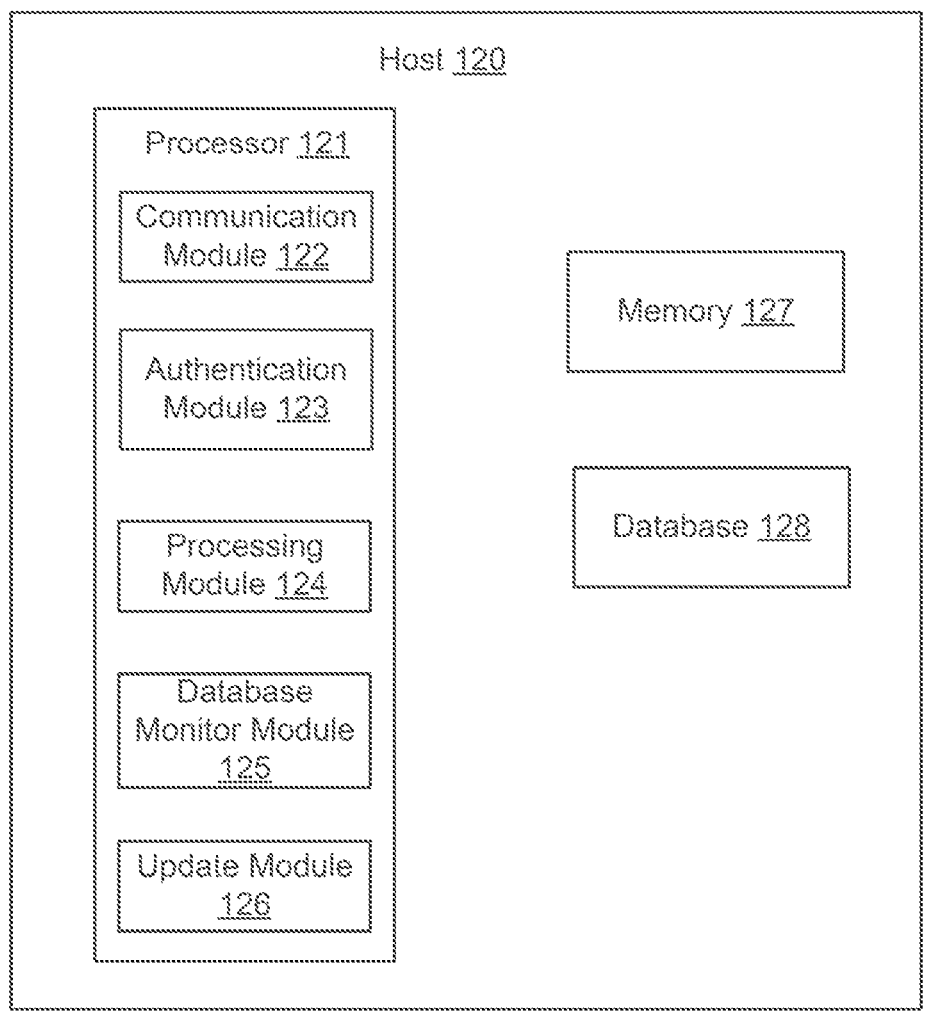
FIG. 2 is a schematic illustration of the host device illustrated in FIG. 1.

As described above, the processor 121 of the host device 120 can be configured to execute specific modules. The modules can be, for example, hardware modules, software modules stored in the memory 127 (FIG. 1) and executed in the processor 121, and/or any combination thereof. For example, as shown in FIG. 2, the processor 121 includes and/or executes a communication module 122, an authentication module 123, a processing module 124, a database monitor module 125, and an update module 126. The communication module 122 includes a set of instructions executed by the processor 121 associated with communicating with a network N and more specifically the electronic device 110 (FIG. 1). As described above, the network N can be any network such as, for example, a public switched network (PSTN), a local area network (LAN), a wide area network (WAN), a virtual network, a cellular network, and/or the internet.

The authentication module 123 can be configured to query a database (e.g., the database 128) for a user identifier and/or account number. In some embodiments, the authentication module 123 can query the database 128 using a telephone number, an email address, an instant message identifier, a social network account username and/or password, a private third party authentication identifier (e.g., user logs in with the third party), and/or any other communication identifier (e.g., a mobile phone identifier, a MAC address, etc.). For example, if the communication module 122 receives a SMS message from a mobile device, the authentication module 123 can query the database 128 to determine with which user and/or account that telephone number is associated. Similarly, if the communication module 122 receives an email from an email address or an instant message from an instant messaging account having an instant message username, the authentication module 123 can query the database 128 to determine with which user and/or account the email address or instant message username is associated. In some instances, the communication module 122 can receive a communication identifier and password combination. In such instances, the authentication module 123 can query the database to determine if the password is associated with the communication identifier, thereby authenticating the presence of an authorized user associated with an electronic device.

The processing module 124 includes a set of instructions executed by the processor 121 associated with processing a customer service request. For example, the processing module 124 can include instructions associated with a speech recognition engine. In such embodiments, the processing module 124 can receive a spoken request from a user of the electronic device 110 (e.g., a telephone) and can include instructions to cause the processor 121 to interpret the request and perform an action based on the interpretation of the request. In other embodiments, the processing module 124 can receive any suitable service request via any suitable communication mode and include instructions to cause the processor 121 to interpret the request and perform one or more actions based on the request.

The database monitor module 125 includes a set of instructions executed by the processor 121 associated with monitoring the database 128. For example, the database monitor module 125 can include instructions to cause the processor to query the database 128 to determine if an electronic device (e.g., the electronic device 110) is associated with a user identifier, an account number, and/or an unfinished customer service, as described in further detail herein.

The update module 126 includes a set of instructions executed by the processor 121 associated with updating the database 128. For example, in some instances, a user associated with a communication mode and/or an electronic device can communicate with the host device 120 via a communication mode and/or an electronic device not associated the user. In such instances, the update module 126 can receive a signal associated with an authorization to update the database 128 and, thereby, associate the user with the communication mode and/or the electronic device. In this manner, the host device 120 can associate any suitable number of electronic devices and/or communication modes with a given user. Thus, the host device 120 can be configured to provide a multi-mode asynchronous customer service to a user of any number of electronic devices associated with the user.

Figure 3:
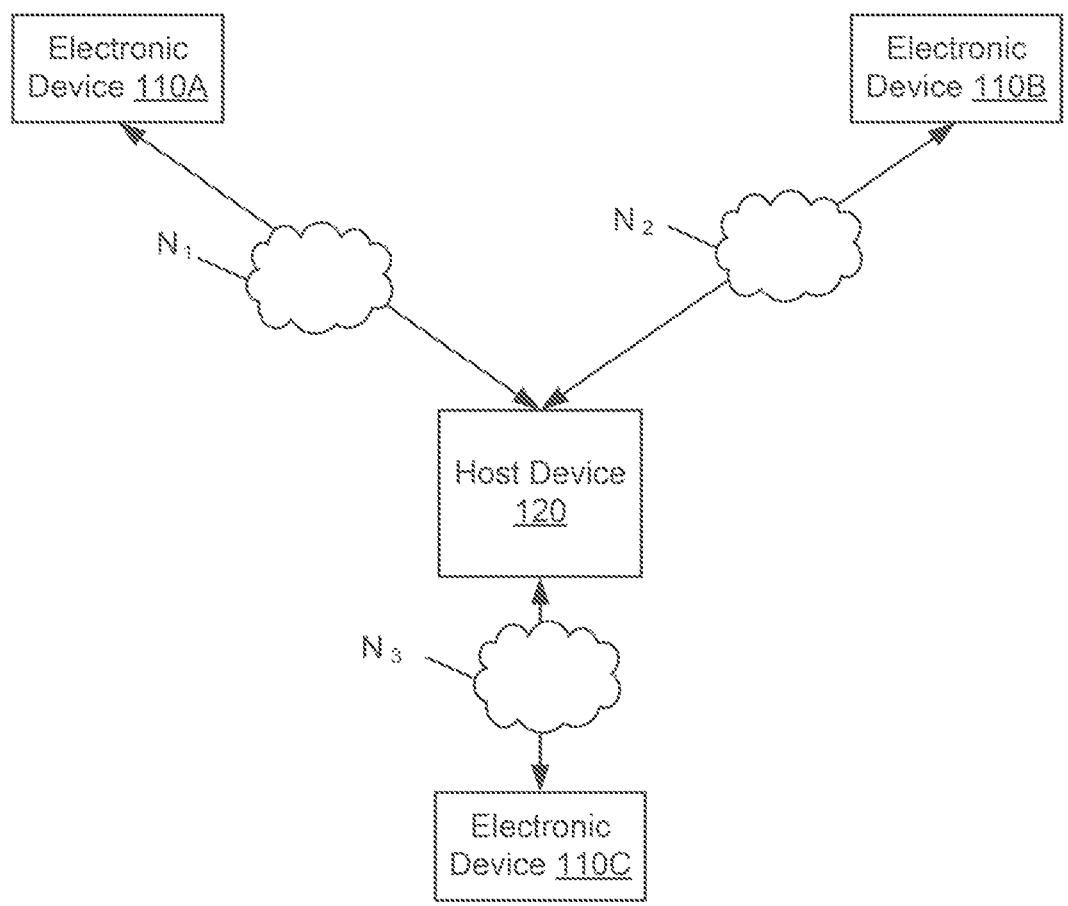
FIG. 3 is a schematic illustration of a multi-mode communication system, according to an embodiment.

As shown in FIG. 3, the host device 120 can be in communication with an electronic device 110A via a first network $N_1$, a electronic device 110B via a second network $N_2$, and an electronic device 110C via a third network $N_3$. In some instances, the electronic devices 110A, 110B, and 110C can be associated with a first user, a second user, and a third user, respectively. In such instances, the host device 120 can communicate with the electronic devices 110A, 110B, and 110C substantially simultaneously. Furthermore, the first network $N_1$, the second network $N_2$, and/or the third network $N_3$ can be similar networks or different networks. For example, in some instances, the electronic devices 110A, 110B, and 110C, can communicate with the host device 120 via a PSTN. In other instances, the electronic devices 110A, 110B, and 110C can communicate with the host device 120 via a first communication mode, a second communication mode, and a third communication mode, respectively, wherein each communication mode is different from the other communication modes.

In some instances, the electronic devices 110A, 110B, and 110C can be associated with a single user. In such instances, the host device 120 can asynchronously communicate with the electronic device 110A, the electronic device 110B, or the electronic device 110C. For example, in some embodiments, a user can manipulate the electronic device 110A (e.g., a home PC) to communicate with the host device via a first network $N_1$ and during a first time period. The first network $N_1$ can be configured to facilitate (e.g., provide infrastructure to support) a first communication mode (e.g., via an ISP and the internet).

The user can discontinue the communication between the electronic device 110A and the host device 120 and manipulate the electronic device 110B (e.g., a mobile device such as a smart phone) to communicate with the host device 120 via a second network $N_2$ and during a second time period, after the first time period. With the electronic device 110B associated with the user, the host device 120 can continue the communication (e.g., a customer service process such as, for example, booking a flight) from the point at which the communication ended with the electronic device 110A. In some instances, the electronic device 110B can communicate with the host device 120 via the first communication mode (e.g., the second network $N_2$ is the same as the first network $N_1$). In other instances, the electronic device 110B can communicate with the host device 120 via a second communication mode (e.g., SMS), different from the first communication mode.

In a Similar manner, the user can discontinue the communication between the electronic device 110B and the host device 120 and manipulate the electronic device 110C (e.g., a work computer) to communicate with the host device 120 via a third network $N_3$ and during a third time period, after the second time period. With the electronic device 110C associated with the user, the host device 120 can continue the communication (e.g., a customer service process such as, for example, booking a flight) from the point at which the communication ended with the electronic device 110B. In some embodiments, the electronic device 110C can communicate with the host device 120 via the first communication mode (e.g., via an ISP and the internet) or the second communication mode (e.g., SMS). In other embodiments, the electronic device 110C can communicate with the host device 120 via a third communication mode (e.g., email), different from the first communication mode and/or the second communication mode. In this manner, the user can asynchronously manipulate the electronic devices 110A, 110B, and 110C, to communicate with the host device 120 using any suitable communication mode to, for example, book an airline flight. Furthermore, as described above, the host device 120 can store an identifier associated with, for example, the process steps of the customer service process. In this manner, the customer service process is a linear process (e.g., the progress made during the first time period is stored and accessed during the second time period and the progress made during the second time is stored and accessed during the third time period).

Figure 4:
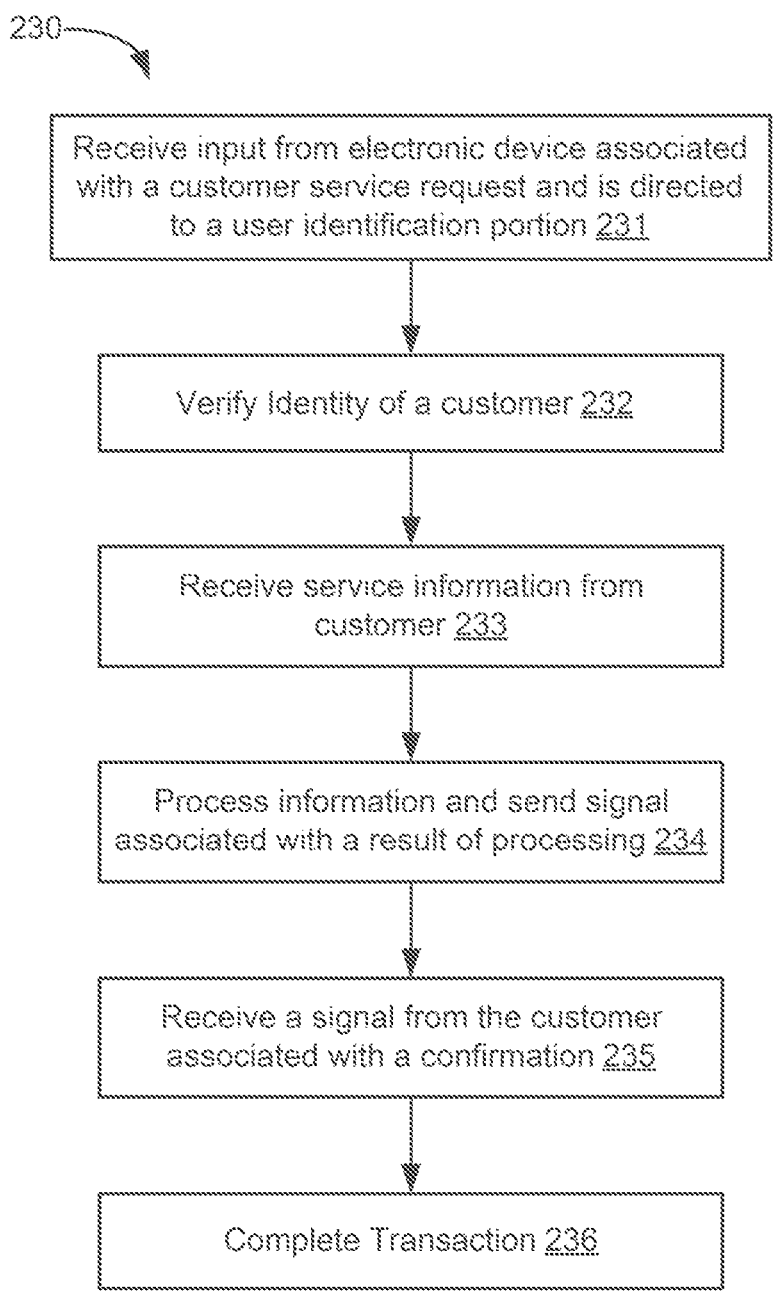
FIG. 4 is a flowchart illustrating a method of communicating with a customer service system.

FIG. 4 is a flowchart illustrating a method 230 of communicating with a customer service system. In some embodiments, the method 230 can be performed and/or executed at a host device similar to the host device 120 shown and described with respect to FIG. 1. Accordingly, in some embodiments, a processor at a host device, similar to the processor 122 shown and described with respect to FIG. 2, can execute instructions that cause the processor to perform the method 230. The method 230 can be performed as part of a customer service system, such as, for example, a customer service system used for booking an airline flight, online shopping, a technical support platform, and/or any other suitable customer service system.

The method 230 includes receiving an input from an electronic device associated with a customer service request and directing the customer to a user identification portion, at 231. More specifically, in some embodiments, a communication module (similar to the communication module 130 shown and described with respect to FIG. 2) can receive the input associated with a customer service request. The method 230 further includes verifying the identity of the customer, at 232. In some embodiments, a authentication module (similar to the authentication module 132 shown and described with respect to FIG. 2) can receive user identification information, such as, for example, a telephone number, an email address, a MAC address, an IP address, and/or the like. In addition the authentication module can receive password information and be configured to query a database (similar to the database 140 shown and described with respect to FIGS. 1 and 2) to determine if the password is associated with the user identification information.

With the user identity verified, the method 230 includes receiving service information from the customer, at 232. More specifically, the customer can engage an electronic device such that the electronic device sends a signal to a host device associated with the customer service information. For example, in some embodiments, the customer service information could be a request for flight information for a specific date, phone numbers for a third party good or service, a technical service question, and/or the like. The method 230 further includes processing the customer service information and sending a signal to an electronic device associated with the result of the processing, at 234. For example, in some embodiments, a processing module (similar to the processing module 136 shown and described above with respect to FIG. 2) can process a customer service request and include instructions such that a signal associated with the result of the processing is sent to the electronic device (e.g., via a communication module over any suitable network and/or communication mode).

With the signal associated with the result of the processing sent to the electronic device, the method 230 includes receiving a signal associated with a customer confirmation of the result, at 235. For example, a host device can send a signal associated with flight information in response to a customer request for the flight information. In this manner, the user (e.g., the customer) can engage an electronic device such that the electronic device sends a signal associated with a flight selection. Therefore, the host device can be configured to process the user-selected flight (e.g., via a processing module or the like) and complete the transaction, at 236. In some embodiments, the process of completing the transaction includes receiving a signal from an electronic device associated with payment information. In other embodiments, payment information and/or preferences are stored in a database and automatically applied. In this manner, a user can engage an electronic device such that the user is provided with a customer service.

Figure 5:
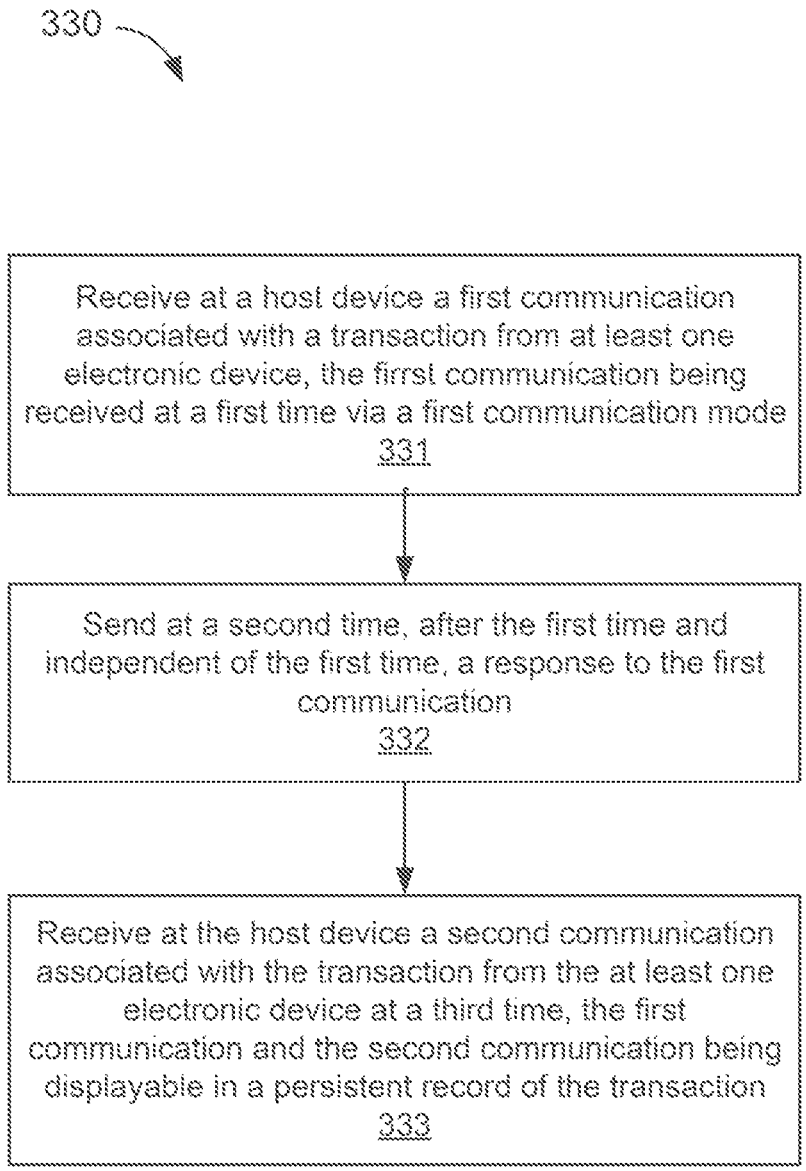
FIG. 5 is a flowchart illustrating a method of communication with a customer service system.

FIG. 5 is a flowchart illustrating a method 330 of communicating with a customer service system. In some embodiments, the method 330 can be performed and/or executed at a host device similar to the host device 120 shown and described with respect to FIGS. 1-3. Accordingly, in some embodiments, a processor at a host device, similar to the processor 121 shown and described with respect to FIG. 2, can execute instructions that cause the processor to perform the method 330. The method 330 can be performed as part of a customer service system, such as, for example, a customer service system used for booking an airline flight, online shopping, a technical support platform, and/or any other suitable customer service system.

The method 330 includes receiving at a device a first communication associated with a transaction from one or more electronic devices at a first time and via a first communication mode, at 331. In some instances, a communication module (similar to the communication module 122 shown and described with respect to FIG. 2) can receive the communication associated with the transaction. The one or more electronic devices can be any suitable device that includes a communication device enabling the electronic device to communicate over a network. For example, the electronic device can be a PC, a smart phone, a tablet PC, a PDA, or any other suitable device.

The transaction can be any of those described herein such as, for example, a customer service transaction, online shopping, technical support, or the like. Accordingly, the first communication can be associated with, for example, a first step in a customer service process. The first communication can also include and/or be associated with identification information such as, for example, email address, telephone number, login name, instant message identifier, a communication device identifier (e.g., a mobile phone identifier, an internet protocol (IP) address, a media access control (MAC) address, etc.), and/or the like. The first communication mode can be any suitable communication mode described herein. For example, the first communication mode can be a voice message, an email, an SMS, an instant message, a telephonic call (e.g., via voice over IP (VoIP), or via PSTN), or the like. The host device can be configured to store, in a memory and/or a database (e.g., the memory 127 and/or the database 128), the first communication. In instances where more than one electronic device is in communication with the host device, the electronic devices can be the same or different.

The host device sends, at a second time after the first time and independent of the first time, a response to the first communication, at 332. For example, the response can be sent to the one or more electronic devices via the first communication mode. Expanding further, in some instances, the host device can send a response to one or more electronic devices via the same communication mode that was associated with the first communication. In some instances, the host device can send the response to the one or more electronic devices via a different communication mode. For example, in some instances, the host device can store (e.g., in memory and/or in a database) a user profile and/or a user preference that is associated with a preferred communication mode. In such instances, the host device can send the response via the preferred communication mode regardless of the first communication mode.

At a third time, the host device receives a second communication associated with the transaction from the one or more electronic devices, at 333. In some instances, the second communication can be sent via the first communication mode. In other instances, the second communication can be sent via a second communication, different from the first communication mode. For example, in some instances, the first communication mode can be an email and the second communication mode can be a SMS. The host device is configured to store and/or display the first communication and the second communication in a persistent record of the transaction regardless of a difference between the first time and the third time. Moreover, the host device can store and/or display the response to the first communication in the persistent record of the transaction.

The second communication can be associated with a second step in the customer service transaction (i.e., the transaction). For example, in some instances, the second communication can be associated with a request. For example, the request can be for information such as a product price, a location, a process tutorial, a request to speak with a customer service agent, or any other suitable request. In such instances, the host device can be configured to send a second response at a fourth time, after the third time, associated with the request. In this manner, the electronic device can send any number of sequential (e.g., one after the other, or in other words, each consecutive communication is at a later time the previous communication) communications to the host device and, in turn, the host device can send a corresponding number of responses. In other instances, the second communication can be associated with a user confirmation. In such instances, the host device can be configured to execute an action based on the receiving of the second communication (e.g., the confirmation). In some instances, the action can be associated with a completion of the transaction.

Figure 6:
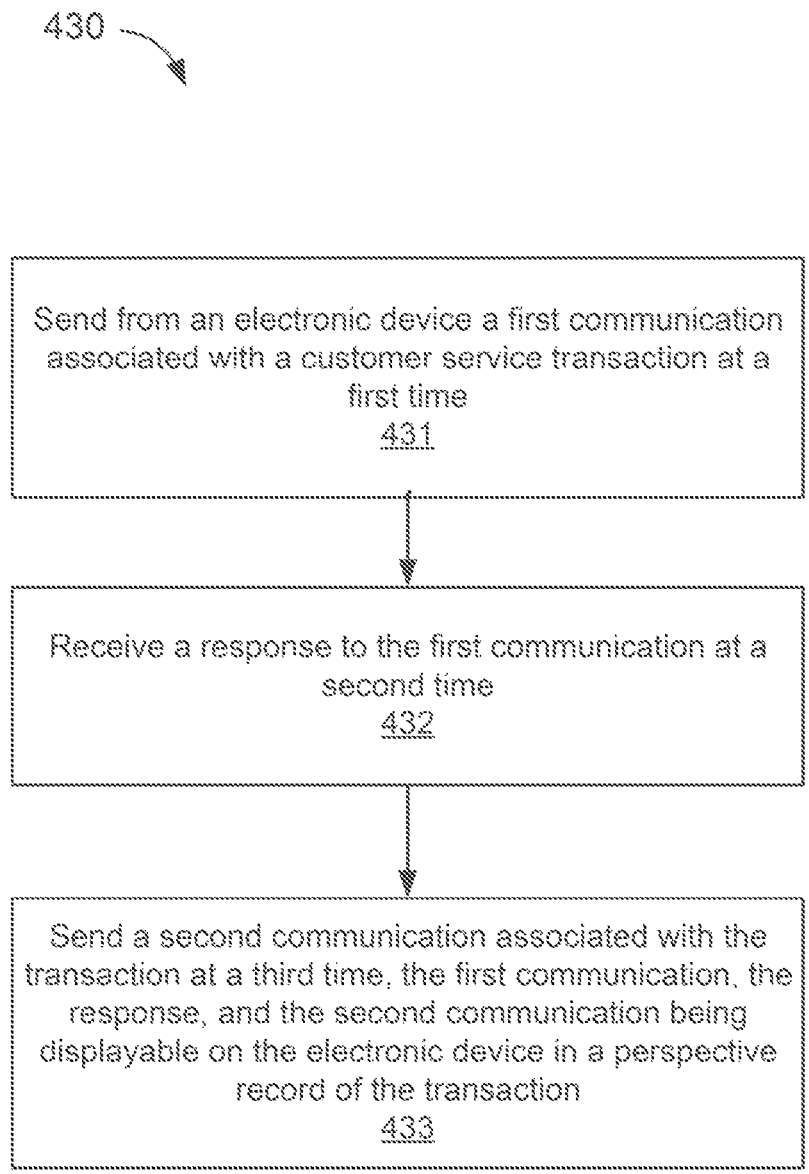
FIG. 6 is a flowchart illustrating a method of communication with a customer service system.

FIG. 6 is a flowchart illustrating a method 430 of communicating with a customer service system. In some embodiments, the method 430 can be performed and/or executed at or on an electronic device similar to the electronic device 110 shown and described with respect to FIGS. 1-3. Accordingly, in some embodiments, a processor at an electronic device, similar to the processor 112 shown and described with respect to FIG. 1, can execute instructions that cause the processor to perform the method 430. The method 430 can be performed as part of a customer service system, such as, for example, a customer service system used for booking an airline flight, online shopping, a technical support platform, and/or any other suitable customer service system.

The method 430 includes sending from an electronic device a first communication associated with a customer service transaction at a first time, at 431. The electronic device can be, for example, a PC, a smart phone, a tablet PC, a PDA, or any other suitable device. The customer service transaction can be associated with any transaction described herein such as, for example, online shopping, technical support, or the like. Accordingly, the first communication can be associated with, for example, a first step in a customer service process. For example, the first communication can be sent from the electronic device in response to a user selecting a given option in a PC application, mobile application, web browser, etc. The first communication can also include and/or be associated with identification information such as, for example, email address, telephone number, login name, instant message identifier, a communication device identifier (e.g., a mobile phone identifier, an internet protocol (IP) address, a media access control (MAC) address, etc.), and/or the like. The first communication can sent via a first communication mode. The first communication mode can be any suitable communication mode described herein. For example, the first communication mode can be a voice message, an email, an SMS, an instant message, a telephonic call (e.g., via voice over IP (VoIP), or via PSTN), or the like. In some instances, a host device can receive the first communication and, upon receipt, can execute an action based on information associated with the first communication. For example, in some embodiments, a host device can include a memory that includes instructions that are executed by a processor. The instruction can be, for example, associated with providing at least a portion of a customer service process.

The electronic device receives a response to the first communication at a second time. The second time can be, for example, after the first time and independent of the first time (e.g., asynchronous). In some instances, the response can be sent to the electronic device via the first communication mode. Expanding further, in some instances, a host device can send a response to the electronic device via the same communication mode that was associated with the first communication. In some instances, the host device can send the response to the electronic device via a different communication mode. For example, in some instances, the host device can store (e.g., in memory and/or in a database) a user profile and/or a user preference that is associated with a preferred communication mode. In such instances, the host device can send the response via the preferred communication mode regardless of the first communication mode.

At a third time, a second communication associated with the transaction is sent and the first communication, the response, and the second communication are displayable on the electronic device in a persistent record of the transaction, regardless of a difference between the first time and the third time, at 433. The second communication can be sent from the electronic device. In some embodiments, the second communication can be sent from a second electronic device. For example, in some embodiments, the first communication can be sent from a home computer and the second communication can be sent from a mobile device (e.g., a smart phone, a tablet, or the like). In some instances, the second communication can be sent via the first communication mode. In other instances, the second communication can be sent via a second communication, different from the first communication mode. For example, in some instances, the first communication mode can be an email and the second communication mode can be a SMS. Moreover, the first communication, the response, and the second communication can be displayable on the first electronic device and on the second electronic device in a persistent record of the transaction regardless of the difference between the first time and the third time.

In some instances, the second communication can be associated with a second in the customer service transaction. For example, in some instances, the second communication can be associated with a request. For example, the request can be for information such as a product price, a location, a process tutorial, a request to speak with a customer service agent, or any other suitable request. In such instances, the electronic device can receive a second response at a fourth time, after the third time, associated with the request. In this manner, the electronic device can send any number of sequential (e.g., one after the other, or in other words, each consecutive communication is at a later time the previous communication) communications and, in turn, can receive a corresponding number of responses. In other instances, the second communication can be associated with a user confirmation. In such instances, a host device can receive the second communication and can execute an action based on the receiving of the second communication (e.g., the confirmation). In some instances, the action can be associated with a completion of the transaction.

Figure 7:
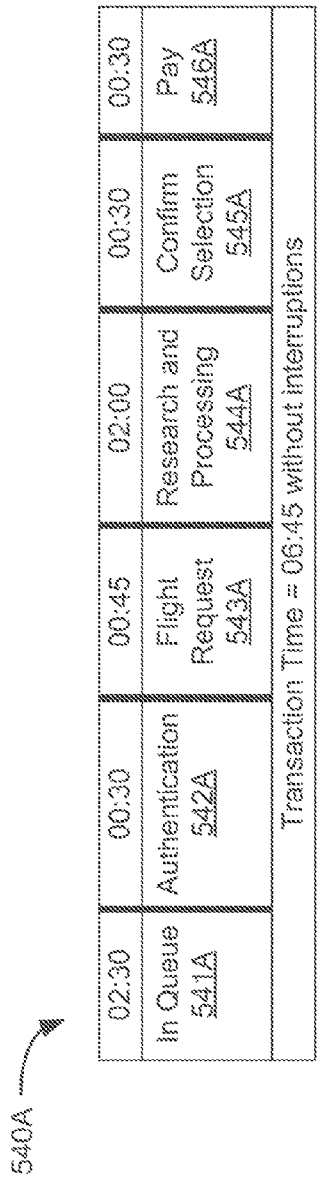
FIG. 7 is a schematic illustration exemplifying a process of communicating with a customer service system, according to an embodiment.
Figure 8:
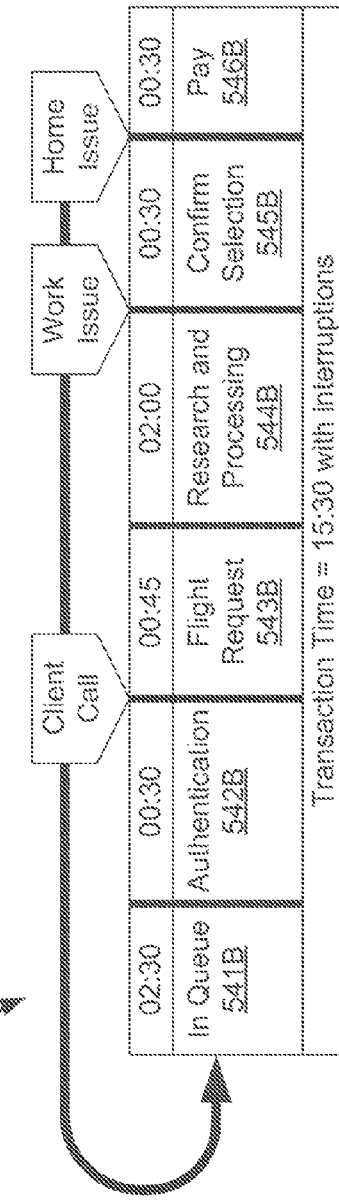
FIG. 8 is a schematic illustration exemplifying a process of communicating with a customer service system, according to an embodiment.

FIGS. 7 and 8 are timeline flowcharts illustrating an example of a known customer service system used for booking an airline flight. More specifically, FIG. 7 illustrates a timeline flowchart 540A of the customer service system used without interruption and FIG. 8 illustrates a timeline flowchart 540B of the customer service system used with interruption. In some embodiments, the customer service system can receive a user service request from a customer (such as described above with respect to the method 230). The customer service system includes placing the user in a queue 541A for two minutes and thirty seconds. Expanding further, the customer service system is configured to process requests based on first in first out methodology (FIFO). Therefore, the user must wait in the queue 541A until the customer service system is available to process the request. With the customer service request processed the user is directed to an authentication process 542A which takes thirty seconds to complete. In some embodiments, the authentication process 542A requires a user-input and/or verification such as, for example, entering a password, birth date, a portion of a social security number, and/or any other suitable identifier.

After the identity of the user is verified, the user can place a flight request 543A taking forty-five seconds. In some embodiments, the user can select specific travel dates, travel times, airlines, and/or the like. In this manner, the customer service system can process the request and send a signal representing the result of the processing of the request. Furthermore, the user can review the results and send a signal to the customer service system associated with a flight selection. As shown in FIG. 7, research and processing 544A of the flight information can take two minutes.

The customer service system can further be configured to receive the signal representing the user-selected flight and confirm the flight reservation 545A taking thirty seconds. With the user-selected flight confirmed the customer service system can be configured to direct the user to a payment process 546A taking thirty seconds. In some embodiments, the payment process includes entering credit card information, PayPal information, frequent flier information, and/or the like. With the payment information received, the customer service process is completed taking a total time of six minutes and forty-five seconds.

As described above, FIG. 8 is a timeline flowchart 540B illustrating the use of the customer service system with interruptions. Upon receiving a customer service request from an electronic device, the customer service system includes placing the user of the electronic device in a queue 541B for two minutes and thirty seconds. Therefore, the user must wait in the queue 541B until the customer service system is available to process the request. With the customer service request processed the user is directed to an authentication process 542B which takes thirty seconds to complete. In some embodiments, the authentication process 542B requires a user-input and/or verification such as, for example, entering a password, birth date, a portion of a social security number, and/or any other suitable identifier.

After the authentication process 542B the user is interrupted by a "Client Call." In this manner, the user ends the communication between the client device and the customer service system. The customer service system is configured such that when the user places the electronic device in communication with the customer service system the customer service process is restarted. Thus, the user must wait in the queue 541B for another two minutes and thirty seconds. Similarly, the user is again directed to the authentication process 542B taking thirty seconds. After the identity of the user is verified, the user can place a flight request 543B taking forty-five seconds. The customer service system can process the request and send a signal representing the result of the processing of the request. Furthermore, the user can review the results and send a signal to the customer service system associated with a flight selection. As shown in FIG. 8, research and processing 544B of the flight information can take two minutes.

As shown in FIG. 8, before the customer service system can confirm the user-selected flight, the user is interrupted with a "Work Issue." In this manner, the user ends the communication between the client device and the customer service system. The customer service system is configured such that when the user again places the electronic device in communication with the customer service system the customer service process is restarted. Thus, the user must wait in the queue 541B for another two minutes and thirty seconds. Similarly, the user is again directed to the authentication process 542B taking thirty seconds. After the identity of the user is verified, the user again placing the flight request 543B taking forty-five seconds. The customer service system processes the request and sends the signal representing the result of the processing of the request. Furthermore, the user can review the results and send the signal to the customer service system associated with the flight selection. As shown in FIG. 8, research and processing 544B of the flight information can take two minutes. The customer service system can further be configured to receive the signal representing the user-selected flight and confirm the flight reservation 545B taking thirty seconds. As shown in FIG. 8, the user can be interrupted (again) with a "House Issue" and therefore, can end the communication between the client device and the customer service system.

When the user again places the electronic device in communication with the customer service system the customer service process is restarted. Thus, the user must wait in the queue 541B for another two minutes and thirty seconds. Similarly, the user is again directed to the authentication process 542B taking thirty seconds. After the identity of the user is verified, the user again places the flight request 543B taking forty-five seconds. The customer service system processes the request and sends the signal representing the result of the processing of the request. Furthermore, the user reviews the results and sends the signal to the customer service system associated with a flight selection. The research and processing 544B of the flight information can take two minutes. The customer service system further receives the signal representing the user-selected flight and confirms the flight reservation 545B taking thirty seconds. With the user-selected flight confirmed the customer service system can be configured to direct the user to a payment process 546B taking thirty seconds. In some embodiments, the payment process includes entering credit card information, PayPal information, frequent flier information, and/or the like. With the payment information received, the customer service process is completed taking a total time of fifteen minutes and thirty seconds including the interruptions. Moreover, as implied by the example illustrated in FIG. 8, the customer service system can be configured to be in communication with multiple electronic device (e.g., a work electronic device such as a work telephone or work computer and a home electronic device such as a home phone, mobile phone, or home computer), yet is not configured for asynchronous communication.

Figure 9:
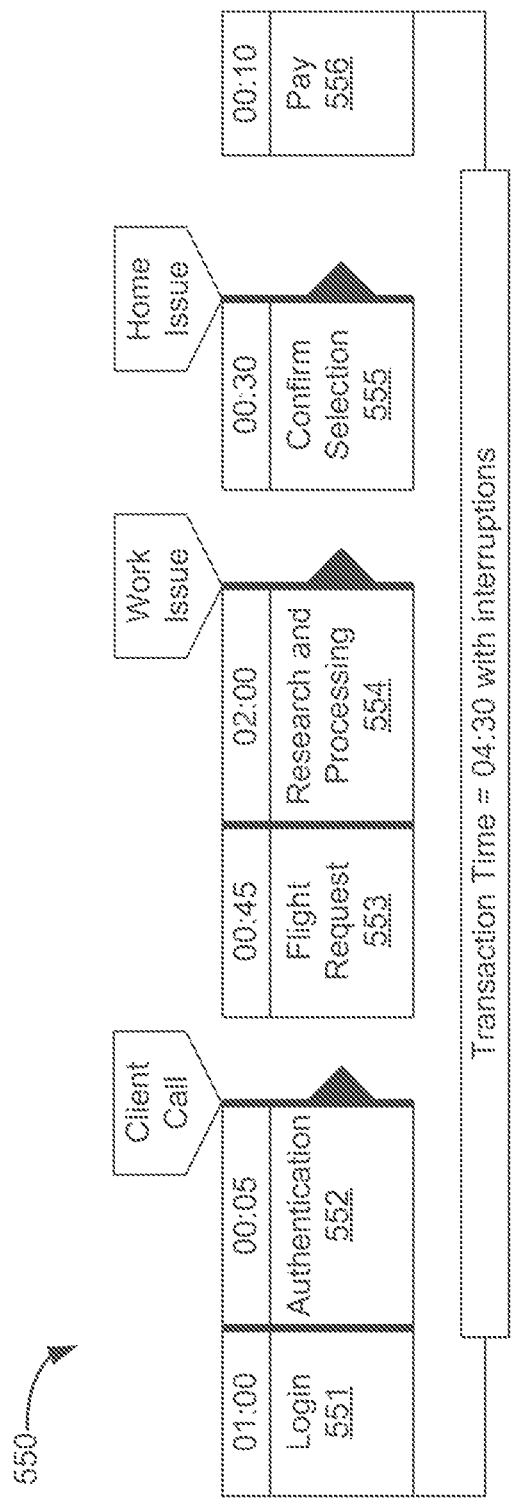
FIG. 9 is a schematic illustration exemplifying a process of communicating with a customer service system, according to an embodiment.

FIG. 9 illustrates a timeline flowchart 550 a customer service system such as, for example, those included in the host device 120 described above with reference to FIGS. 1-3. In some embodiments, the customer service system can be configured to be similar to the customer service system described above with respect to the method 330. Therefore, as shown in FIG. 9, the customer service system can receive a customer service request from an electronic device and can direct the user of the electronic device to a user identification process 551 taking one minute. In some embodiments, the customer service system is configured to receive a signal representing a user identifier and/or a password. In some embodiments, an authentication module (similar to the authentication module 123 shown and described above with respect to FIG. 2) queries a database and verifies the user information. In this manner, an authentication process 552 can take five seconds.

After the authentication process 552 the user is interrupted by a "Client Call." In this manner, the user ends the communication between the client device and the customer service system. With the authentication process 552 completed the customer service system can be configured to store an identifier in a database (e.g., the database 128) such that the progress through the customer service process is saved. Therefore, when the user places the electronic device in communication with the customer service system, the customer service process is started from the saved point. Thus, the user can continue by placing a flight request 553 taking forty-five seconds. The customer service system can process the request and send a signal representing the result of the processing of the request. Furthermore, the user can review the results and send a signal to the customer service system associated with a flight selection. As shown in FIG. 9, research and processing 554 of the flight information can take two minutes.

Before the customer service system can confirm the user-selected flight, the user is interrupted with a "Work Issue." In this manner, the user ends the communication between the client device and the customer service system. With the customer service system receiving the signal associated with the user-selected flight, the customer service system can store the user-selected flight in the database. In this manner, when the user places an electronic device in communication with the customer service system, the customer service process is started from the saved point. Thus, the customer service system can confirm the user-selected flight 555 taking thirty seconds. As shown in FIG. 9, the user can be interrupted (again) with a "Home Issue" and can end the communication between the client device and the customer service system.

Having confirmed the user-selected flight, the customer service system can save the confirmation in the database. Furthermore, when the user places an electronic device in communication with the customer service system, the customer service process is started from the saved point. Thus, with the user-selected flight confirmed the customer service system can direct the user to a payment process 556 taking thirty seconds. In some embodiments, the payment process includes entering associating stored credit card information, PayPal information, frequent flier information, and/or the like with the user identifier (e.g., the identifier used in the authentication process 552). With the payment information received, the customer service process is completed taking a total time of four minutes and thirty seconds including the interruptions.

While not shown in FIG. 9, the customer service system can be configured to communicate with any number of electronic devices associated with a user (e.g., customer). Furthermore, the customer service system can be configured to communicate using any suitable communication mode such as any of those described herein. For example, in some embodiments, the customer can perform the login process 551 and the authentication process 552 using a work PC and perform the remaining processes using a mobile device. As implied by timeline flowchart 550, the customer service system is configured to provide asynchronous customer service, thereby reducing the time required to complete the customer service process. Furthermore, the customer service system can include any suitable automated or guided processes. For example, in some embodiments, the login process 551, the authentication process 552 and the payment process 556 can be automated and/or guided further reducing the time required to complete the customer service process.

FIGS. 10-23 are flow diagrams 660 exemplifying a process of using an electronic device to communicate with a customer service system, according to an embodiment. In some embodiments, the process illustrated by the flow chart 660 can be performed and/or executed at an electronic device similar to the electronic device 110 shown and described with respect to FIGS. 1-3. Accordingly, in some embodiments, a processor at an electronic device, similar to the processor 112 shown and described with respect to FIG. 1, can execute instructions that cause the processor to perform the process illustrated by the flow diagram 660. In some embodiments, the flow diagram 660 illustrates a process with a set of instructions that can be stored in a memory (e.g., the memory 114 of the electronic device 110 shown in FIG. 1). In other words, the flow diagram 660 illustrates a process of using a software application that can include a set of instructions executed by a processor. The application can be, for example, an application (e.g., a PC application, a table application, a smart phone application, etc.) and/or internet based. The process illustrated by the flow diagram 660 can be performed as part of a customer service system, such as, for example, a customer service system used for booking an airline flight, online shopping, a technical support platform, and/or any other suitable customer service system. A discussion of the flow diagram 660 is followed by a discussion of corresponding screen shots and illustrations provided by way of example.

Figure 10:
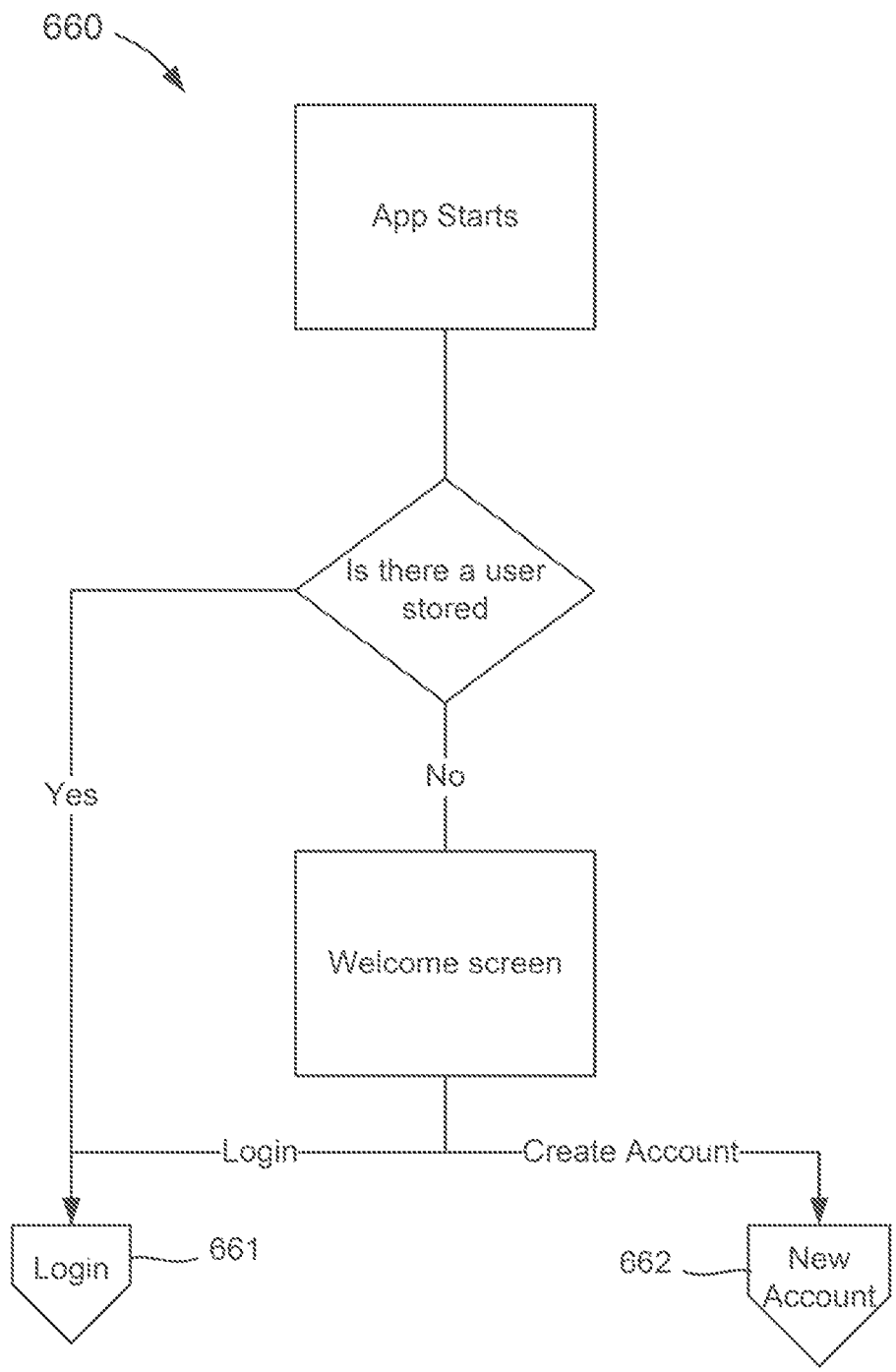
FIGS. 10-23 are flow diagrams exemplifying a process of an electronic device in communication with a customer service system, according to an embodiment.
Figure 11:
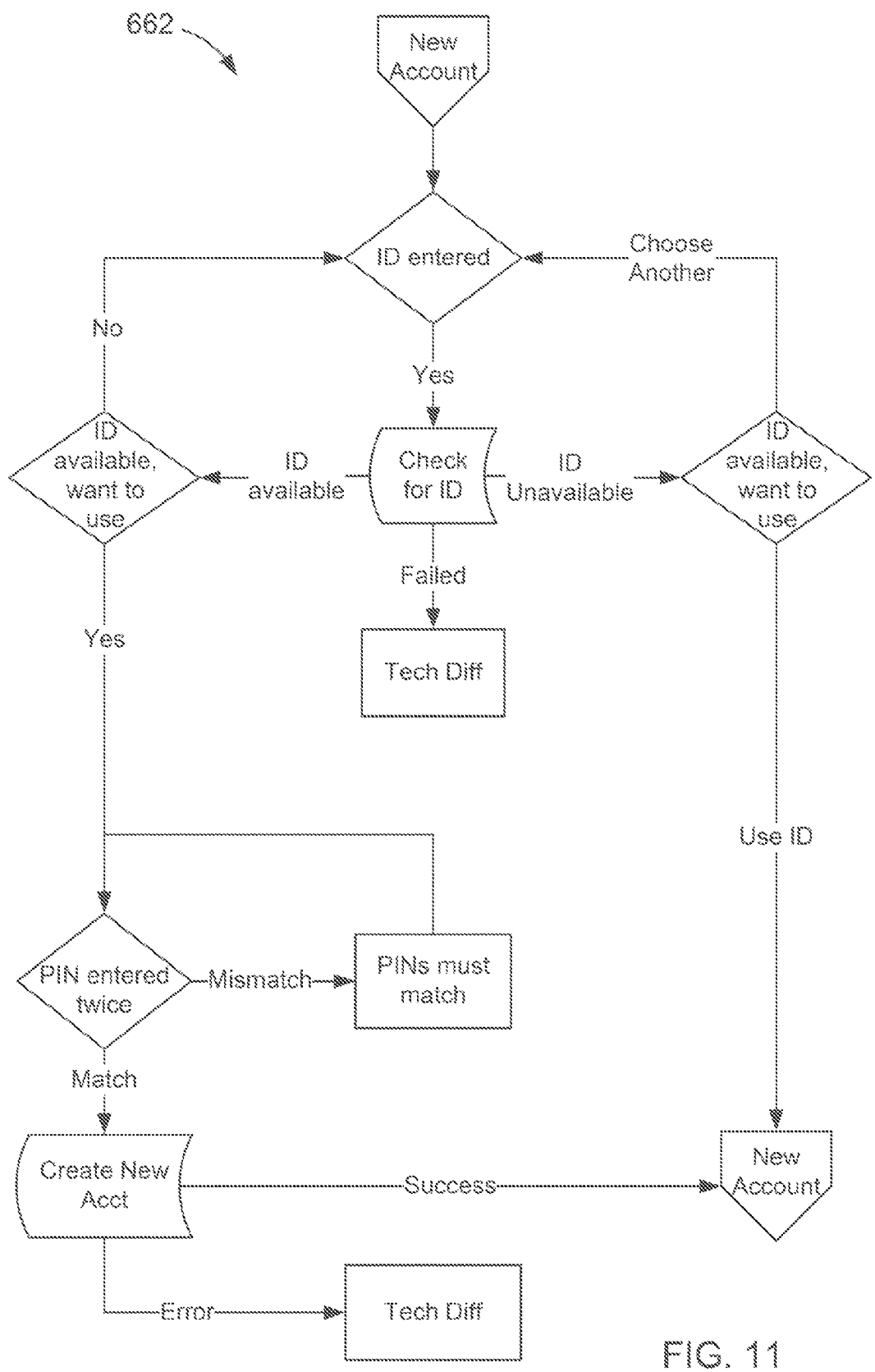

As shown in FIG. 10, the flow diagram 660 starts and checks for a stored user. A welcome screen is displayed the can include a login portion 661 and a new account portion 662. As shown in FIG. 11, a new user can select the new account portion 662 to create a new account. For example, the new user can create a user ID and a personal identification number (PIN). While not shown in FIG. 11, the new user can also input user identifying information such as, for example, full name, address, phone number, email address, or instant message address. In some embodiments, the new user can "link" the new account to, for example, a Facebook® account, a Twitter® account, or the like.

Figure 12:
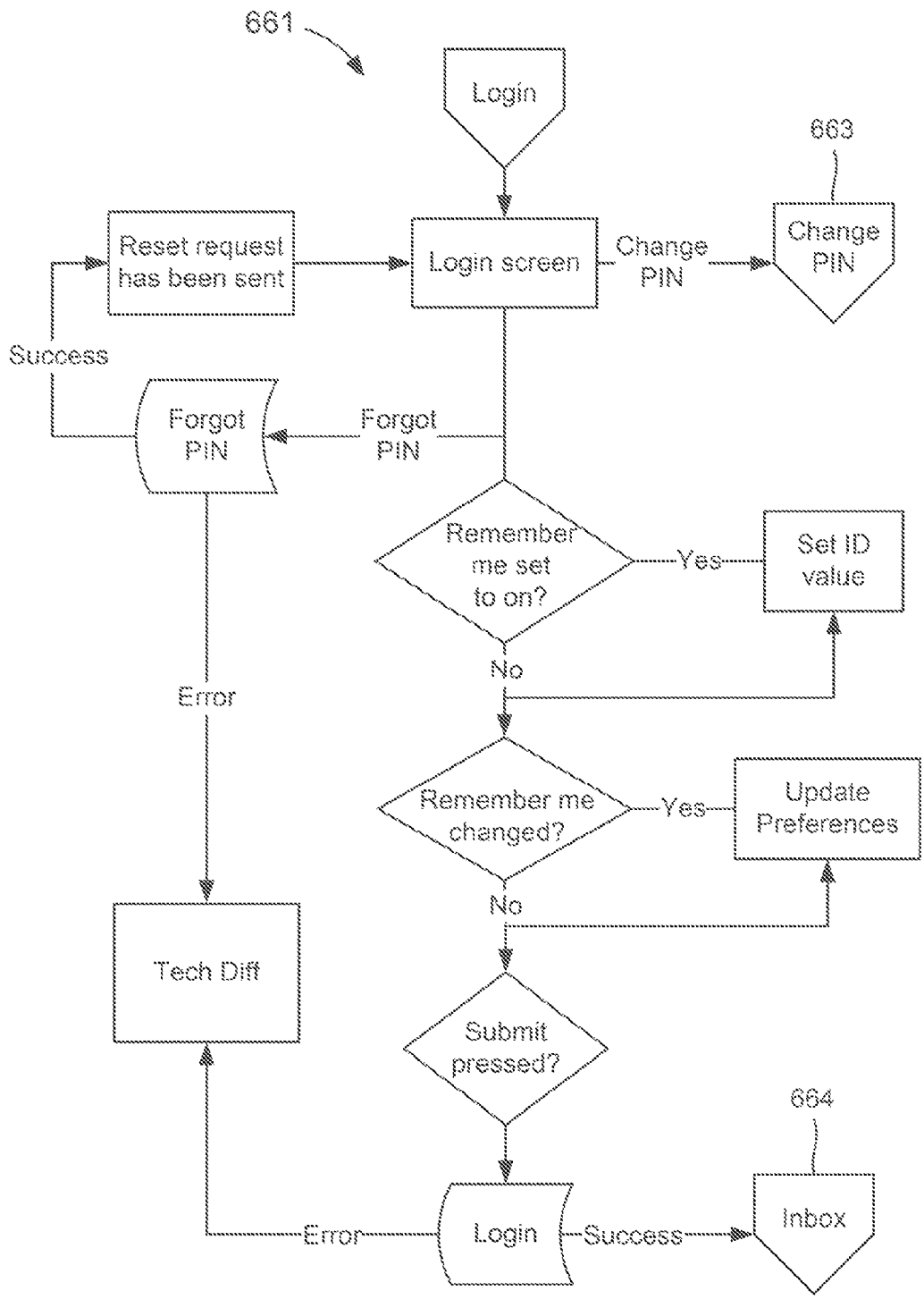
Figure 13:
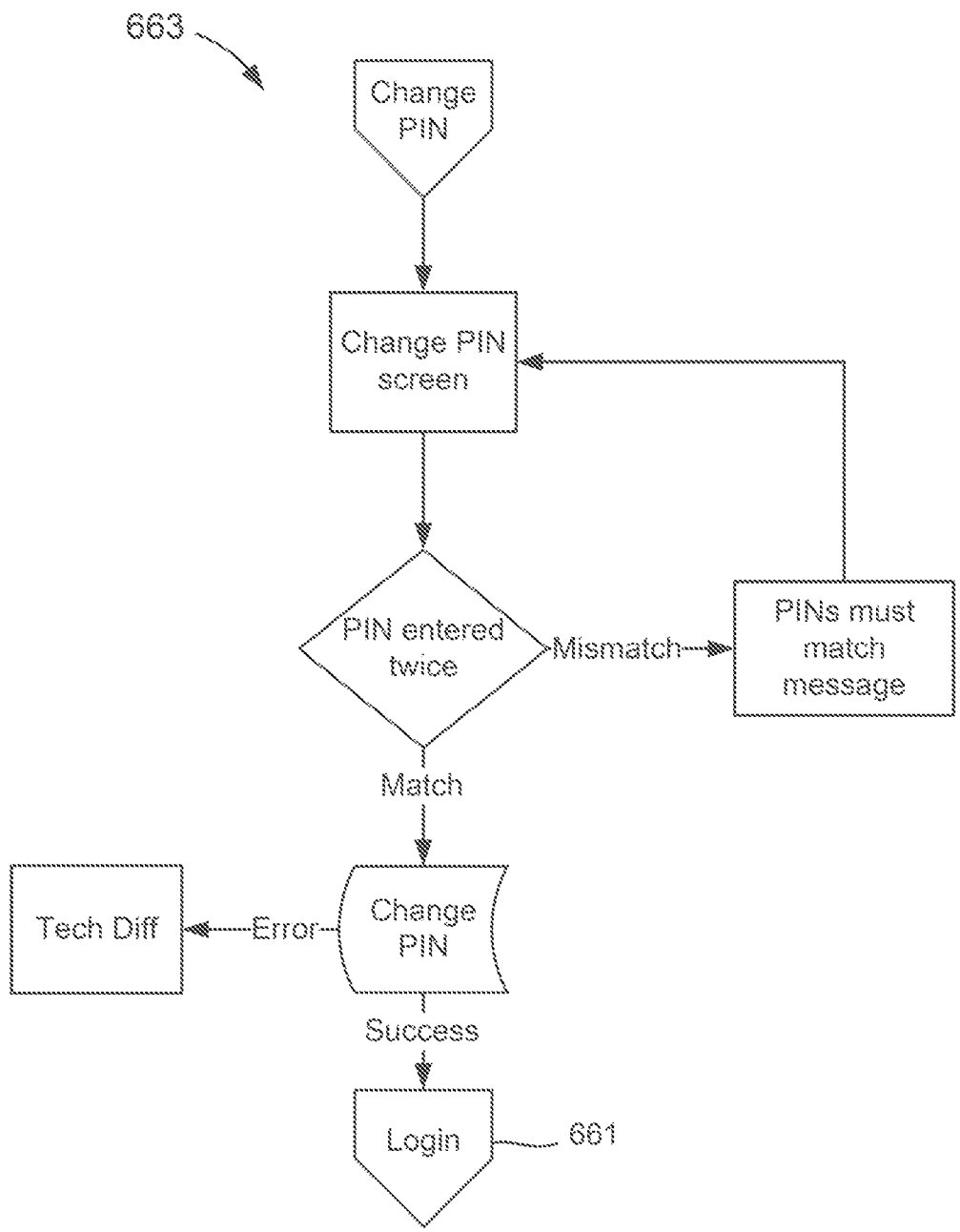

FIG. 12 illustrates the login 661. In some instances, the login credentials of a user can be stored or "remembered." In such instances, the electronic device can display, for example, an inbox 664 (see e.g., FIG. 14). In some instances, a user can manipulate the electronic device to select (e.g., by a mouse click, or by touching a portion or "button" on a touch screen) an option in the event of a forgotten PIN. In such instances, a reset PIN can be, for example, sent via email, SMS, or the like to the user. In some instances, a user can manipulate the electronic device to select Change PIN 663 to change the user's PIN. For example, FIG. 13 illustrates the Change PIN 663 process. As shown, the user can input the PIN and then enter the same PIN a second time for verification. With the PIN changed, the electronic device can display the inbox 664.

Figure 14:
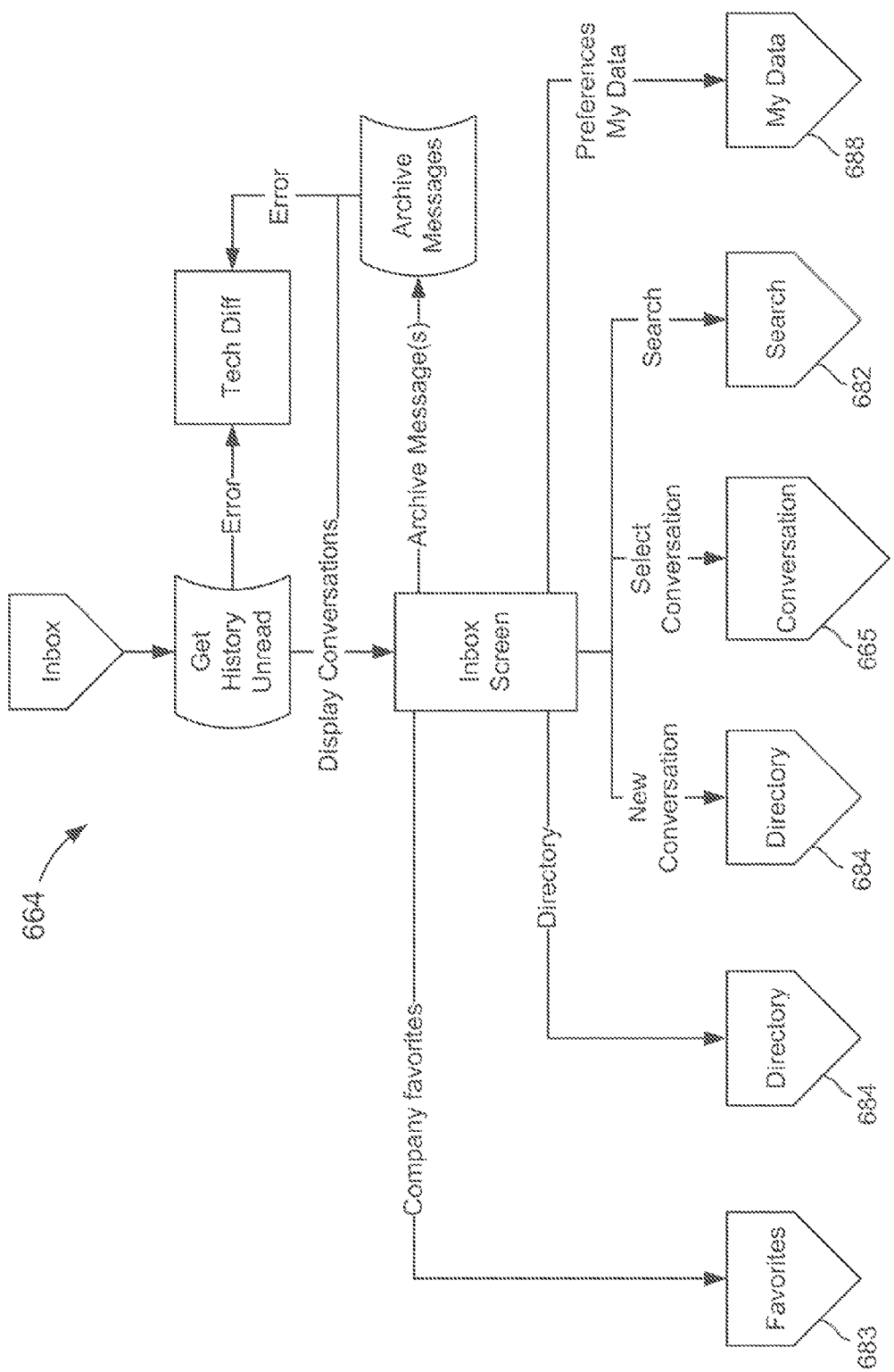

FIG. 14 illustrates the inbox 664. For example, the inbox 664 can be a list of all conversations associated with the user and displayed on the electronic device. In some instances, the inbox 664 can include portions, buttons, banners, icons, or the like associated with different portions of the customer service system. For example, as shown in FIG. 14, the inbox 664 can include a Conversation portion 665, a Search portion 782, a Favorites portion 683, a Director portion 684, and a My Data portion 688.

Figure 15:
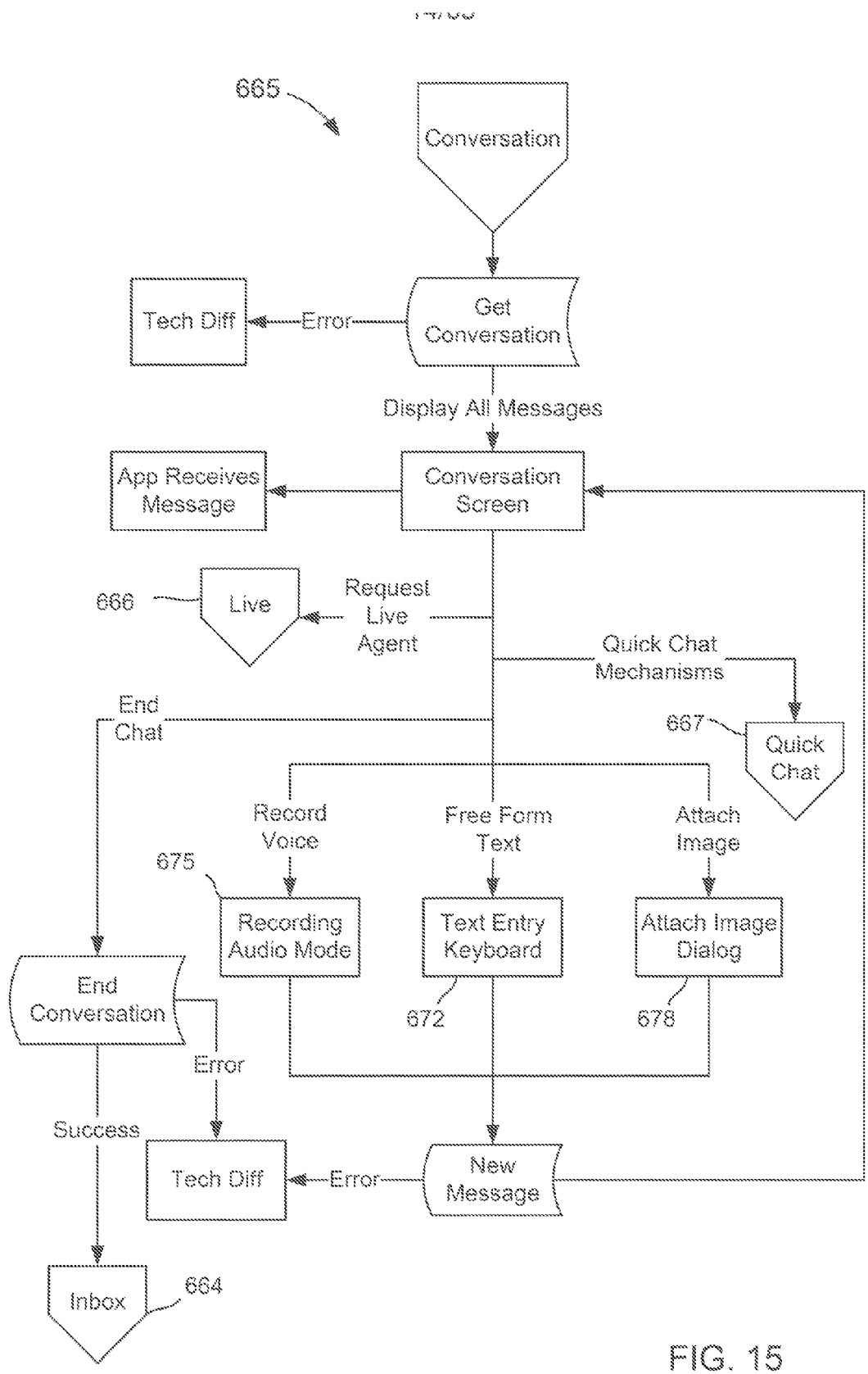
Figure 16:
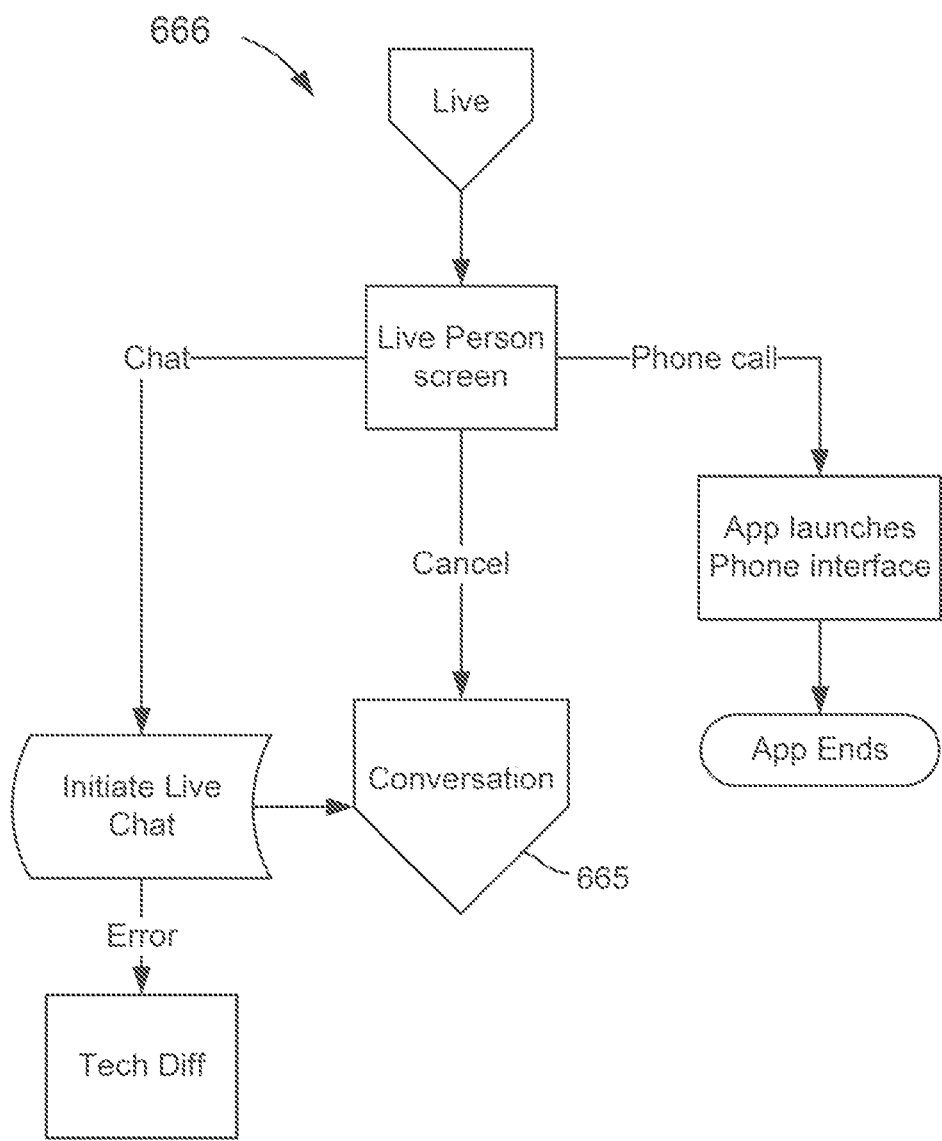

FIG. 15 illustrates the Conversation 665 process. As shown, a conversation screen can be displayed on the electronic device. The conversation screen can include portions, icons, buttons, banners, or the like associated with beginning or resuming a communication (e.g., a conversation) with a host device (e.g., the host device 120 shown in FIGS. 1-3). For example, the conversation screen can include a Live portion 666, a Quick Chat portion 667, a Text Entry Keyboard portion 672, a Recording Audio portion 675, and an Attach Image portion 678. FIG. 16 illustrates the Live portion 666. With the Live portion selected the electronic device can display an option for a live chat (e.g., SMS message or instant message) and a live phone call. With the selection of a live chat, the electronic device can display, for example, a conversation screen displaying a persistent record of any or all communications to and from the electronic device (e.g., previous chats, voice messages, or the like). With the selection of a live phone call the electronic device can include instructions to open or start, for example, a telephone interface (e.g., on a smart phone or tablet, or a PC application utilizing VoIP). In some instances, the opening or starting of the telephone interface can be such that the electronic device ends the application.

Figure 17:
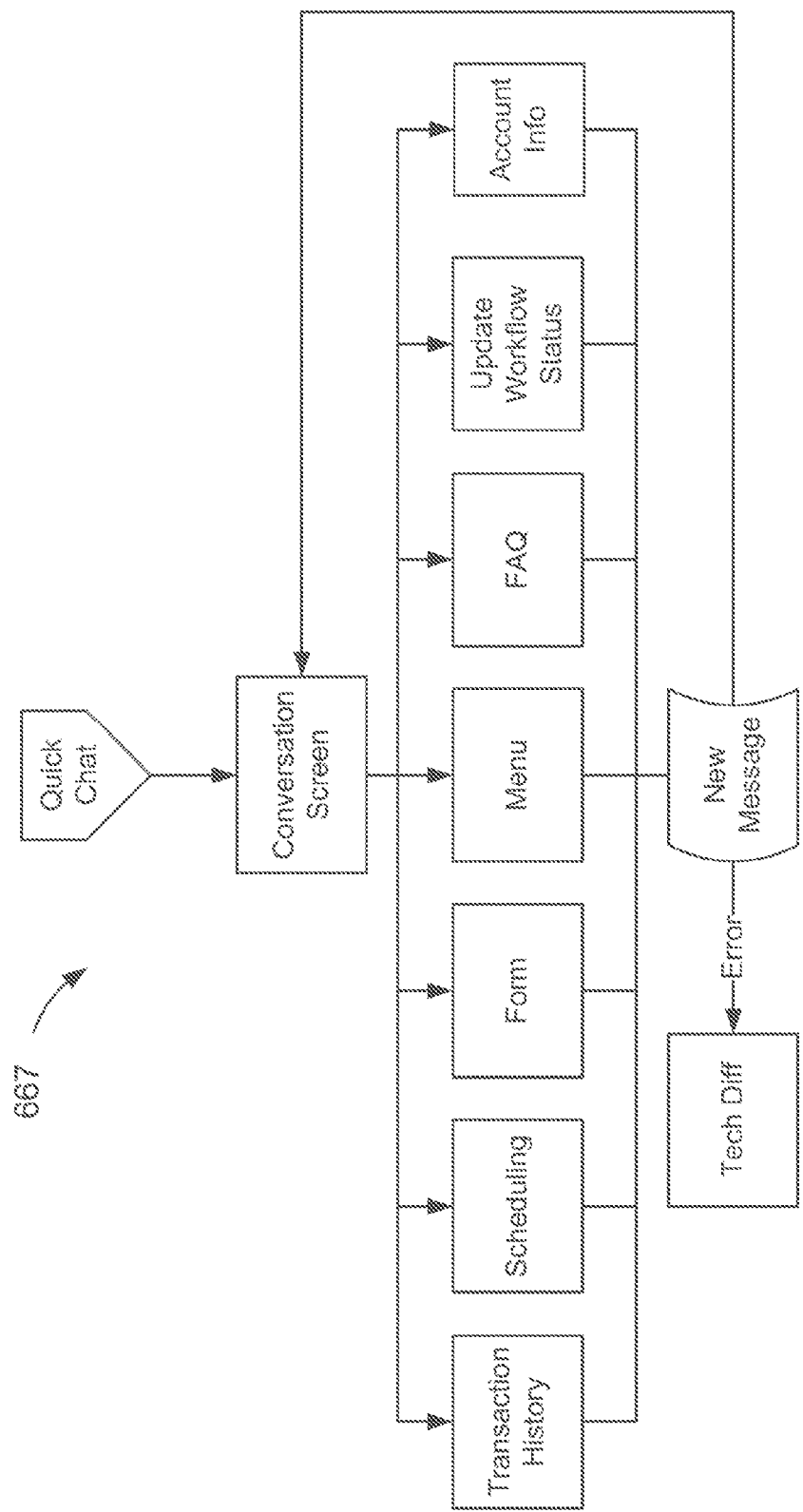

FIG. 17 illustrates the Quick Chat portion 667. In some embodiments, the electronic device can be configured to display, for example, a conversation screen displaying a persistent record of any or all communications to and from the electronic device. The Quick Chat screen 667 displayed on the electronic device can also include portions, buttons, banners, etc. associated with a set of predefined chat options (e.g., "Quick Chats"). Similarly stated, the "Quick Chat" can be an automated process with predetermined tasks, questions, answers, or the like.

Figure 18:
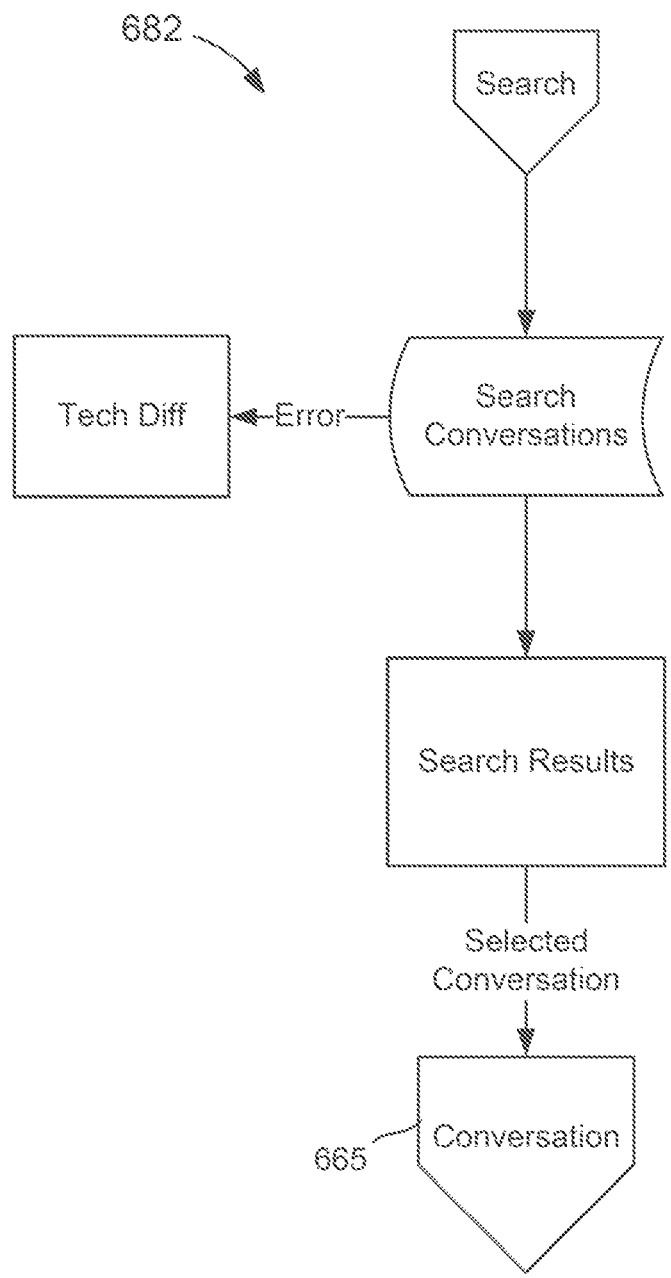

FIG. 18 illustrates the Search portion 682. In some embodiments, the electronic device can display, for example, a search menu or the like. In this manner, the user can input a search query that can be performed on any or all existing conversations. Thus, the conversations that meet the search criteria can be displayed on the electronic device. Moreover, the user can select a desired conversation from the conversations that meet the search criteria to open, for example, a persistent record of any or all communications associated with the conversation. Expanding further, the persistent record of any or all the communications can include communication between a second electronic device associated with the user and the customer service system (e.g., a host device). Similarly stated, the conversation can display a list of any or all communications to and from a user account regardless of the electronic device, as long as the electronic device is associated with the user account (as described in detail above).

Figure 19:
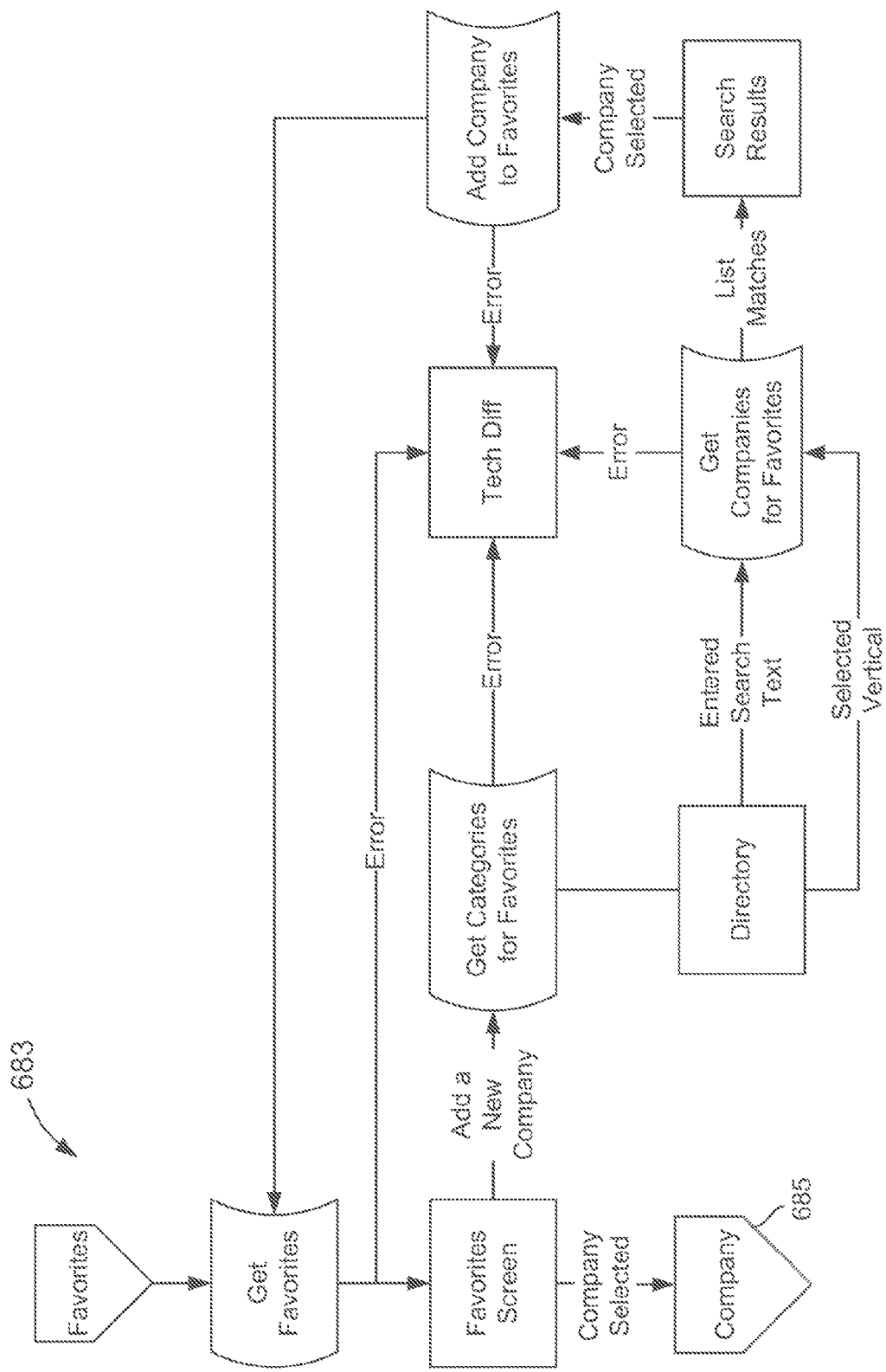

FIG. 19 illustrates the Favorites portion 683. In some embodiments, the electronic device can display, for example, a list of favorite, companies, conversations, customer service representatives, or the like. In this manner, the user can select, for example, a company from the favorites list to enter a company profile, history, conversation menu, or the like. In some instances, the user can manipulate the electronic device to add one or more new selections to the Favorites list (e.g., a company). In such instances, the electronic device can display a directory menu and/or a search menu. Thus, the user can review the listed companies and select the desired company to move to the favorites list. In some embodiments, the electronic device can display an icon or portion to which the selection can be "dragged" to (e.g., by engaging a touch screen or by mouse clicks). With the company added, the electronic device can display an updated favorites list.

Figure 20:
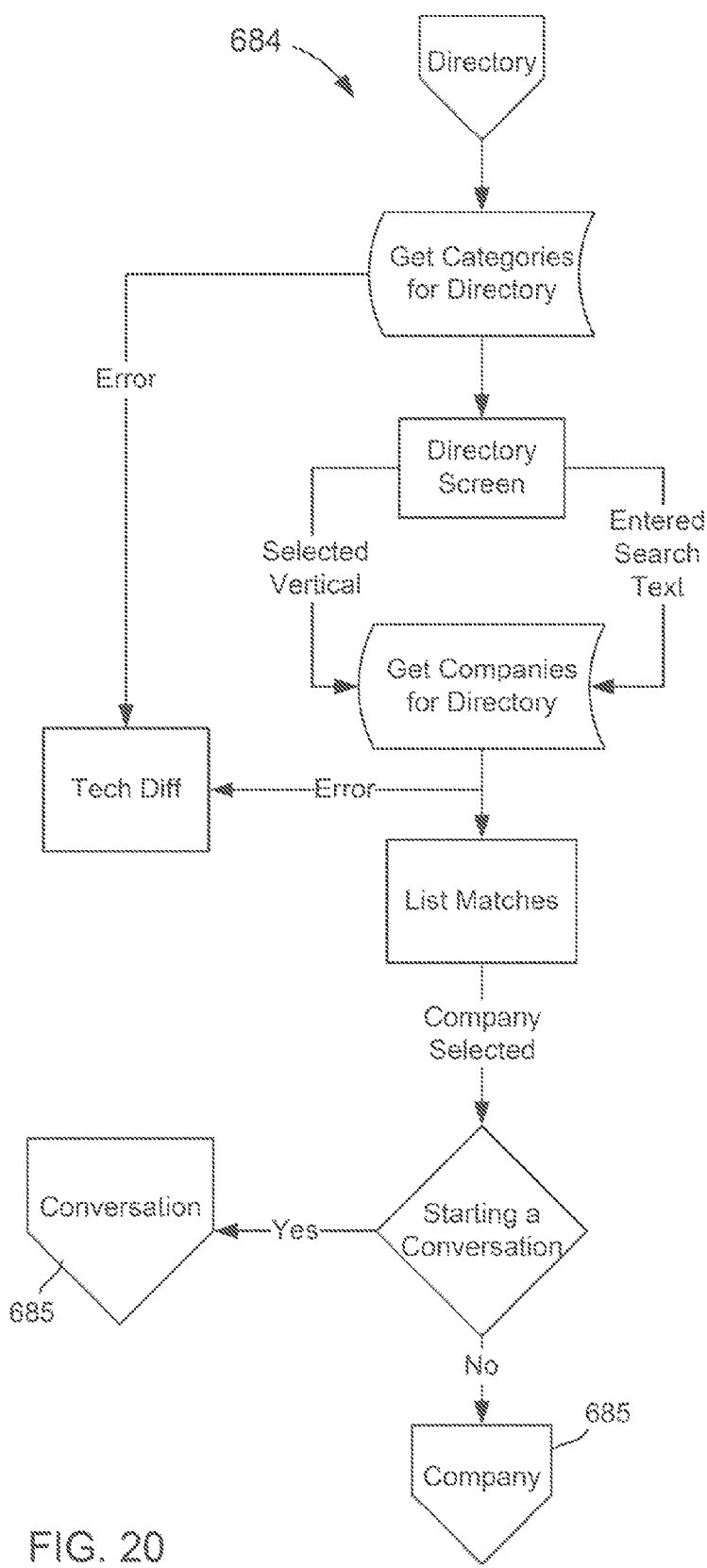

FIG. 20 illustrates the Directory portion 684. In some embodiments, the electronic device can display, for example a list of companies configured to provide at least a portion of a customer service transaction. In some instances, the Directory 684 can be displayed as a scrolling list. In some instances, the displayed list of companies can be based at least in part on the results of a user input search query. In some instances, the user can manipulate the electronic device to select a desired company from the directory 684. The user can further select an option to start a conversation 665 or to open or display, for example a company profile.

Figure 21:
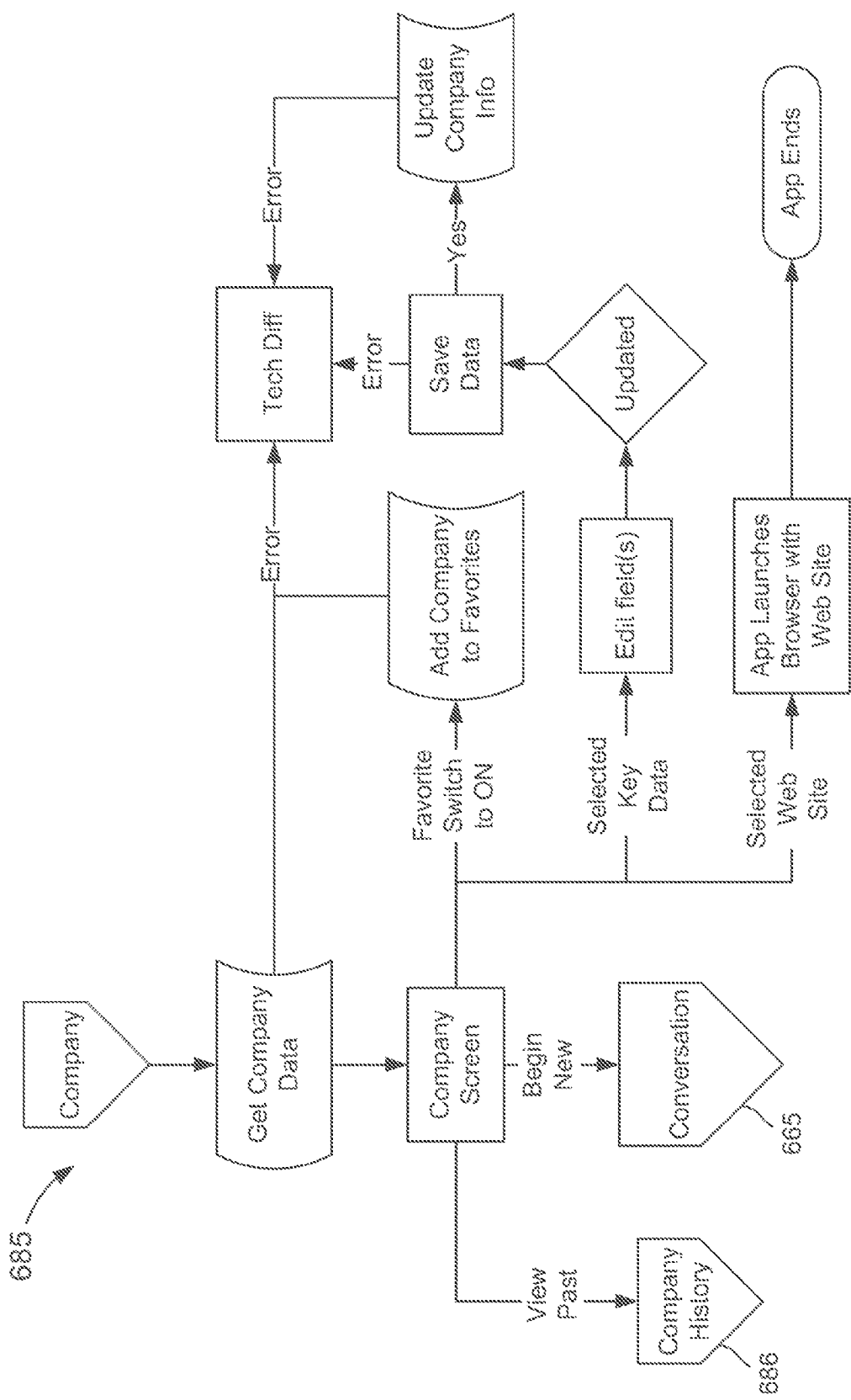
Figure 22:
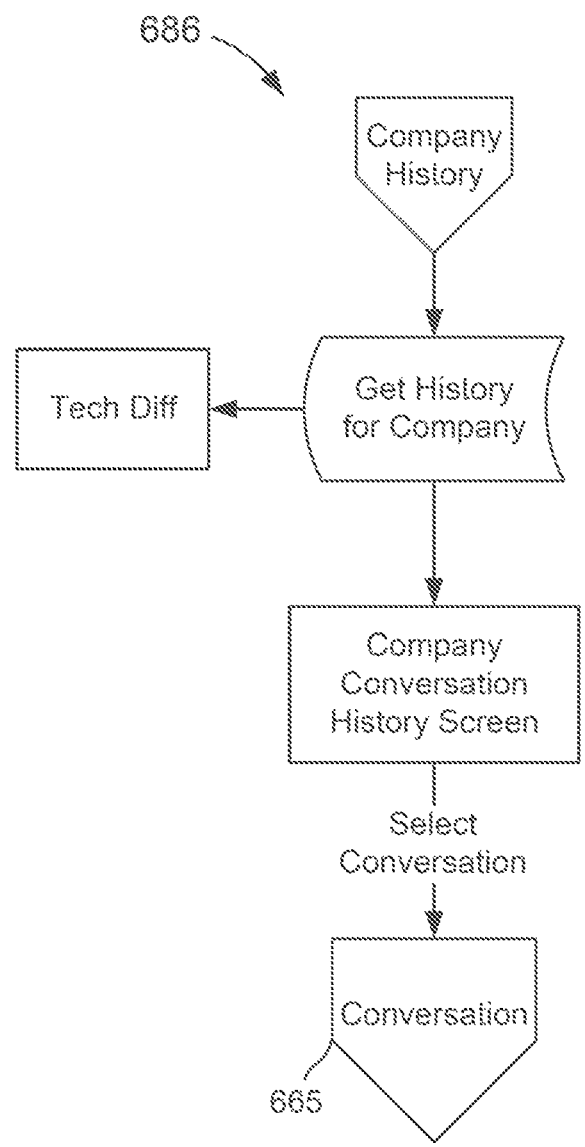

FIG. 21 illustrates a Company portion 685. In some embodiments, the electronic device can display, for example, a company profile. For example, the company profile can include contact information, location, website links, or the like. The Company portion 685 also includes a Company History portion 686 and a Conversations portion 665. The user can manipulate the electronic device to select the Company History portion 686 (see e.g., FIG. 22) such that the electronic device displays a persistent record of any or all of the communications to and from the user account (e.g., one or more electronic devices as described above) and the company. Similarly, the user can manipulate the electronic device to select the Conversations portion 665 to start, for example, a new conversation with the company.

Figure 23:
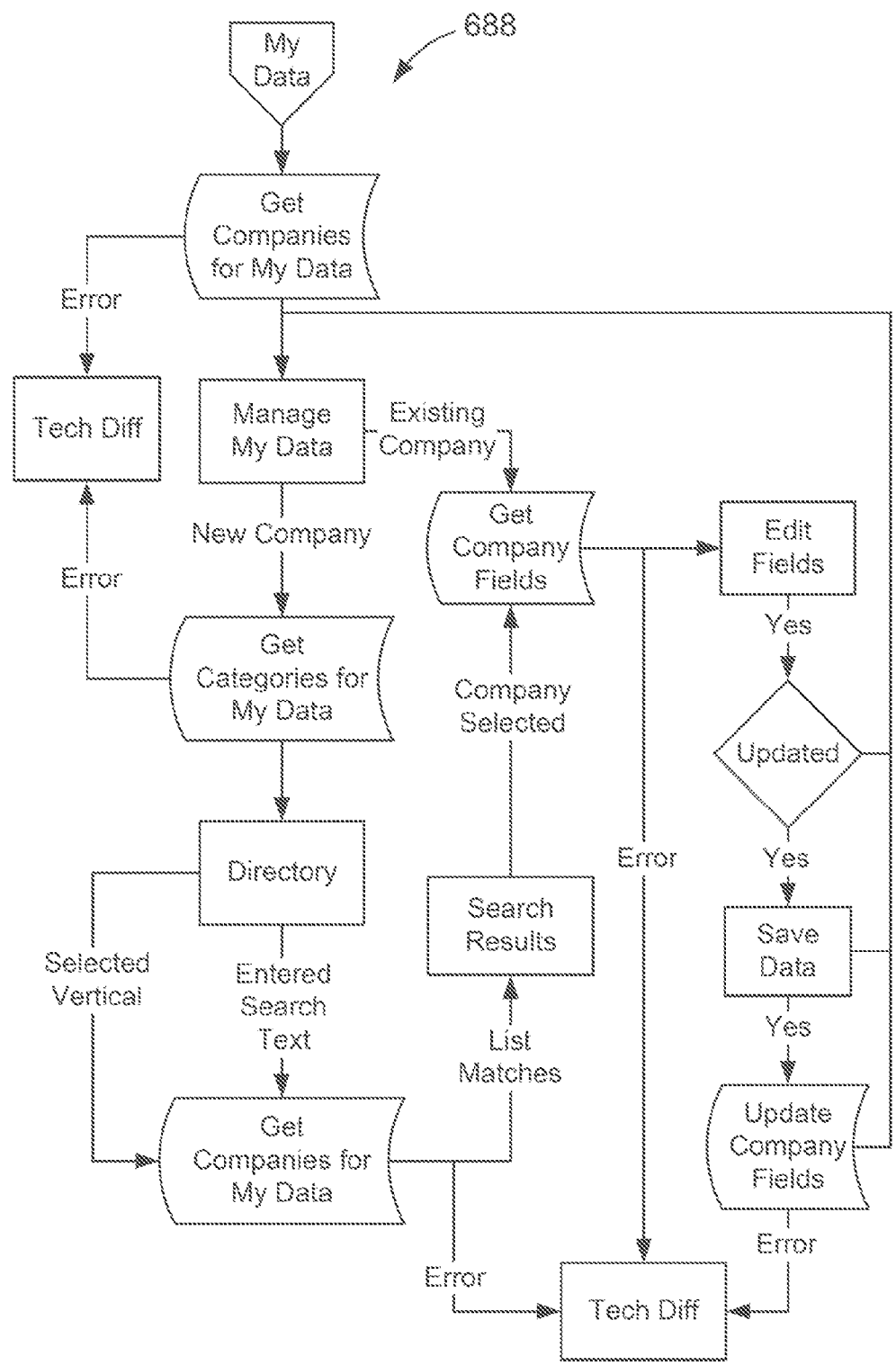

FIG. 23 illustrates the My Data portion 688. In some embodiments, the electronic device can display, for example, a list of companies, profiles, settings, conversations, preferences, or the like. For example, the electronic device can display a list of favorite companies and/or customer service representatives. In some instances, the user can manipulate the electronic device to update associated with the user. For example, the user can update an email address, physical address, billing address, or any other suitable preference.

As described above, FIGS. 24-63 are screen shots and illustrations of an electronic device demonstrating the flow diagram 660 shown in FIGS. 10-22. As described above, a mobile device such as a smart phone (e.g., an iPhone®, an Android® device, a Windows Phone®) can include and/or store in a memory a set of instructions executed by a processor associated with communicating with and/or using a customer service system (e.g., the customer service system illustrated by the flow diagram 660). A user can manipulate an electronic device (e.g., the mobile device) to open the application associated with the customer service system. In some embodiments, the electronic device can be configured to display a splash screen (not shown) or the like prior to a login.

Figure 24:

FIG. 24 is an illustration of a login 761 (e.g., the login 661 described above with reference to FIGS. 10 and 12). As shown, the login screen 761 can include a portion that can be selected by a new user associated with creating a new account and a portion that can receive an email address and a password associated with an existing user. In some embodiments, a host device (e.g., similar to the host device 120 described with reference to FIGS. 1-3) can be configured to store a in a memory or database a set user identifiers. Thus, the host device can verify the user email and password and identify the user. As shown, the electronic device can store and/or "remember" at least a portion of a user's credentials. For example, the electronic device can pre-populate (e.g., remember and input) a user's email into the associated field. In some instances, the electronic device can remember and/or pre-populate the user's email address and the user's password. In some instances where a user has forgotten his or her password, the login 761 can be configured to send an email to the user's email associated with the password, a password reminder, or a new (e.g., reset) password, as shown in FIG. 25.

As described above, the login 761 includes a portion associated with creating a new user account (e.g., the new account 662 described above with reference to FIG. 11). While not shown in FIGS. 24-63, the electronic device can display an account screen for establishing the new account. In some instances, a user can input an email address, a password (e.g., a four digit PIN), a mobile contact (e.g., phone number), personal information (e.g., full name, physical address, billing address, age, gender, or the like), company preferences, favorite companies, or the like. After inputting the user information, the electronic device can send a signal to a host device (e.g., the host device 120) associated with the new account. Upon receipt, the host device can send an email to the address provided associated with an activation link.

Figure 25:
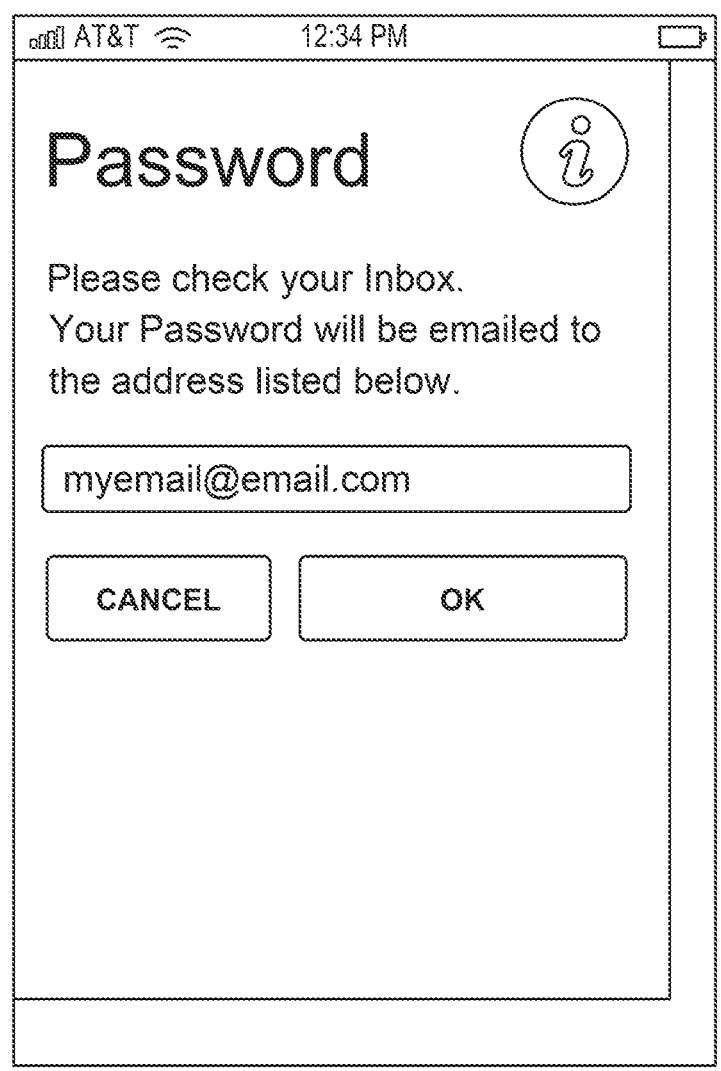

Although not shown in FIGS. 24 and 25, in some embodiments, a user can utilize the customer service system as a visitor. That is to say, an account associated with the user is not created and an identifier associated with the user is not stored. In such embodiments, the electronic device can be configured to display one or more recommendations associated with the user establishing an account to save, for example, company preferences.

Figure 26:
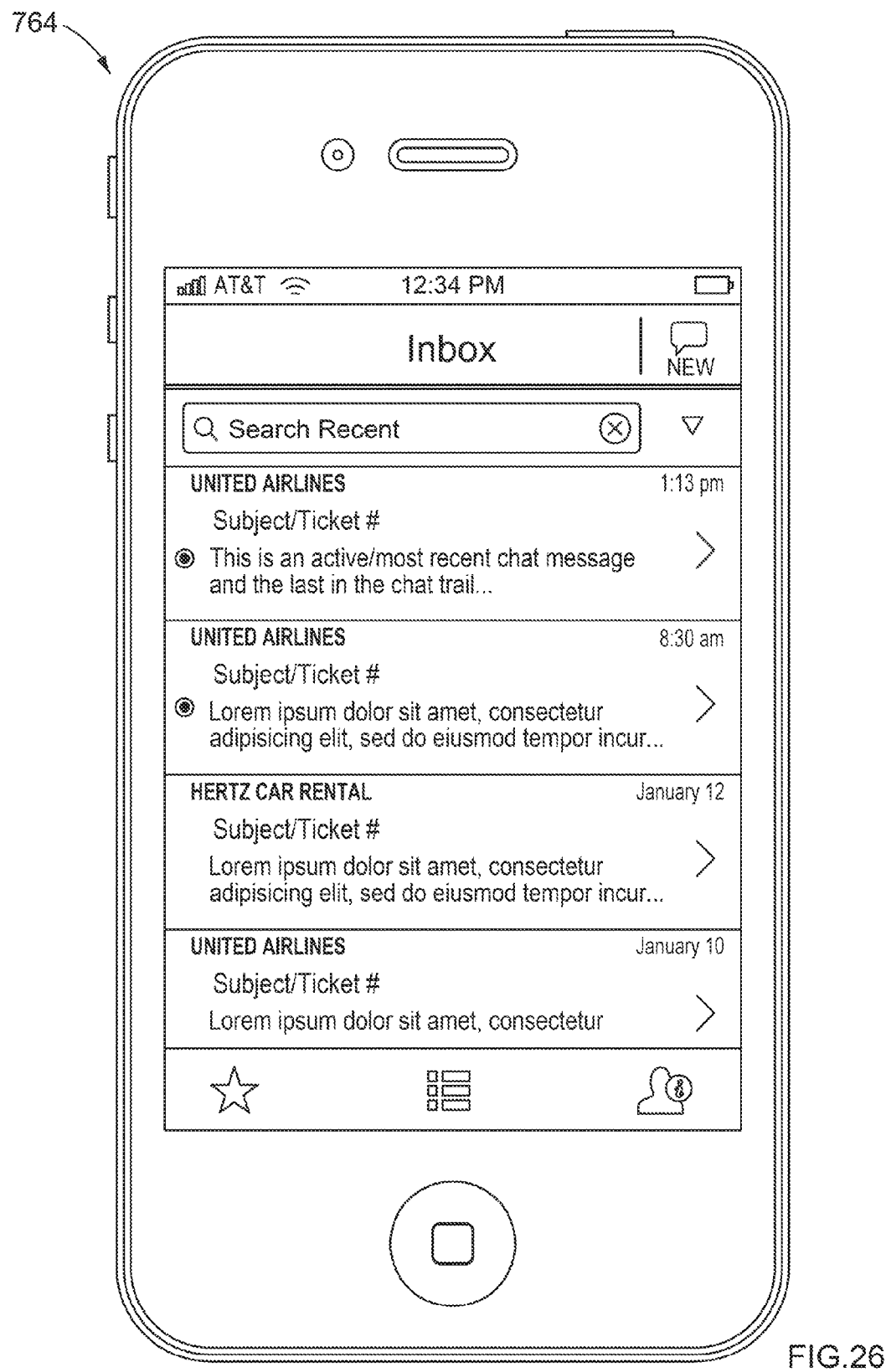
Figures 27, 28:
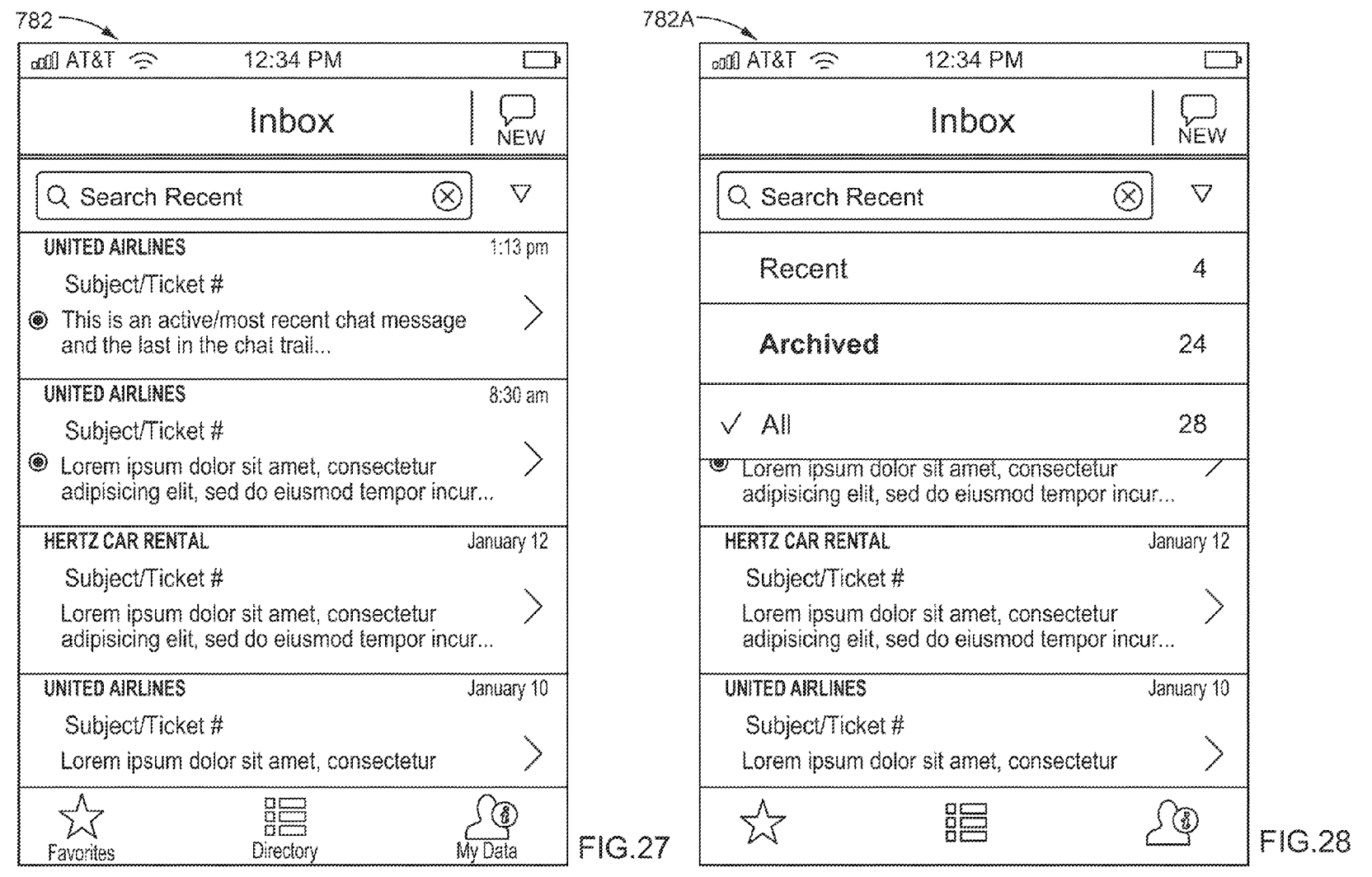

FIG. 26 is a screen shot illustrating an inbox 764 (e.g., the inbox 664 described with reference to FIG. 14). The inbox 764 can be, for example, an email-like inbox of conversations between the user and one or more enterprises, companies, or customer service representatives. For example, the inbox 764 can be a list of active conversations that can include a company name, time, subject, status indicator, and/or last message. In some instances, the inbox 764 is ordered by a timestamp associated with the last message sent or received. As shown, the inbox 764 can be arranged such that conversations that active during the current day are displayed with the time of the last message. Moreover, conversations that are active with the most recent message being prior to the current day are displayed with the date of the last message. In some instances, a user can mark one or more conversations as read or unread and/or can archive any or all of the conversations. In some embodiments, the inbox 764 can include a link or button associated with the accessing archived messages (e.g., the archived messages are not displayed by default but rather can be accessed). Furthermore, the user can search and/or filter conversations by either active, archived, or all as shown by a search interface 782 and 782A in FIGS. 27 and 28, respectively (e.g., the search 682 described with reference to FIG. 18). In some embodiments, the inbox 764 can include conversations with multi-mode communications. For example, in some instances, the inbox 764 can include a conversation with both text and voice communications. As shown in FIG. 26, the inbox 764 includes a button (e.g., a link or selectable portion) associated with starting a new conversation from the inbox.

Figure 29:
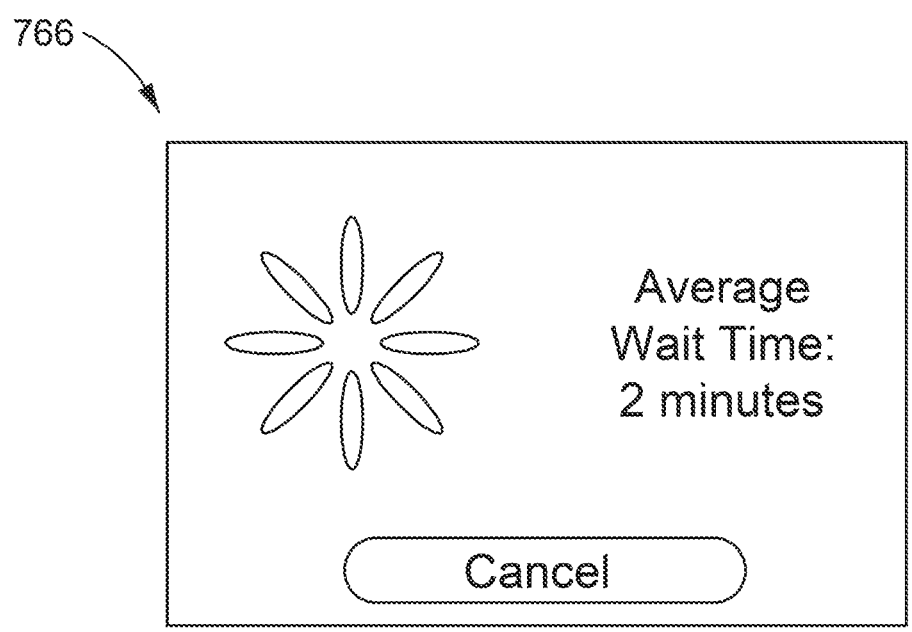

In some instances, the user can start a live conversation (e.g., the live portion 666 described above with reference to FIG. 16). For example, FIGS. 29-33 illustrate a live phone interface 766. While not shown, the live conversation can also be a live chat such as, for example, an instant message conversation. In some embodiments, the user can select to talk via a phone call or over a chat. The user can be connected to a customer service representative during, for example, business hours. In some instances, such as after hours, the user can leave a voice message for a customer service representative. In such instances, a customer representative can receive the voice message and respond during the next day's business hours. As shown in FIG. 29, upon starting a live telephonic (phone) conversation, the electronic device can be configured to display an average wait time indicator. For example, a user can place a phone call to a customer service representative and be place in a queue. In some embodiments, the customer service system can send a communication (e.g., a signal associated with a text or auditory communication) associated with the number of callers in the queue that are ahead of the user. Moreover, the customer service system can automatically update the number of users based the users leaving the queue. In some instances, the user can select to cancel the phone conversation based on the wait time (e.g., too long). In some instances, the user can be disconnected from an agent and or removed from the queue after a predetermined time period of inactivity.

Figure 30:
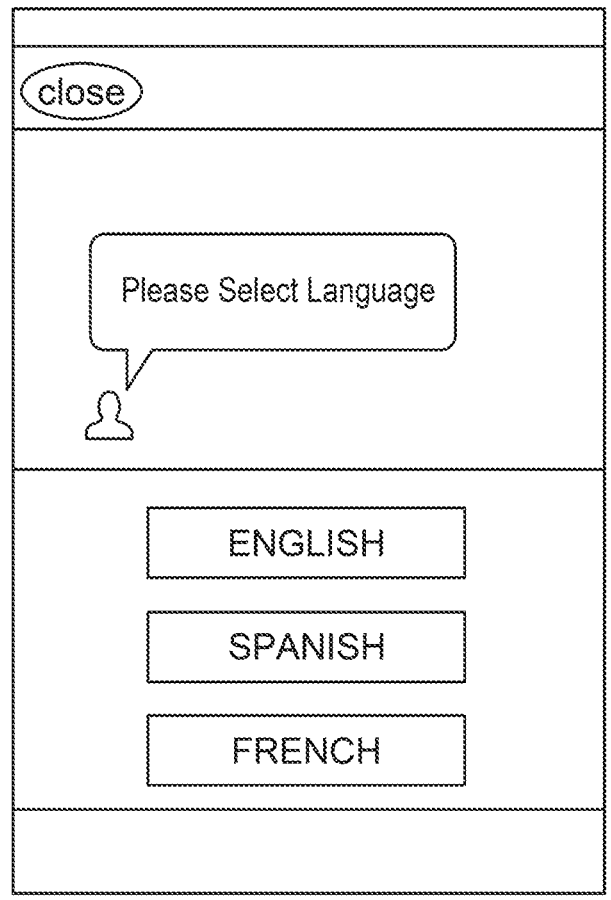
Figure 31:
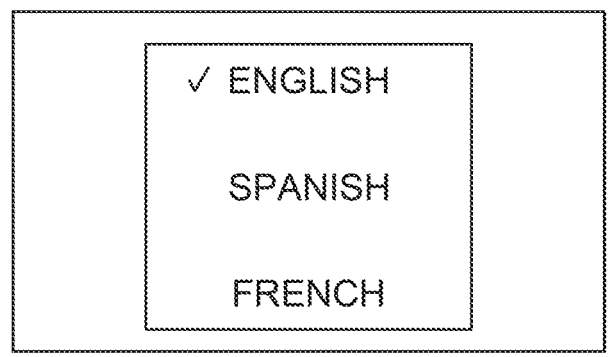
Figure 32:
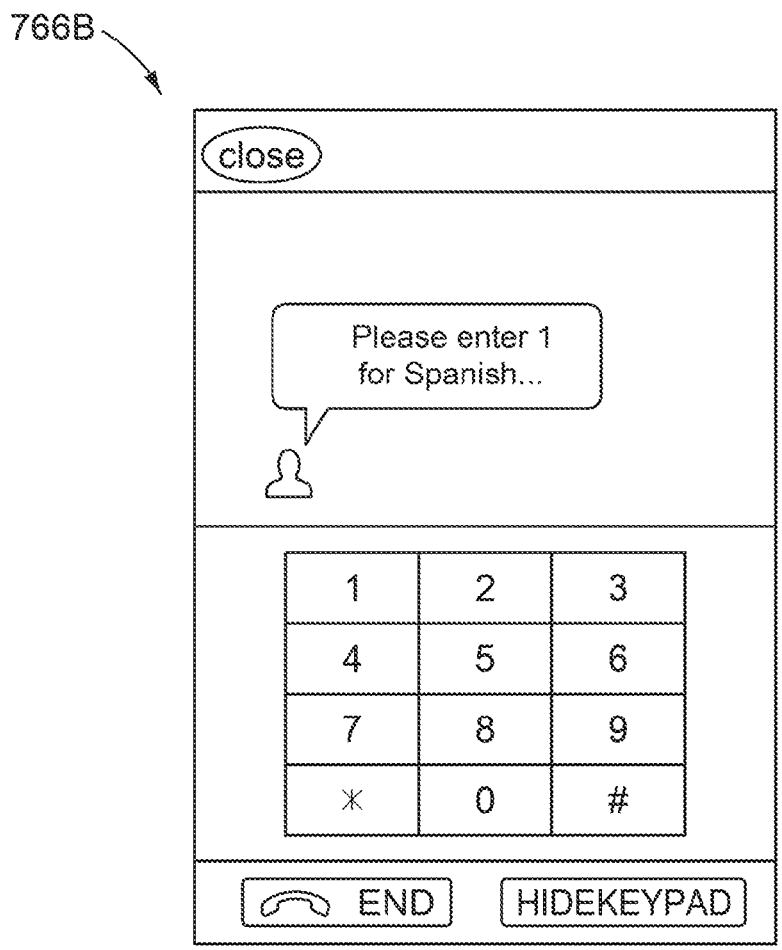

As shown in FIG. 30, the user can be prompted to select a preferred language. In some embodiments, the electronic device can display live interface 766 that includes list of buttons each associated with a language. In such embodiments, the user can select the desired language. In other embodiments, the electronic device can display a live interface 766A that includes a scrolling list of languages from which the user can select their preferred language, as shown in FIG. 31. In still other embodiments, the electronic device can display a live interface 766B associated with selecting the language, as shown in FIG. 32. In some instances, the electronic device can also play or transmit audio instructions associated with selecting the preferred language. In other embodiments, a host device can be configured to perform speech recognition and based on the recognizing can determine the preferred language.

Figure 33:
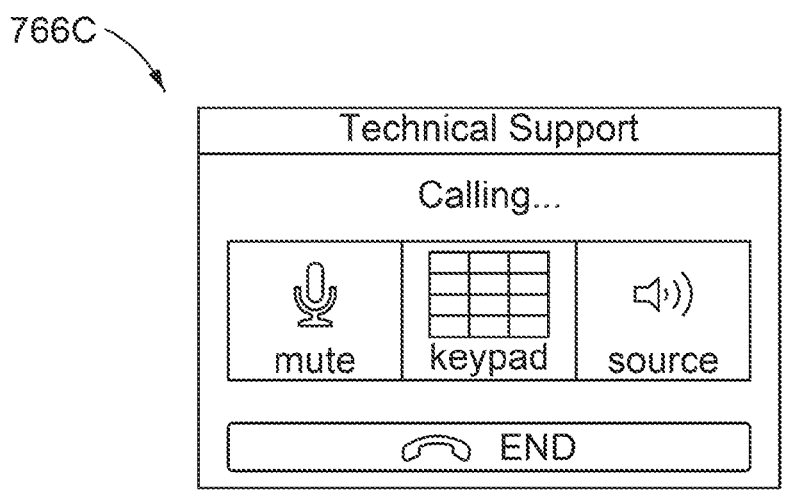

With the language selected, the user can be connected to a customer service representative that speaks the user's preferred language. When a user is connected to an agent the electronic device can be configured to display an indicator (e.g., a green indicator). As shown in FIG. 33, the electronic device can display a live interface 766C that includes any suitable button, toggle, active portion, or the like that is associated with the live conversation (including ending the conversation). Thus, the user can have a live phone conversation with a customer service representative to perform a customer service transaction.

In some embodiments, a host device can be perform a set of analytics or the like during a live conversation to collect or interpret information associated with a user's behavior while talking with the customer service representative. For example, the host device can collect or receive information associated a user ID, a mobile device ID, device type, operating system version, application version, mobile phone number, and/or conversation start time. In some embodiments, the host device can perform behavior analysis. For example, in some embodiments, the host device can determine a sentiment value associated with the conversation. Expanding further, a host device can determine a user's sentiment and/or changes in a user's sentiment during a conversation with a customer service representative (agent). In some embodiments, such as in the event of being disconnected, the customer service system can be configured to send a message to the user with an option to resume the conversation or to end the conversation.

As described above, in some instances, the user can start a quick chat conversation (e.g., the quick chat portion 667 described above with reference to FIG. 17). For example, FIGS. 34-38 illustrate a quick chat interface 767. As shown in FIG. 32, a quick chat interface 767 can include a persistent record of the communications associated with the quick chat (also referred to herein as "automated chat" or "automation system"). More specifically, the quick chat interface 767 can display any or all of the communications associated with the conversation regardless of a difference in time between the communications. For example, the user can manipulate to the electronic device to send a first communication at a first time that is display in the conversation portion. The electronic device can receive a response to the first communication at a second time, after the first time and independent of the first time, that can also be displayed in the conversation. Expanding further, the electronic device can receive the response regardless of the state of the electronic device. For example, in some embodiments, the electronic device can be a mobile device (e.g., a smart phone). In such embodiments, the electronic device can receive the response to the first communication whether the mobile application is open or not. The response can be placed, for example, in a queue such that when the application is opened, the conversation can be updated to show the response in the conversation portion. In some instances, the user can manipulate a second electronic device to send a second communication at a third time, after the first time and independent of the first time, which can be displayed in the conversation portion, regardless of being sent from a second electronic device. Thus, user can asynchronously communicate with the customer service system (e.g., a host device such as the host device 120 described with reference to FIGS. 1-3) from any suitable electronic device associated with, for example, the user account.

The quick chat interface 767 can include a set of menu buttons or active portions associated with a predetermined action of a customer service transaction. In some embodiments, the menu buttons can include a single line of a very short phrase (e.g., 2 or 3 words). In some embodiments, the menu buttons can displayed with a given color and, once selected, can be displayed with a second color different from the first. In some embodiments, the automation system can present text prompts, input forms, and dynamic menus with menu option buttons. The input forms can collect information for enterprise transactions or flow logic. The input forms can be presented to authenticate users with remote systems. In some embodiments, display forms can present information the mobile user has requested in a basic text format. In some embodiments, input forms can be presented auto-filled with information stored in a users account profile. The input forms can be configured to allow a user to change any data input forms that are auto-filled. In some embodiments, input forms can allow users to save select input data to their account profile. In some embodiments, the automation system can be personalized using, for example, company preferences or user preferences stored in or at My Data (described below). In some embodiments, the preferences can be stored at a host device. In some embodiments, a user can text a global command at any time while using the automation system (e.g., Call Me, Transfer, Main Menu, Voice Over, etc.). In some embodiments, a user can say global command at any time while using the automation system.

Figure 34:
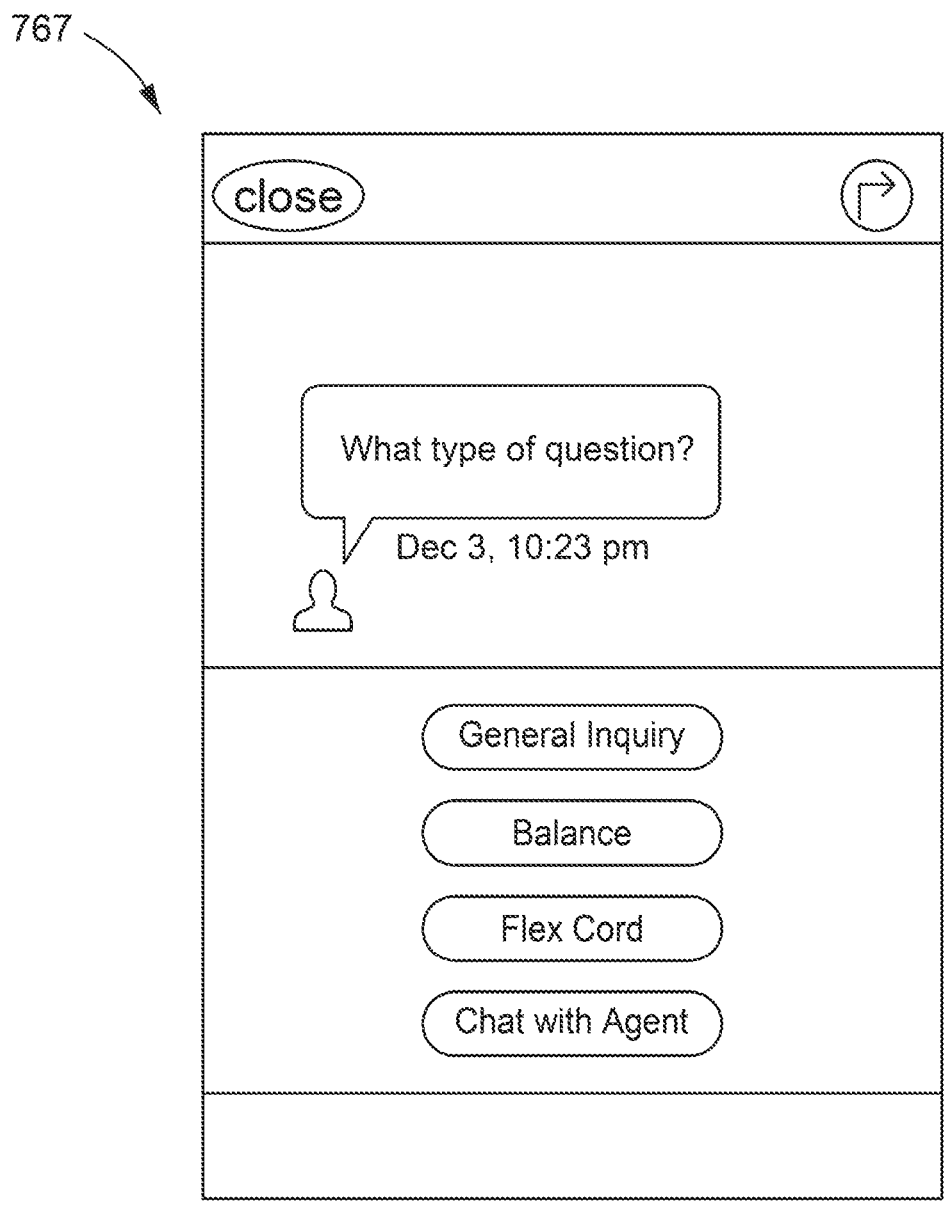

As shown in FIG. 34, the quick chat interface 767 can include a "general inquiry" button, a "balance" button, a "flex card" button, and a "chat with an agent" button. In some embodiments, the "chat with an agent" can start a live text or telephonic conversation with a customer service agent. For example, the electronic device can be configured to display a chat menu button with a company's published telephone number and or with a company's DID number (e.g., the last four digits of the company's phone number). In some embodiments, calling the company can place the user in contact with the company's IVR system. In such embodiments, the user can continue at the same process step of the customer service transaction. In some embodiments, a user can be transferred to a call center. In embodiments where the electronic device is a PC, the user can call the customer service agent via VoIP.

Figure 35:
Figure 36:
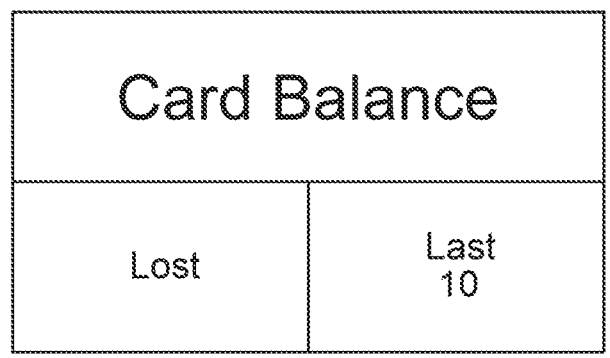

In some instances, the electronic device can display a set of buttons or links associated with performing a customer service transaction for a given company. For example, as shown in FIG. 35, the electronic device can display a quick chat interface 767A associated with an airline. The quick chat interface 767A includes a conversation portion that can include any or all communications associated with the transactions in a persistent record. The quick chat interface 767A also includes a list of predetermined actions associated with the transaction. For example, the quick chat interface 767A shows a "Book Flights" button, a "Change Reservations" button, a "Frequent Flyer Account" button, and a "None of these" button. In this manner, the user can select one of the buttons to proceed to a second step of a customer service transaction. For example, the user can select the "Change Reservations" button. Upon selecting, the electronic device can display a screen associated with any or all reservations associated with the user, thereby allowing the user to select the reservation to change.

Figure 37:
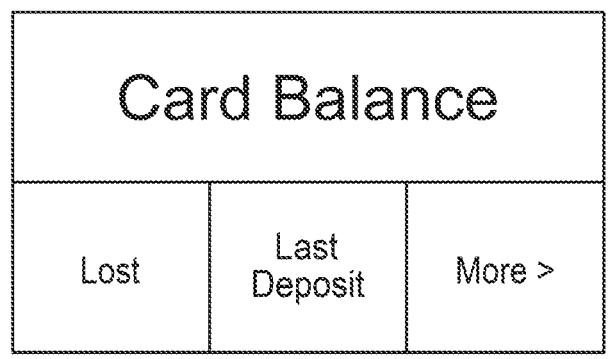
Figure 38:
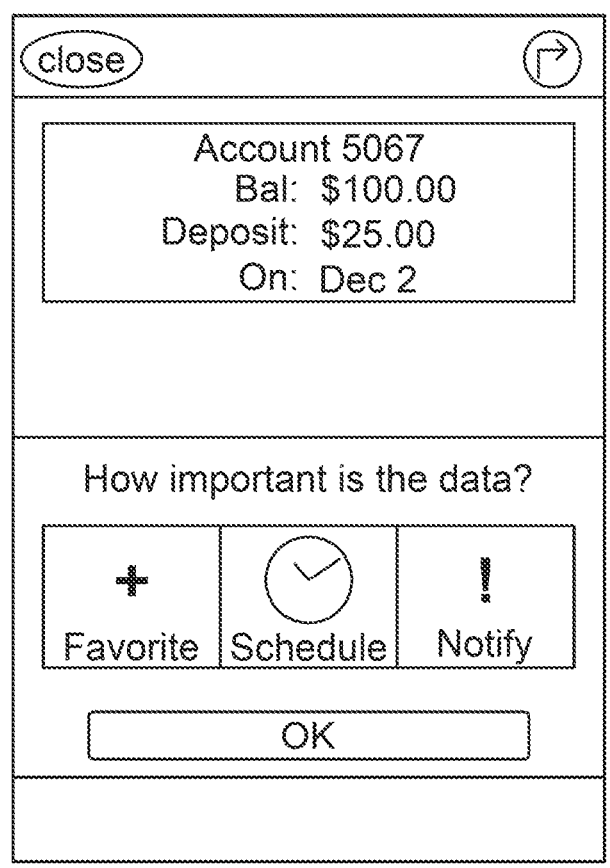

Referring back to FIG. 34, in some instances, the user of the electronic device can select, the "balance" button to view account balance information (e.g., financial information). As shown in FIG. 34, in some instances, the electronic device can display a balance screen 770 that can include any suitable button, link, drop down menu, or the like associated with the balance of the account. For example, the balance screen 770 includes a "Card Balance" button, a "Lost" button, and a "Last 10" button. In some instances, a balance screen 770A includes a "Card Balance" button, a "Lost" button, and a "Last Deposit" button, and a "More" button, as shown in FIG. 37. In this manner, the user can select any of the buttons to perform an action and/or review information associated with the account. For example, in some instances, the user can select the "Card Balance" button. As shown in FIG. 38, the electronic device can display a screen including account number information, balance information, and transaction information. Furthermore, the display can also include a portion associated with buttons or links to further perform actions associated with the account (e.g., schedule a payment, change notification settings, add a link to a favorites page, or the like).

As described above, in some instances, the user can start a free form conversation (e.g., the Text Entry Keyboard portion 672, the Recording Audio portion 675, and the Attach Image portion 678 described above with reference to 15). For example, FIGS. 39-47 illustrate free form conversation interfaces. The free form conversation interface can include a conversation portion (described in detail above) that can include any or all communications associated with the transactions in a persistent record. In some embodiments, the conversation portion can be arranged similarly to a native chat or conversation interface of the electronic device. For example, chat text bubbles from a customer service representative can be on one side of the conversation portion and can be different color than communications from the user. In some embodiments, an icon (e.g., a picture) can be associated with a communication from the user and an icon can be associated with a response from a customer service representative.

Figure 40:
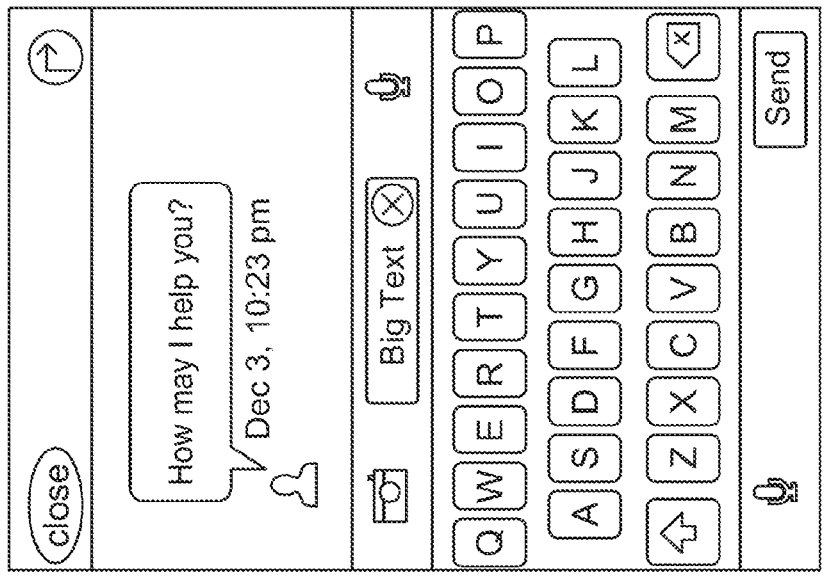
Figure 39:
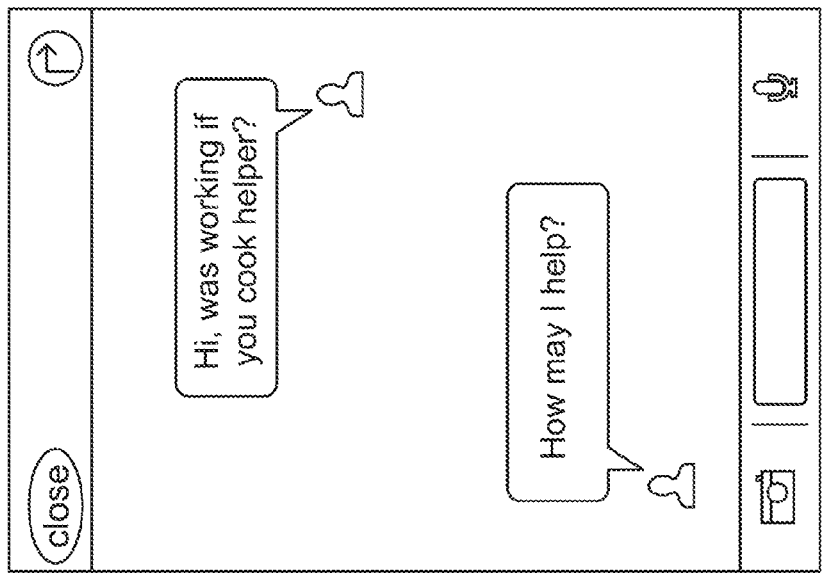
Figure 41:
Figure 42:
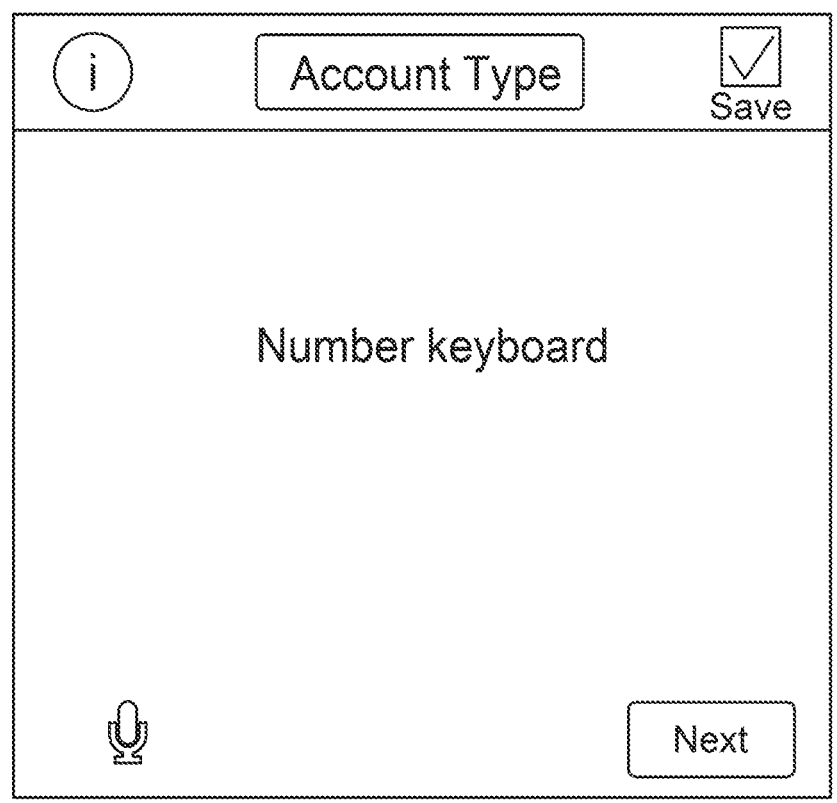
Figure 43:
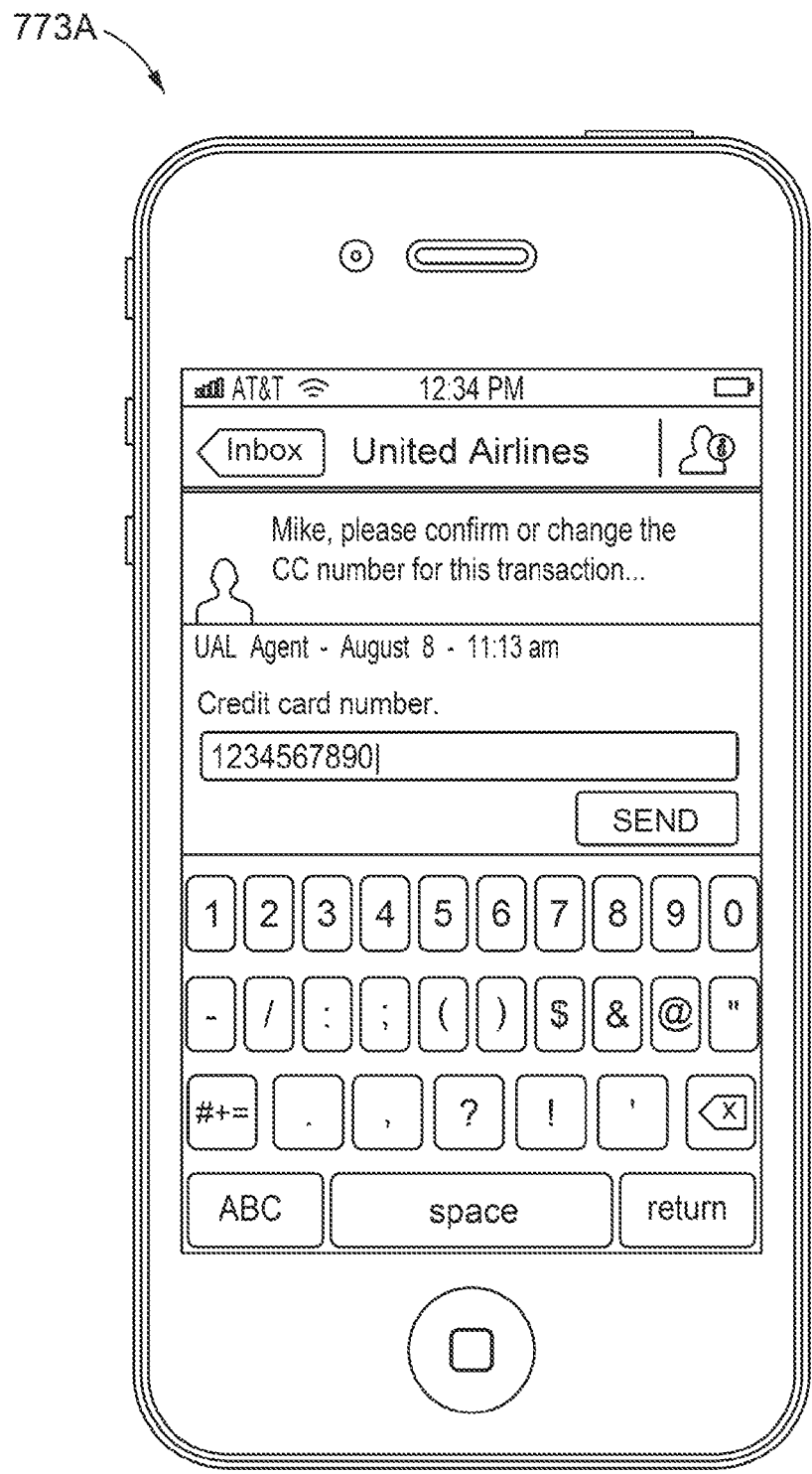
Figure 44:
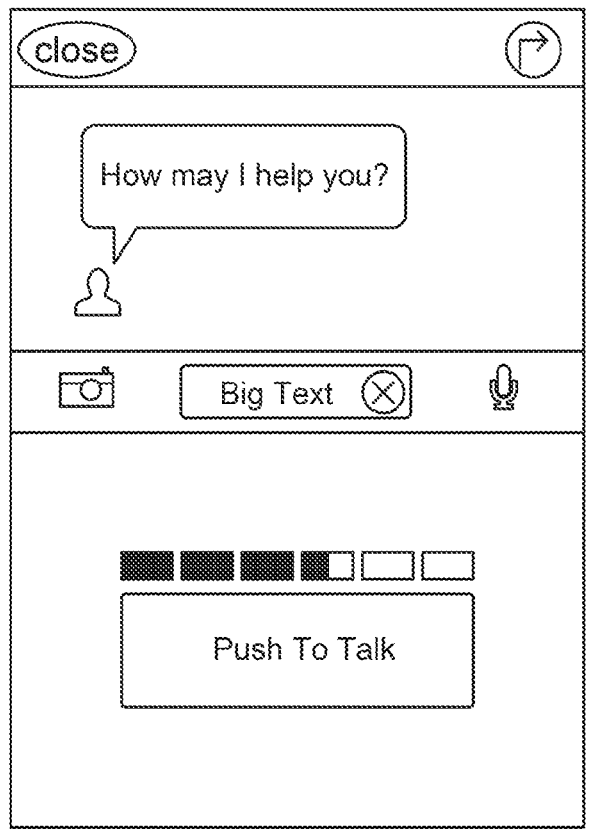
Figure 45:
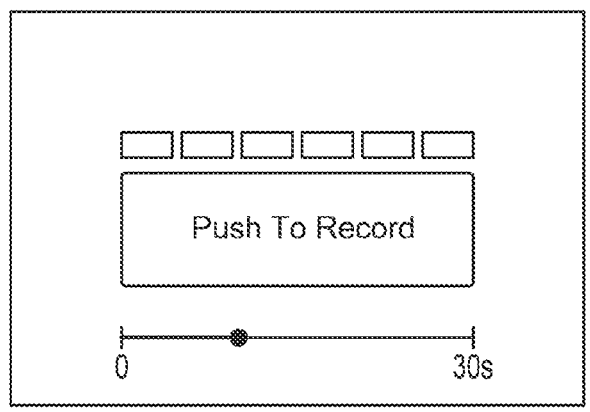
Figure 46:
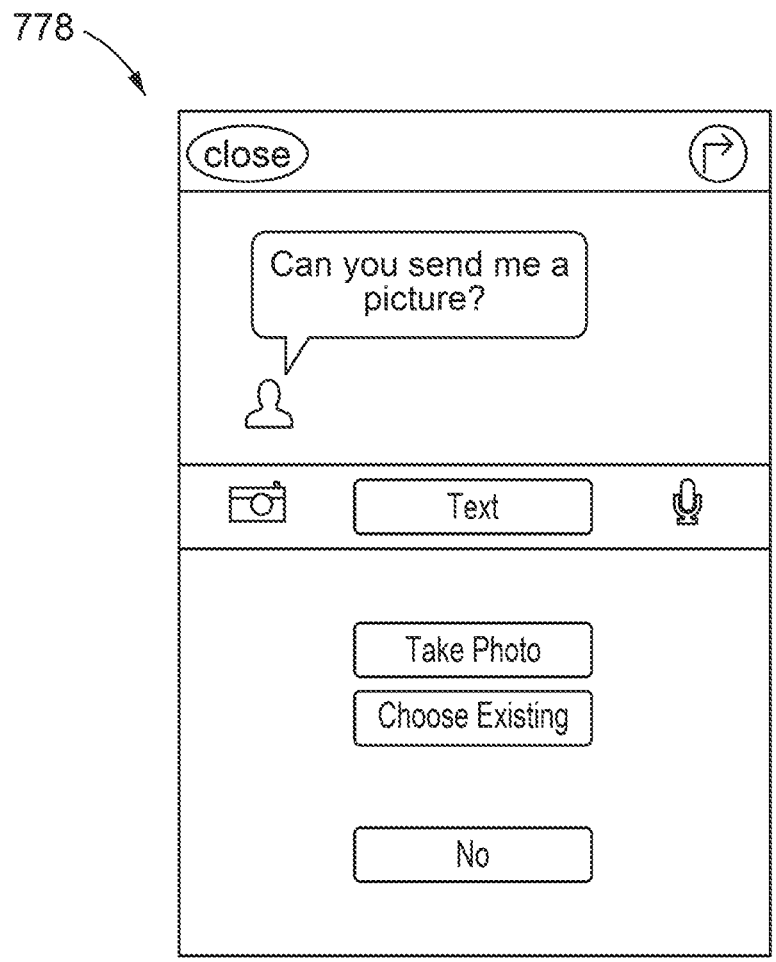
Figure 47:
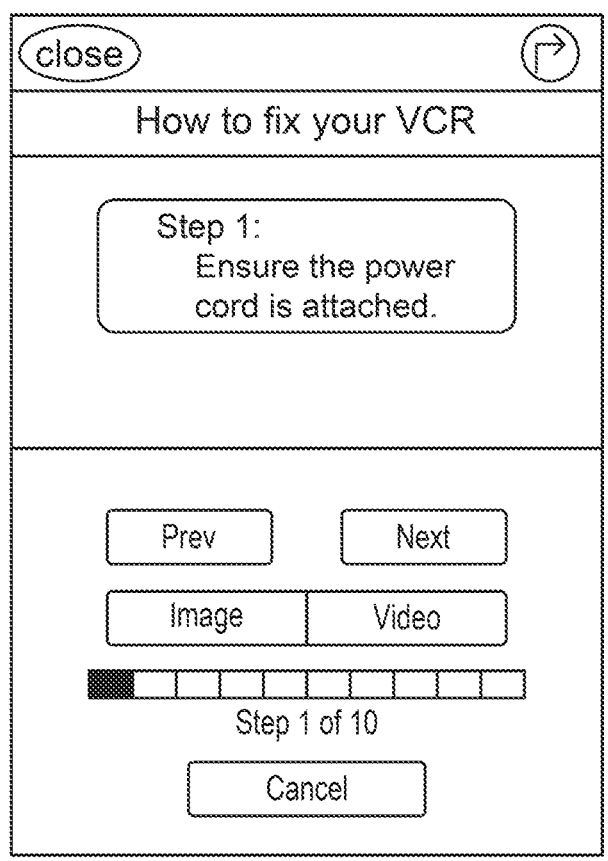

The free form conversation interface can further include portions, buttons, icons, or the like associated with a text entry communication, an audio recording communication, and/or an image communication. By way of example, FIGS. 39-43 illustrate a text entry interface, FIGS. 44 and 45 illustrate an audio recording interface, and FIGS. 46 and 47 illustrate an image communication interface. As shown in FIG. 39, a free form interface 772 includes a banner having portions associated with the various communication portions (e.g., a text box associated with text communications, a microphone associated with audio communications, and a camera associated with image communications). As shown, the banner can be disposed below the conversation portion. In other embodiments, the banner can be disposed above the conversation portion. As shown in FIG. 39, the arrangement of the free form interface 772 is such that banner is minimized prior to selecting the mode of communication. As shown in FIG. 40, the user can select a text entry interface 772A by selecting the text box included in the banner portion. In this manner, the conversation portion can be reduced and the banner can be moved to display, for example, a keyboard associated with the text entry interface 772A. By way of example, FIG. 41 is a screen shot of a text entry interface 772B showings the keyboard portion and the conversation portion. In some embodiments, the context of the conversation can be such that a text entry interface 773 displays a number keyboard, as shown in FIG. 42. For example, in some embodiments, the user can be prompted to enter a credit card number, account number, phone number, or the like. As shown in FIG. 43, a text entry interface 773A can display a number keyboard including different buttons (associated with a portion of the keys of a QWERTY keyboard) than the keyboard illustrated in, for example, FIG. 41.

As described above, the user can select to record an audio message communication. For example, the user can select the microphone of the free form interface 772 shown in FIG. 39.

As shown in FIG. 44, the selection of the microphone can be such that the electronic device displays an audio interface 775. More specifically, the conversation portion (described in detail above) can be reduced and the banner can be moved to display, for example, a recording interface. For example, the recording interface includes a "Push to Talk" button operative in enabling a microphone included in the electronic device. In this manner, the user can speak into the microphone of the electronic device to record an audio message. In some embodiments, the length of an audio message can be limited to or by a predetermined time period (e.g., 30 seconds, 1 minute, 2 minutes, 3 minutes, and/or any fraction therebetween). As shown, the audio interface 775 can display an indication bar associated with the length of the audio message (e.g., the time length). As shown in FIG. 45, in some embodiments, a recording interface 776 can include a "Push to Record" button. The recording interface 776 can also include an indication bar and a timeline associated with the length of the audio message. In some embodiments, sent audio recordings are displayed in, for example, a chat bubble. In such embodiments, selecting the chat bubble can play the audio recording. Audio playback can include controls to navigate forward and/or backward through the audio recording.

As described above, the user can select to communicate using one or more images. For example, the user can select the camera of the free from interface 772 shown in FIG. 39. As shown in FIG. 46, the selection of the camera can be such that the electronic device displays a photo interface 778. More specifically, the conversation portion (described in detail above) can be reduced and the banner can be moved to display the photo interface 778. The recording interface 778 includes a "Take Photo" button and a "Choose Existing" button. In some instances, the user of the electronic device (e.g., a smart phone including a camera) can select the "Take Photo" button. In such instances, the electronic device can be configured to open a camera application; thus, the user can take a photo. With the photo taken, the electronic device can be configured to again display (e.g., automatically) the photo interface 778 and the photo can be added to the conversation. In some embodiments, the photo can be displayed as a thumbnail in the conversation portion of the photo interface 778. In such embodiments, the thumbnail can be selected to retrieve image content. In some instances, the photo interface 778 can display a confirmation portion prior to adding the photo to the conversation. In other instances, the photo interface 778 can automatically (e.g., without user intervention) add the photo to the conversation. In some instances, the user can select the "Choose Existing" button. In such instances, the electronic device can be configured to open and display the photos (e.g., thumbnails or the like) that are stored, for example, in a memory of the electronic device. In this manner, the user can select one or more desired photos to upload to the conversation (as described above). In some embodiments, sent or received images can be saved, for example, in a photo library stored in a memory of the electronic device.

As shown in FIG. 47, in some embodiments, a customer service system (e.g., a host device, a customer service representative, or the like) can send an image or video to the electronic device in response to, for example, an image uploaded to the conversation. As shown, the user can select, for example, to view one or more videos sent to the electronic device. In other instances, the user can select to view one or more pictures sent to the electronic device. In such embodiments, the pictures and/or videos sent to the electronic device can be displayable in the conversation portion of a free form interface 779. In some embodiments, a link can be displayable in the conversation portion of the free form interface 779 that can be selected. In such embodiments, the electronic device can, for example, open a web browser an automatically navigate to the link. In this manner, the user can view the video and/or the pictures via the internet and an ISP.

Figure 48:
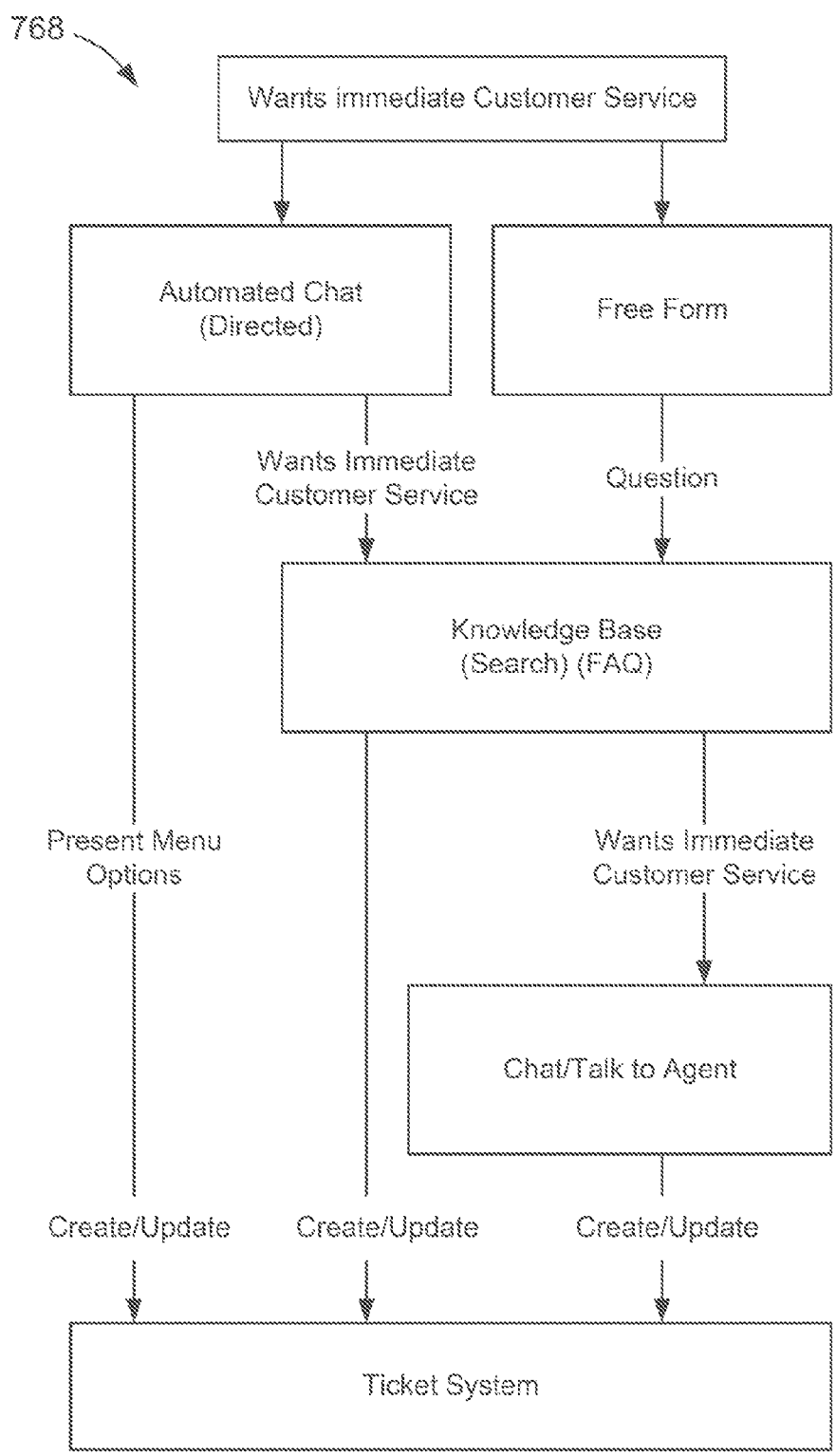
Figure 49:
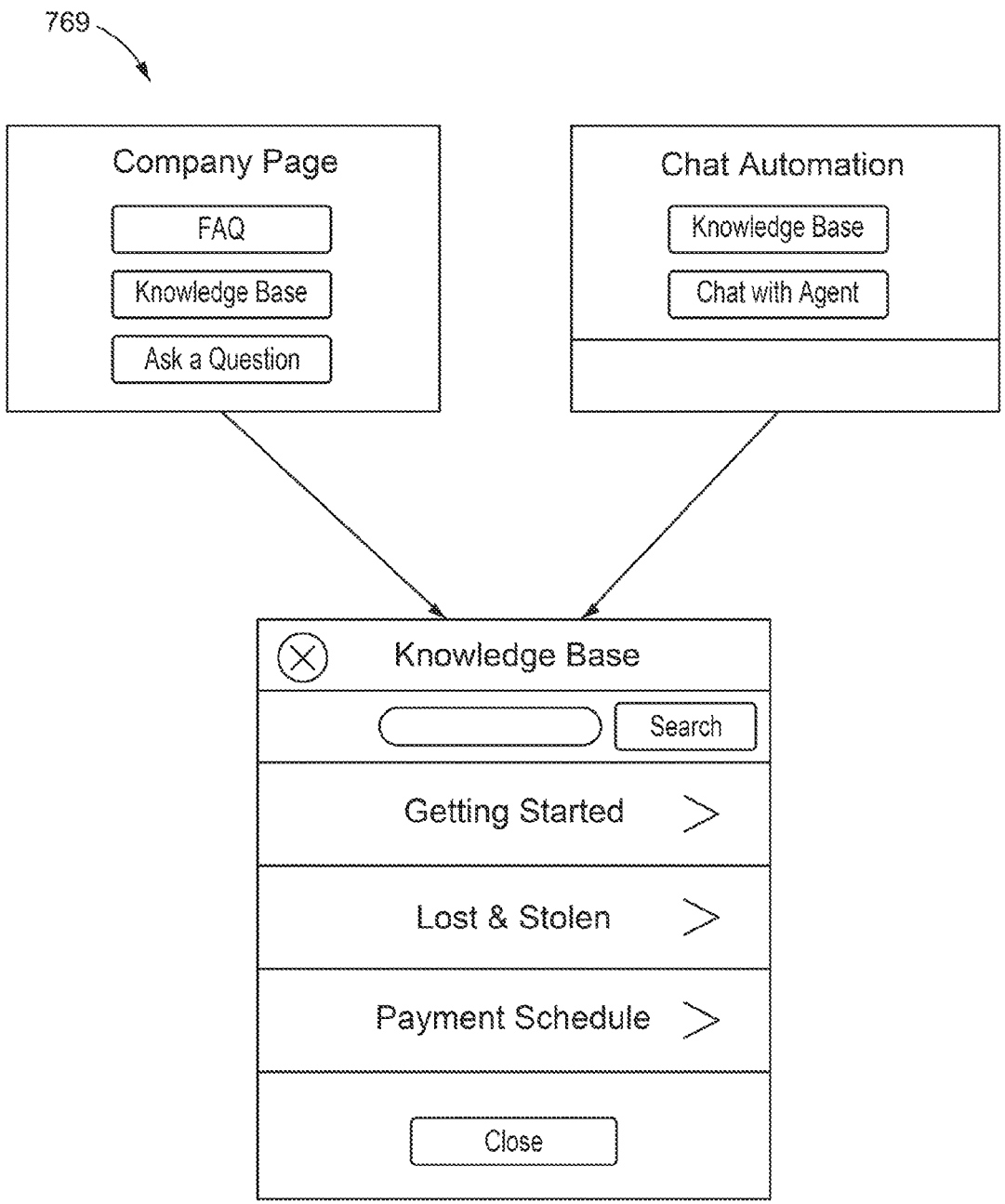

In some embodiments, the starting of a conversation (e.g., from the inbox 774) can be such that the electronic device is placed in communication with a knowledge base. For example, FIG. 48 is a flow diagram 768 illustrating an electronic device being placed in communication with a knowledge base. In some embodiments, the knowledge base can be a repository of frequently asked questions and associated answers (e.g., a database or the like stored, for example, in the memory of a host device). Moreover, the knowledge base can be updated with information from any user, customer service representative, automated chat, or any other source. In this manner, the repository of the knowledge base can increase in "intelligence" (can include an increasing number of questions and answers associated with an increasing number of topics) based on any user, customer service representative, automated chat, or the like in communication with the customer service system (e.g., a host device), as shown by the illustration 769 in FIG. 49.

Figure 50:
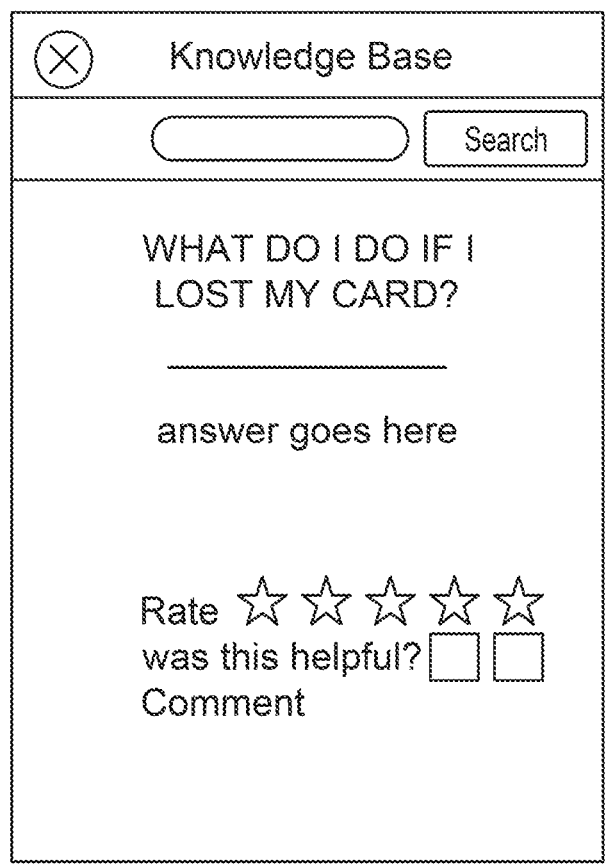

In some instances, the user can start a new conversation (or can resume a conversation) using the automated chat and/or the free form chat (described above). In such instances, the user can, for example, send a communication to the customer service system (e.g., a host device) associated with an immediate request for customer service. In some instances, the communication can be, for example a frequently asked question (FAQ). For example, FIG. 50 illustrates a knowledge base interface 769A. Expanding further, in some instances, the user can use the automated chat to select a button (e.g., a link or the like) associated with a FAQ, "What do I do if I lost my card." In other instances, the user can use the free form interface to send an SMS message and/or record an audio message associated with the FAQ, "What do I do if I lost my card." In response, the electronic device can be configured to display the knowledge base interface 769A that includes the question and an answer to the question. In some embodiments, the answer can be rated based on the relevancy and/or the helpfulness of the answer. In some embodiments, the rating of the answer can be displayed on the knowledge base interface 769A.

Figure 51:
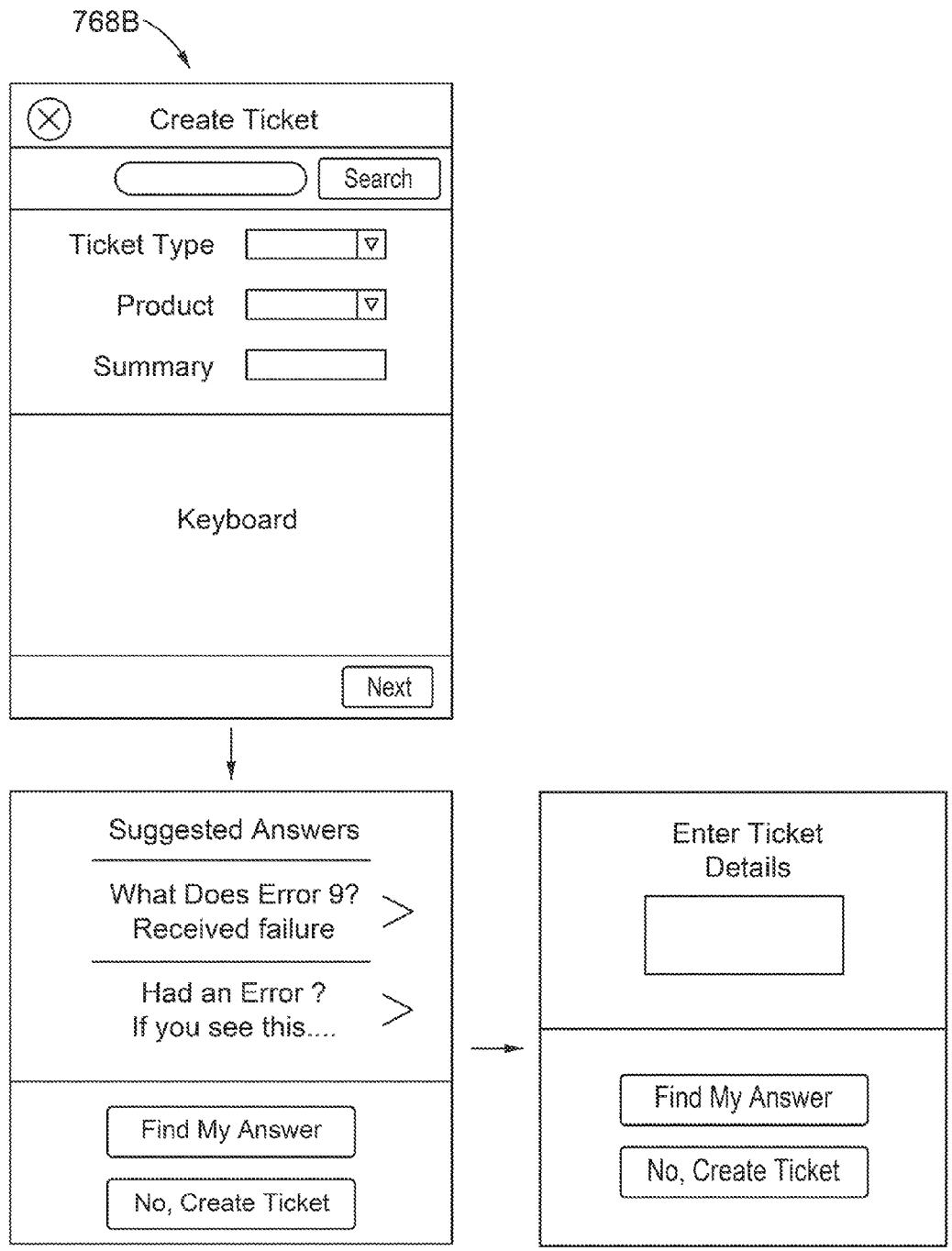
Figure 52:
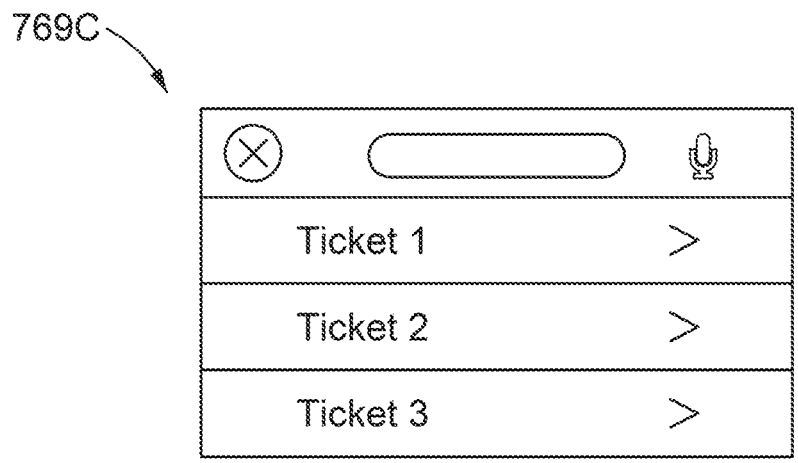
Figure 53:
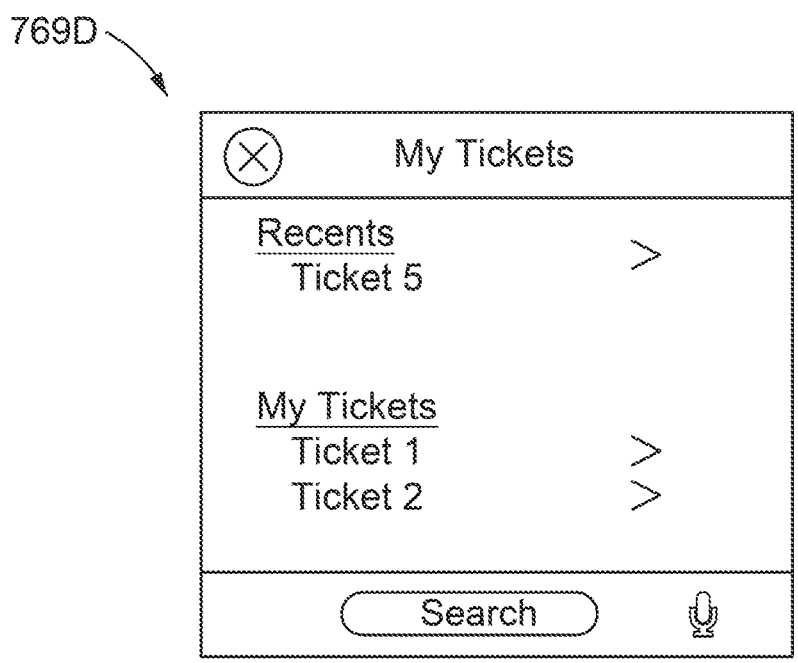

As shown in FIGS. 51-53, the interaction of the electronic device with the knowledge base can produce a ticket associated with, for example, the FAQ. In some embodiments, the automated chat system can integrate with the ticketing system via a data integration gateway (i.e., a standard integration gateway). As shown in FIG. 51 the ticket can include the type of question, the product or process associated with the question, and/or a summary of the question. In some embodiments, the customer service system (e.g., the host device) can send a communication to the electronic device associated with suggested answers to the ticket. In such embodiments, the user can review the answers and select, for example, a "Found My Answer" button or a "No, Create Ticket" button. In some instances, the user can select the "No Create Ticket" button and can be prompted to submit the ticket details. As shown in FIGS. 52 and 53, the electronic device can be configured to display a ticket interface 769C and 769D, respectively. For example, in some embodiments, the ticket interface 769C and/or 769D can be accessible via the My Data interface (described below).

As shown in FIGS. 54 and 55, the electronic device can be configured to display a rating interface 791 and 792, respectively. For example, when a transaction goal is reached or upon completing a customer service transaction such as, for example, finding a useful answer in the knowledge base, the electronic device can display the rating interface 791. In some embodiments, the rating can be based on a 5-star system. In this manner, the user can manipulate the electronic device to select the appropriate number of stars based on the user's experience (e.g., five stars can be associated with a very satisfied rating or the like). In some embodiments, the rating interface 791 can be configured to display a series of short or concise survey (rating) questions. The progress through the rating survey can be tracked.

Furthermore, the rating interface 791 can include a button or link associated with recommending the company or the customer service and a button or line associated with not recommending the company of the customer service. In other embodiments, the electronic device can display the rating interface 792. The rating interface 792 can include a set of selectable portions associated with the user experience (e.g., "Good," "Bad," and "Neutral"). In some embodiments, the rating interface 792 can display a bar graph indicator associated with the selection. In some embodiments, the rating system can be integrated with Facebook® and/or Twitter®. In this manner, the ratings can be posted to a user's Facebook® or Twitter® account and/or a company's Facebook® or Twitter® account.

Figure 56:
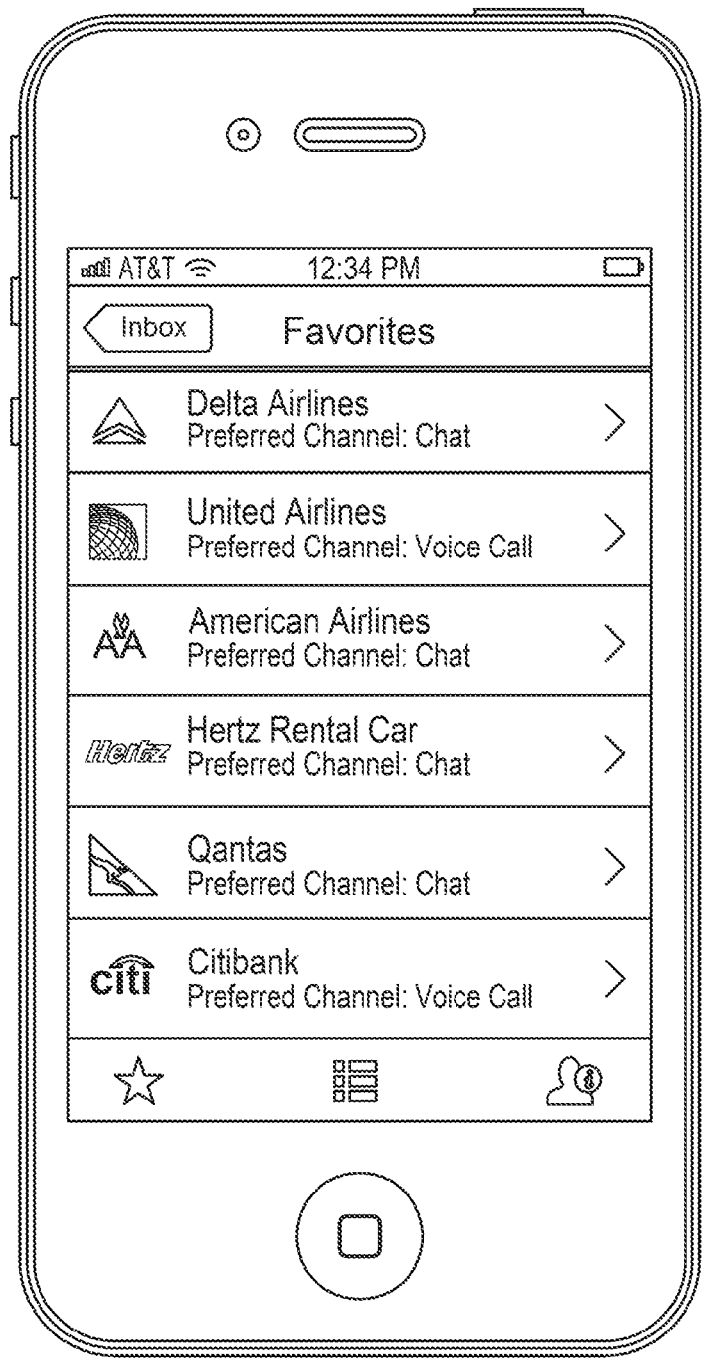

As described above, the inbox 764 (FIG. 26) can include a link, button, icon, or the like associated with a list of favorites (e.g., the favorites portion 683 described above with reference to FIG. 19). For example, FIG. 56 illustrates a favorites interface 783. The favorites list can include, for example, a list of user defined favorite companies (as shown). The list of favorites and/or company information of the favorites can be cached by the memory of the electronic device. In some embodiments, the user can select a company from a directory (described above) to identify the company as a favorite. Moreover, the selecting of the company can be such that the electronic device directs the user to the company screen. In this manner, the user can select a company from the favorites list to open, for example, a company interface, a company website, a company history, or the like. Furthermore, the favorites interface 783 can include a link or button associated with returning to the inbox. In some instances, the user can define the order of the favorite companies and/or can remove a company from the favorite list.

Figure 57:
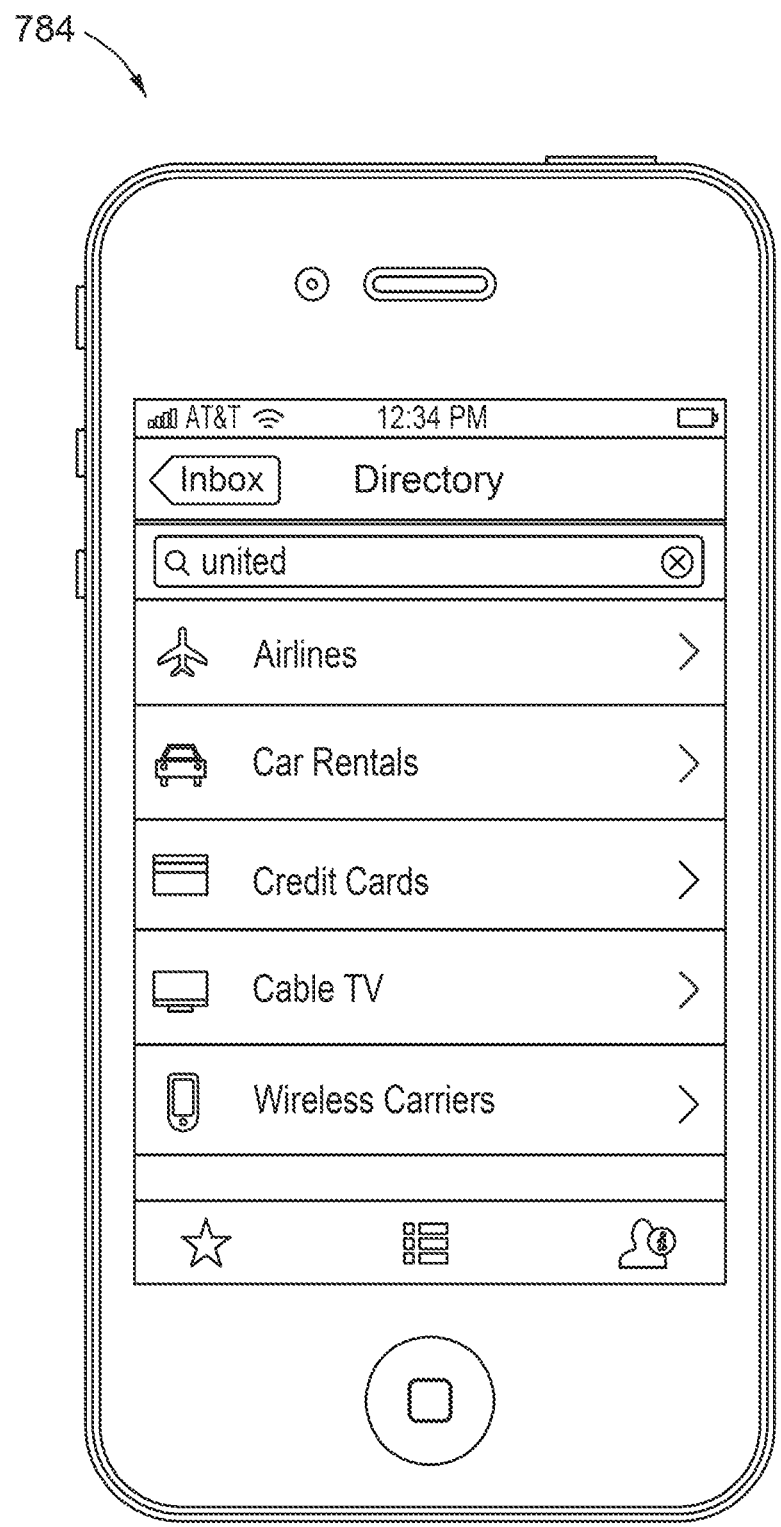

As described above, the inbox 764 can include a link, button, icon, or the like associated with a directory (e.g., the directory 684 described above with reference to FIG. 20). For example, FIG. 57 illustrates a directory interface 784. In some embodiments, the electronic device can display, for example a universal list of companies (e.g., a public list) configured to provide at least a portion of a customer service transaction (e.g., arranged in alphabetical order). In other embodiments, the directory list can include a list of categories. In such embodiments, the companies can be grouped into the categories based on the type of company (e.g., airlines, car rentals, credit cards, cable TV, wireless carriers, or the like). In some instances, the directory interface 784 can be displayed as a scrolling list. In some instances, the displayed list of companies can be based at least in part on the results of a user input search query. In some instances, the user can manipulate the electronic device to select a desired company from the directory interface 784. The user can further select an option to start a conversation and/or to open or display, for example, a company profile (e.g., the company portion 685 described above with reference to FIG. 21).

Figure 58:
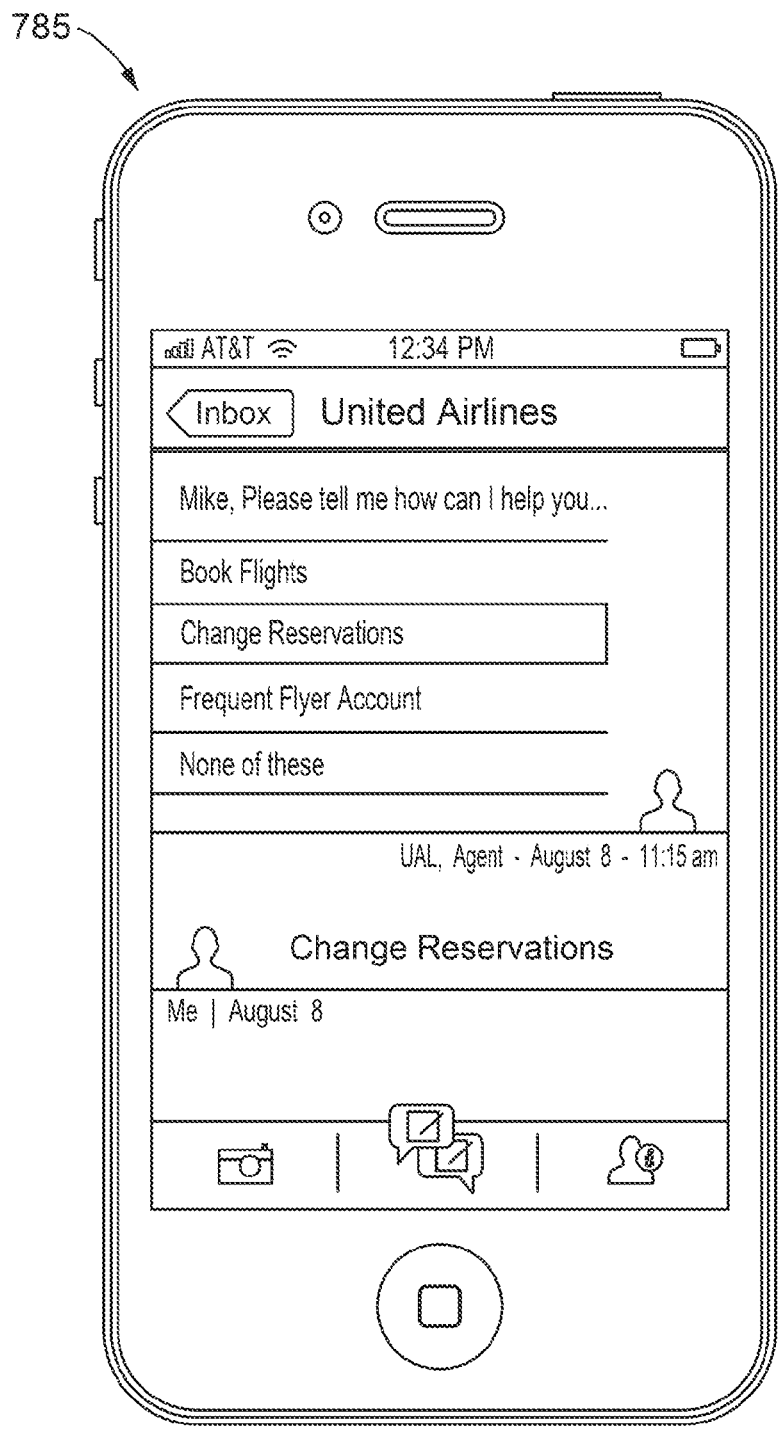
Figure 59:
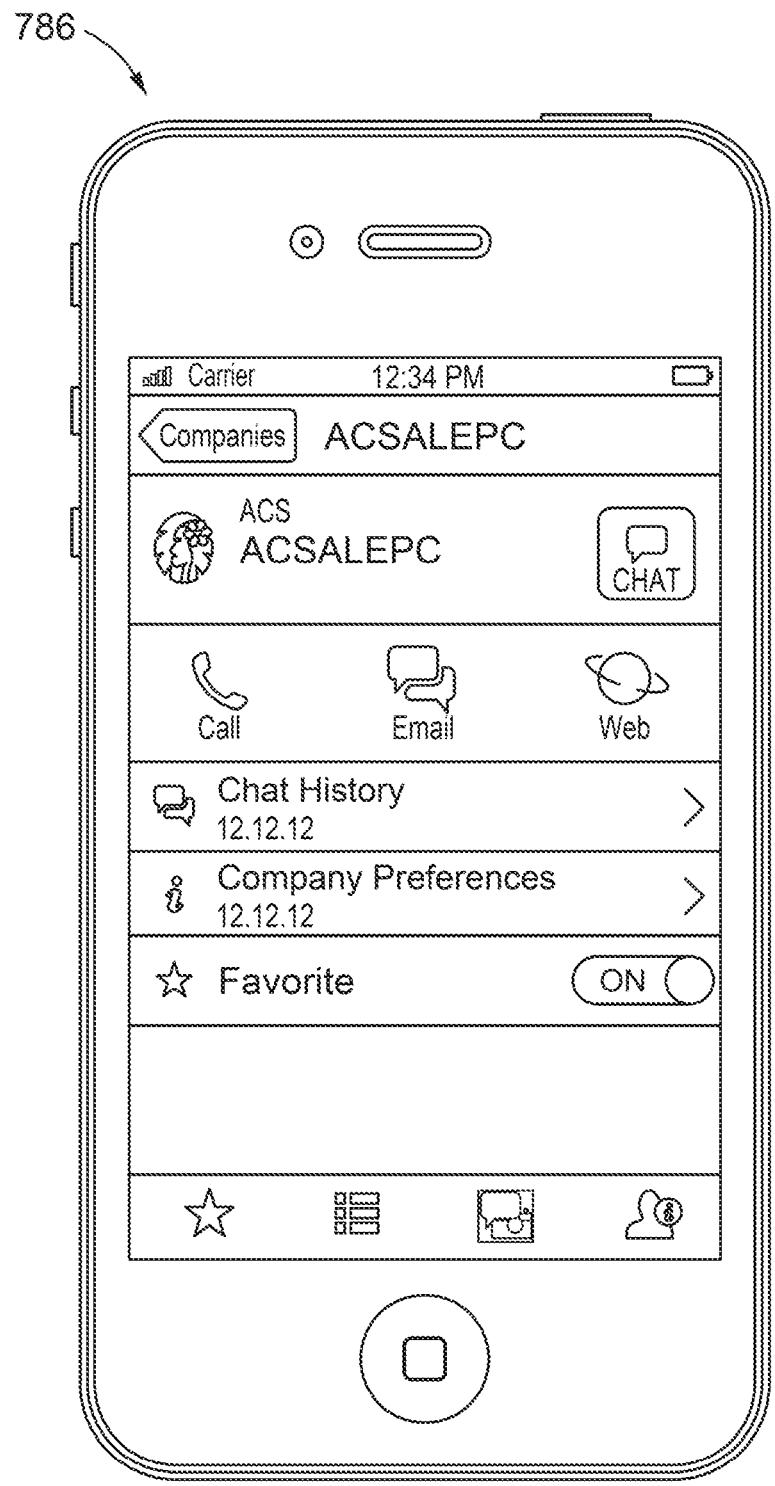

For example, FIG. 58 illustrates a company interface 785 (e.g., the company portion 685 described above with reference to FIG. 21). The company interface 785 can include contact information, location, website links, or the like. In some embodiments, the company interface 785 can automatically update based on information received from the company and/or a host device. The company interface 785 can include a company history associated with any or all conversations between the user and the customer service system. For example, FIG. 59 illustrates a company history interface 786 (e.g., the company history 686 described above with reference to FIG. 22). As shown, the company history interface 786 can include, for example, a chat history link or button, a company preferences link or button, and a favorite toggle. In some embodiments, the company history interface 786 can include a company notification history link or button. In this manner, the user can manipulate the electronic device to select the chat history link to display a persistent record of any or all of the communications to and from the user (e.g., one or more electronic devices associated the user account as described above) and the company. Similarly, the user can manipulate the electronic device to select the preferences link to display a list of preferences associated with the company. Furthermore, the user can manipulate the favorite toggle to define the company as a favorite. In some embodiments, a user can define frequent customer service as a favorite transaction type. In this manner, the user can quickly access the favorite transaction and can, for example, re-execute the transaction.

Figure 60:
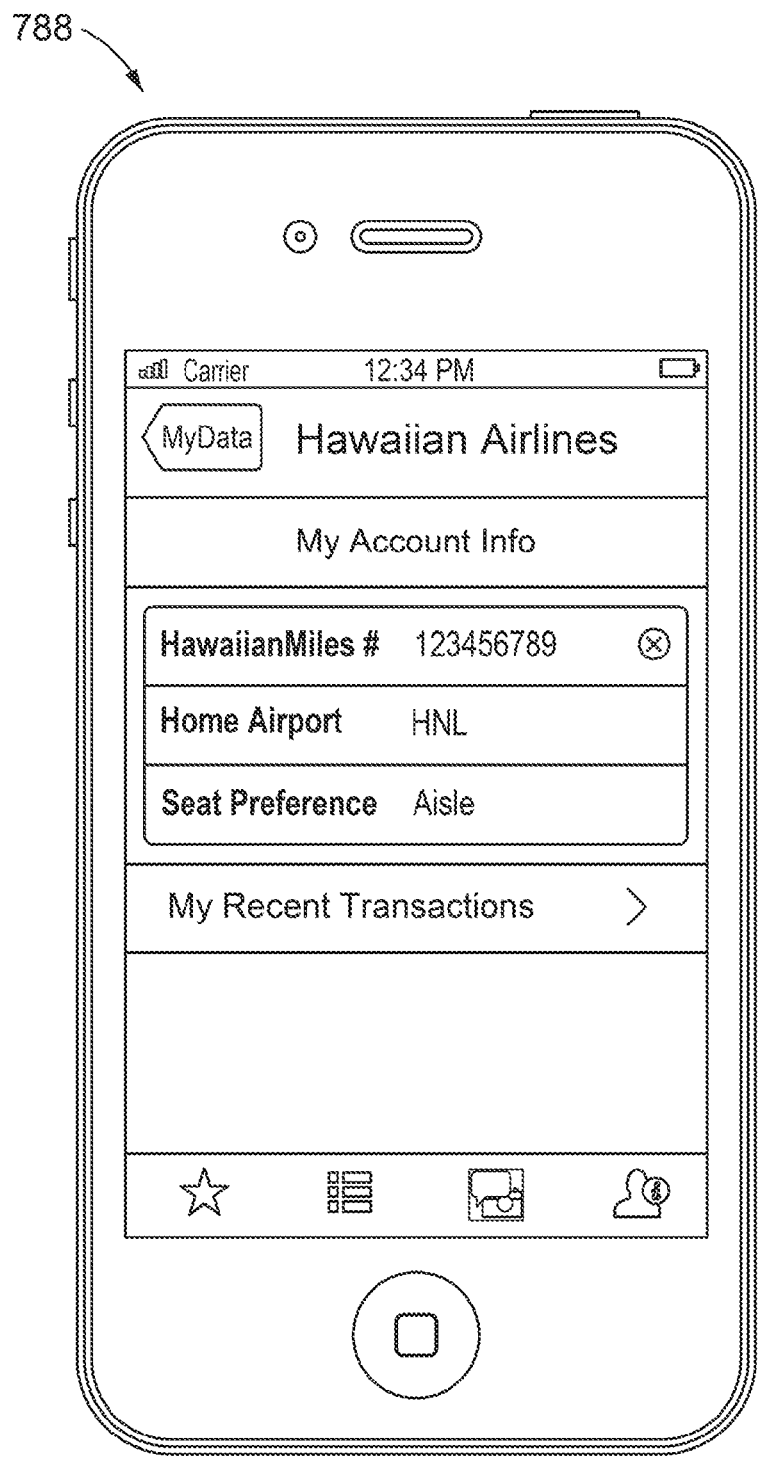

As described above, the inbox 764 can include a link, button, icon, or the like associated with user account data (e.g., the My Data portion 688 described above with reference to FIG. 23). For example, FIG. 60 illustrates a My Data interface 788. In some embodiments, the electronic device can display, for example, a list of companies, profiles, settings, recent transactions, preferences, or the like. In some embodiments, the user can manipulate the electronic device to display profile settings. In some instances, the user can update, change, or remove, contact information, address information, preferred method of contact, preferred hours of contact, preferred payment methods (e.g., credit cards, checking accounts, PayPal, eWallet, Passbook, Google Wallet, or the like), preferred language, social security number, and/or any other identifier. In some embodiments, the profile data can be encrypted for payment card industry (PCI) compliance.

In some embodiments, the My Data interface 788 can include a company preferences portion. In other embodiments, the company preferences can be included in the company interface 785 described above. In some embodiments, users can access or define company preferences to avoid re-entry of information or to personalize automated or agent interactions. In some embodiments, the user can access the company preferences to establish, for example, automatic update schedules. For example, a user can select an update schedule based on a frequency (e.g., once a day, once a week, every 2 weeks, once a month) or predetermined time period (e.g., a start date and an end date). In some embodiments, the user can access the company preferences to establish the notifications received from the company. For example, the user can set a preference to receive a notification when or if there is a low balance, a transfer, or a deposit in an account, when there is a special offer, and/or when business hours open and/or close.

Figure 63:
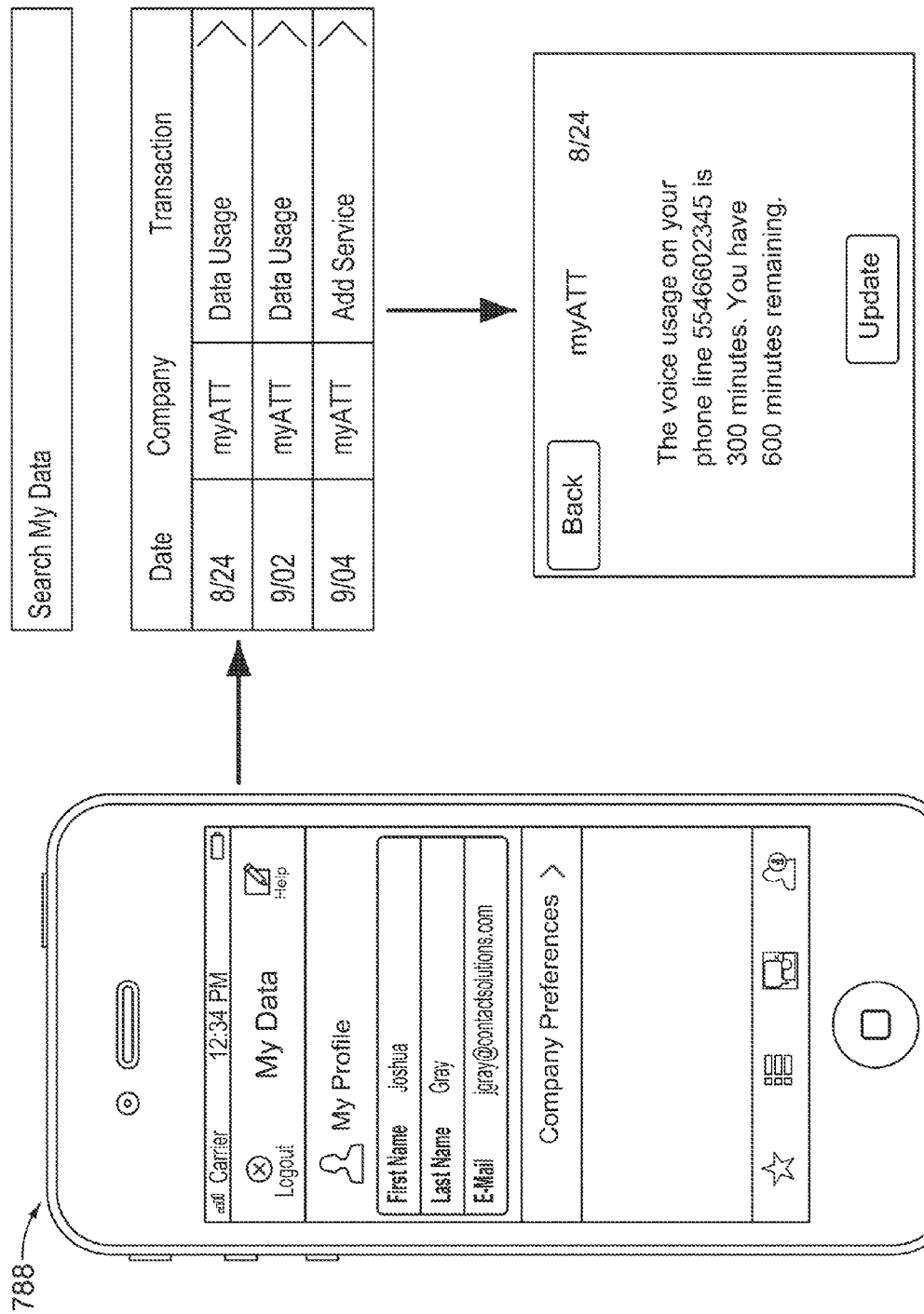

As shown in FIGS. 61 and 62, the user can select a recent transactions portion to display a recent activity interface 790. As shown in FIG. 61, the recent activity interface can include a list of transactions associated with the user account. The transactions can be, for example, categorized by company. As shown in FIG. 62, the user can select a recent activity transaction to resume interface 790A. For example, the resume interface 790A can include a conversation portion. The conversation portion can include a last response (e.g., sent by the customer service system) associated with a completion of the conversation. As shown, the user can select a yes button to end the conversation or a no button to resume the conversation. In some instances, the user can manipulate the electronic device to view information associated with a user account for a given company. As shown in FIG. 63, the My Data interface 788, can display, for example, the remaining monthly minutes for a wireless service.

While the FIGS. 10-23 and the associated screenshots 24-63 illustrate a specific process of using an electronic device to communicate with a customer service system, in other embodiments, a user can communicate with a customer service system in any suitable manner. For example, FIGS. 64-68 illustrate a flow diagram 860 exemplifying a process of using an electronic device to communicate with a customer service system, according to an embodiment. In some embodiments, the process illustrated by the flow chart 860 can be performed and/or executed at an electronic device similar to the electronic device 110 shown and described with respect to FIGS. 1-3. Accordingly, in some embodiments, a processor at an electronic device, similar to the processor 112 shown and described with respect to FIG. 1, can execute instructions that cause the processor to perform the process illustrated by the flow diagram 860. In some embodiments, the flow diagram 860 illustrates a process with a set of instructions that can be stored in a memory (e.g., the memory 114 of the electronic device 110 shown in FIG. 1). In other words, the flow diagram 860 illustrates a process of using a software application that can include a set of instructions executed by a processor. The application can be, for example, an application (e.g., a PC application, a table application, a smart phone application, etc.) and/or internet based. The process illustrated by the flow diagram 860 can be performed as part of a customer service system, such as, for example, a customer service system used for booking an airline flight, online shopping, a technical support platform, and/or any other suitable customer service system. In some embodiments, the process illustrated by the flow diagram 860 can be performed and/or executed at a mobile device (e.g., a smart phone or tablet) similar to the mobile device shown and described with respect to FIGS. 24-63.

In some instances, a user can manipulate the electronic device (e.g., open a mobile application) to begin a customer service transaction. As described above, in some instances, login information can be stored or "remembered." In such instances, the electronic device can be configured to display an inbox or dashboard. For example, in some instances, the electronic device can display an inbox similar to the inbox 764 described with reference to FIGS. 26-28. In other instances, the electronic device can display a dashboard that includes, for example, a list of favorite companies, global preferences, account information, chat history, and/or the like.

Figure 64:
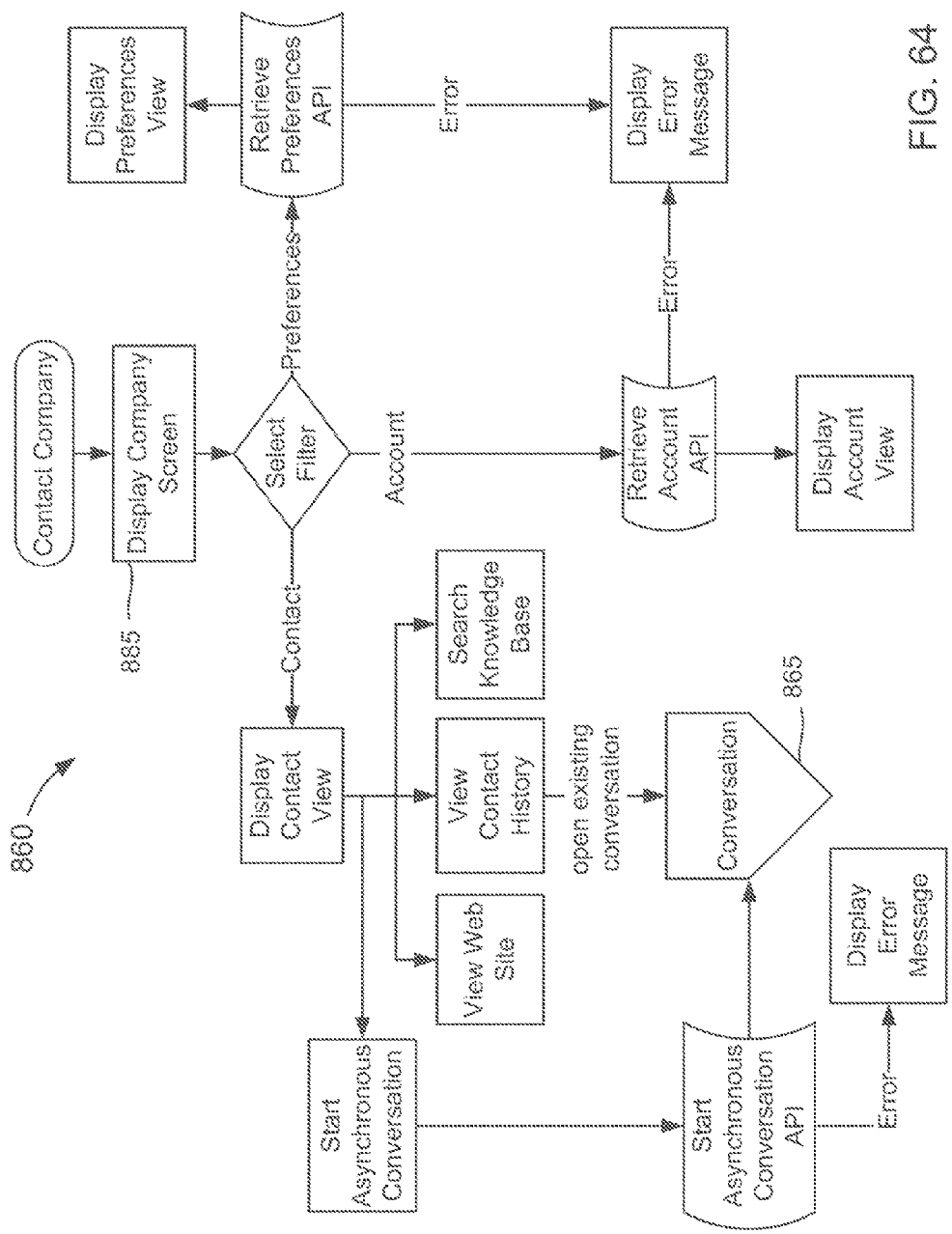
FIGS. 64-68 are flow diagrams exemplifying a process of an electronic device in communication with a customer service system, according to an embodiment.

As shown in FIG. 64, the flow diagram 860 starts when a user selects to contact a company to perform a customer service transaction. In this manner, the electronic device can display a company screen 885. In some embodiments, the electronic device can display, for example, a company profile that can include contact information, location, website links, or the like. The Company screen 885 can also include a contact portion, an account portion and a preferences portion. The account portion can be selected by a user to display company account information associated with the user such as, for example, an account number, billing information, shipping information, and/or the like. The preferences portion can be selected to display a set of company preferences such as, for example, preferred means of communication, preferred display settings, and/or the like. The contact portion can be selected by the user to display an interface to the user associated with self-service options and/or starting an asynchronous conversation. For example, in some instances, the contact interface can include a link (e.g., a button, a hyperlink, an icon, a banner, and/or the like) associated with stating a new conversation, displaying the company's website, displaying a contact history, and searching the knowledge base (as described in detail above with reference to FIGS. 48-53). In some instances, the user can select the contact history link to display a chat history. In some instances, the user can select a desired chat from the chat history to open the existing conversation. In this manner, the user can continue the existing conversation with a customer service representative or agent. In some instances, the user can select the link associated with starting a new conversation 865 (e.g., an asynchronous conversation).

Figure 65:
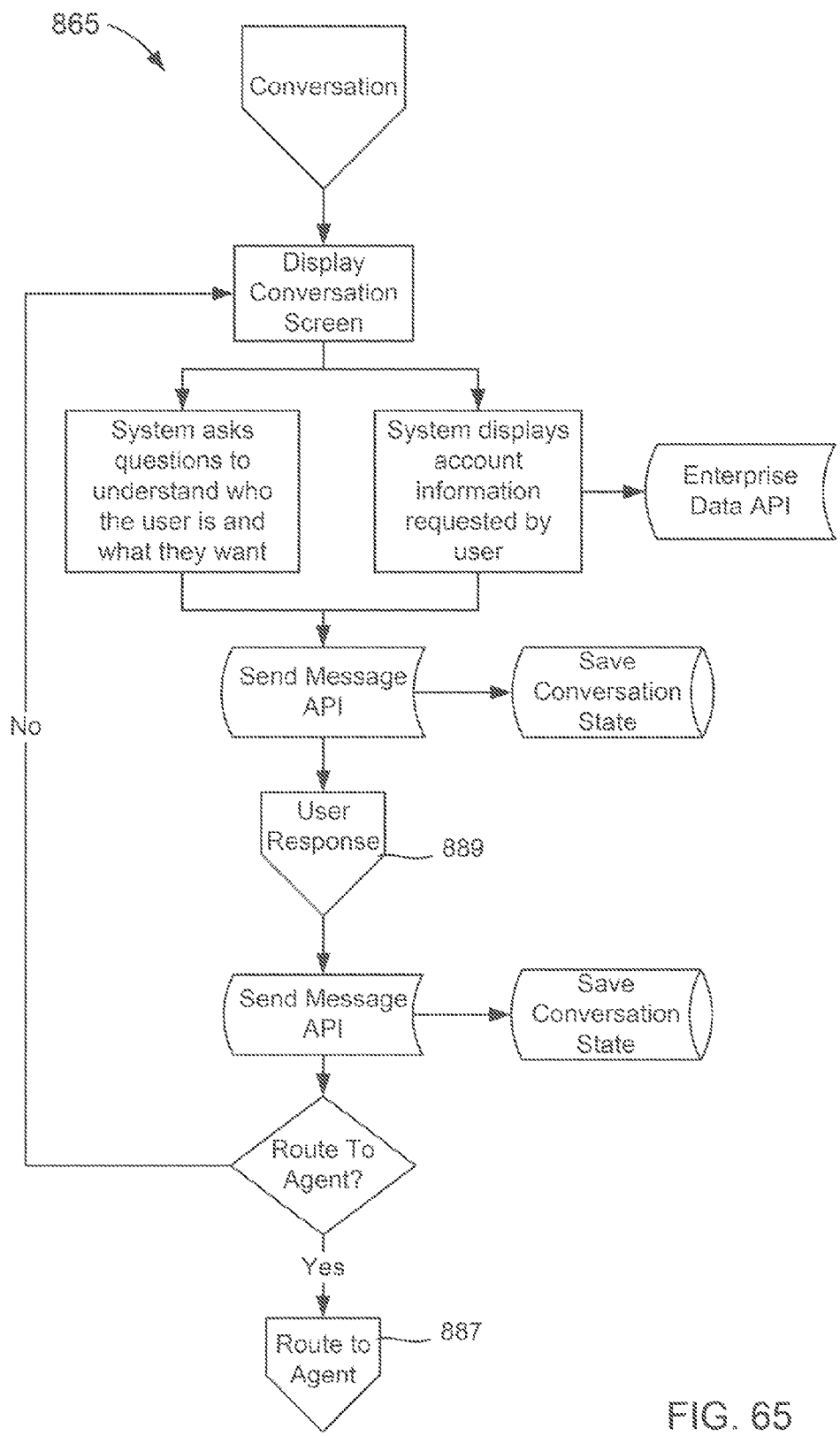

FIG. 65 illustrates the Conversation 865 process. As shown, a conversation screen can be displayed on the electronic device. The conversation screen can include portions, icons, buttons, banners, or the like associated with beginning or resuming a communication (e.g., a conversation) with a host device (e.g., the host device 120 shown in FIGS. 1-3). For example, the conversation screen can display account information requested by the user. In some instances, the conversation screen can display a message from the host device (e.g., an agent using the host device can send the message and/or an automated message can be sent from the host device) associated with user information and/or a desired customer service transaction. With the message sent the conversation state can be saved (e.g., at the electronic device and/or at the host device). A user response 889 to the message can be sent to the response to the host device. The message can include, for example, user information (e.g., identifying information such as the user's name, password, portion of a social security number, and/or the like) and/or a question associated with a customer service transaction.

Figure 66:
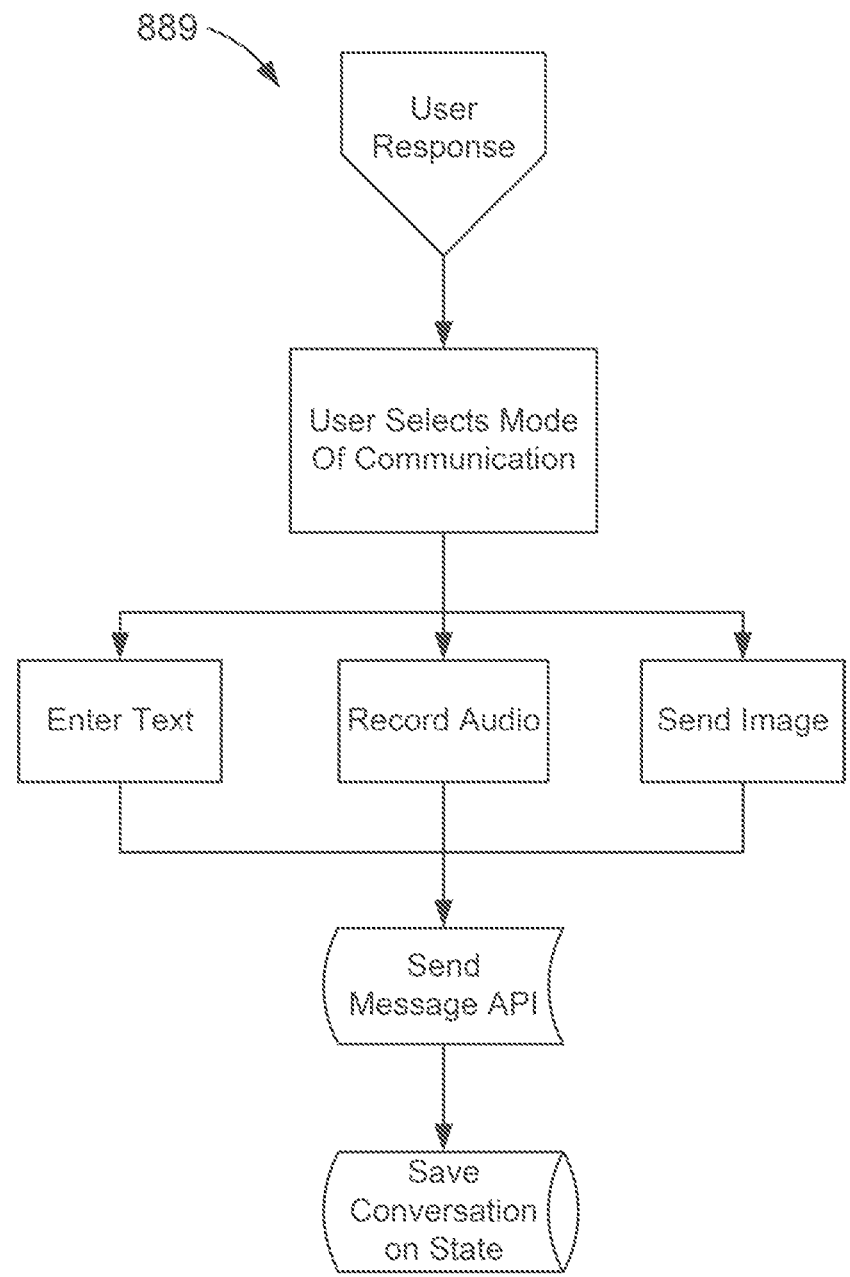

As shown in FIG. 66, the user response 889 can be sent using any suitable communication mode such as, for example, a text message, a multimedia media message (e.g., audio message, picture, and/or video), an email message, or the like (described in further detail herein). With the user response sent to the host device the conversation can again be saved. Thus, if the user is interrupted, the amount of progress through the customer service transaction is saved and can be resumed at a later time (i.e., asynchronous conversation).

Having received the user response 889, the host device can determine that the user would like to be routed to an agent 887. For example, in some instances, based on the content of the user response 889 the host device can route the conversation to an agent (e.g., customer service representative). Conversely, in some instances, the host device can determine that the customer service transaction can proceed using a self-service system and/or using an automated system (e.g., based at least in part on a user preference and/or the content of the user response 889).

Figure 67:
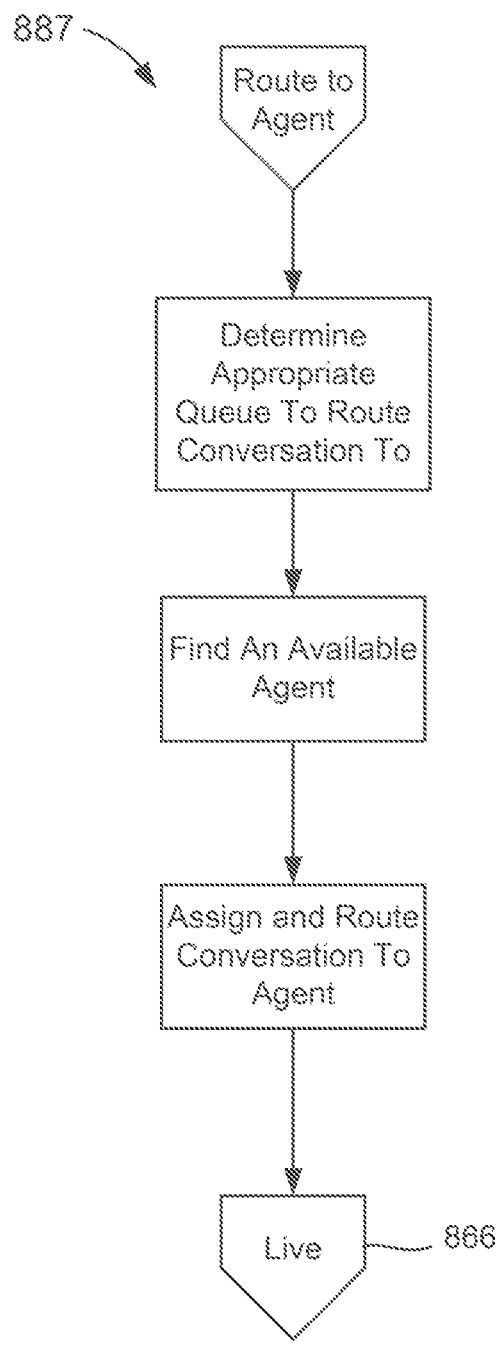

FIG. 67 illustrates a process of routing to an agent 887. For example, a host device (e.g., described in further detail herein) can determine the appropriate queue that the request to be routed to an agent 887 can be routed to. Once in the queue, the host device can determine an available agent and assign, at least temporarily, the agent to the conversation. Thus, a live chat 866 can be started between the user of the electronic device and the agent using the host device.

Figure 68:
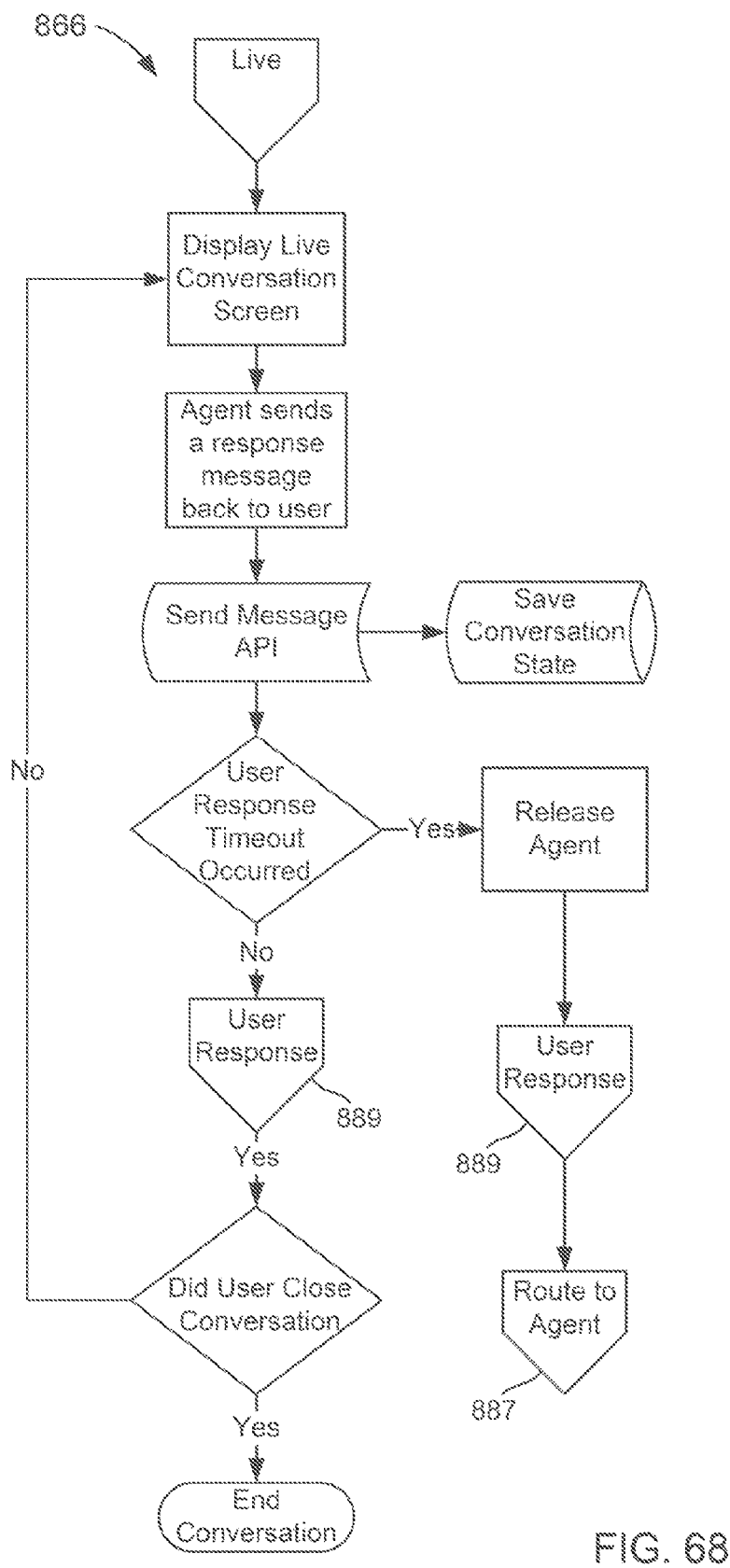

FIG. 68 illustrates the live chat 866 process. With the selection of a live chat 866, the electronic device can display, for example, a conversation screen displaying a persistent record of any or all communications to and from the electronic device (e.g., previous chats, voice messages, or the like). Moreover, the agent can send a message to the electronic device associated with a response to the user response 889. With the message sent to the electronic device, the conversation state can again be saved (e.g., at the electronic device and/or at the host device). The message from the agent can be sent in any suitable communication mode. For example, the agent can review a list of user preferences and send the message using a communication mode based at least in part on the user preference. In some instances, the agent can send the message using the same communication mode used by the user response 889.

In some instances, the company, the host device, and/or the agent can define a predetermined time period associated with a user response timeout. Said a different way, if the agent does not receive a user response within the predetermined time period, the user response times out. In such instances, if the predetermined time period is reached, the agent can be released from the conversation (e.g., the host device can release and/or reassign the agent). As described above with reference to FIG. 67, when the user sends a user response 889 to the message from the agent, the host device can again route the conversation to an agent 887. Thus, the agents can provide an asynchronous customer service to the user based at least in part on receiving a user response 889. Moreover, the routing, releasing, reassigning, etc. of the agents using the host device is transparent to the user (e.g., the user is not aware of the routing, releasing, reassigning, etc.).

In some instances, the user response 889 can be within the predetermined time period. In this manner, the user response 889 can be sent to the host device and the conversation state can again be saved. Furthermore, the conversation screen can be updated with the user response and the agent can send a message in response to the message from the user (e.g., the user response 889). Thus, the customer service transaction is performed using a live chat 866 between the user and the agent. While not shown in FIGS. 64-68 at any time during the customer service transaction, the user can select to place a telephonic call to the agent. In this manner, the conversation can be continued using a telephonic communication mode (described above, for example, with reference to FIGS. 29-33).

Referring now to FIGS. 69-75, a host device (e.g., the host device 120 described above with reference to FIGS. 1-3) can be engaged by a customer service agent to communicate with an electronic device, as described above. The host device can be any suitable device configured to include an application (e.g., an application is stored in the memory) that can communicate with one or more electronic devices over a network. In this manner, a customer service agent can engage the host device to interact with the application.

Figure 69:
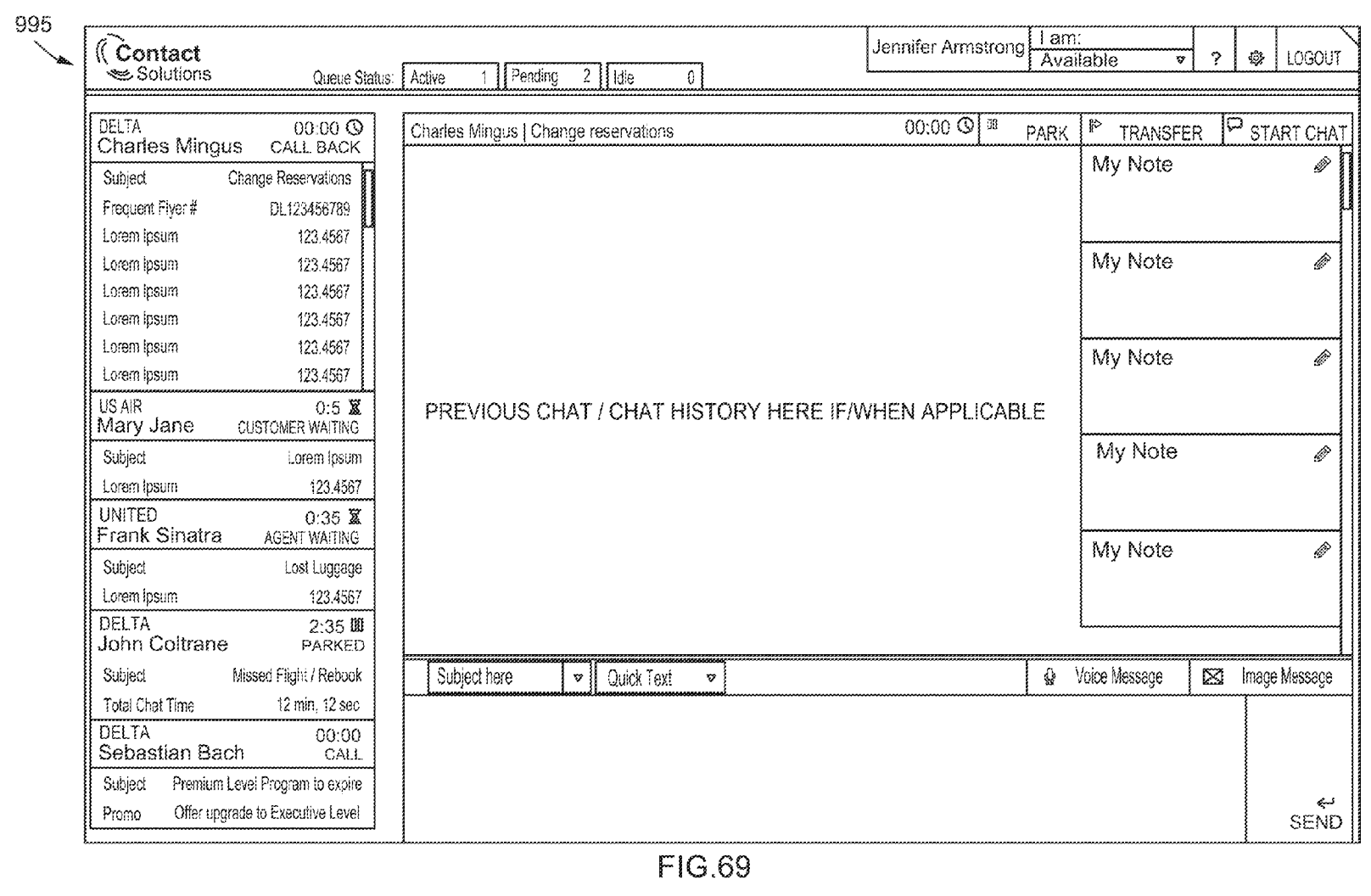
Figure 70:
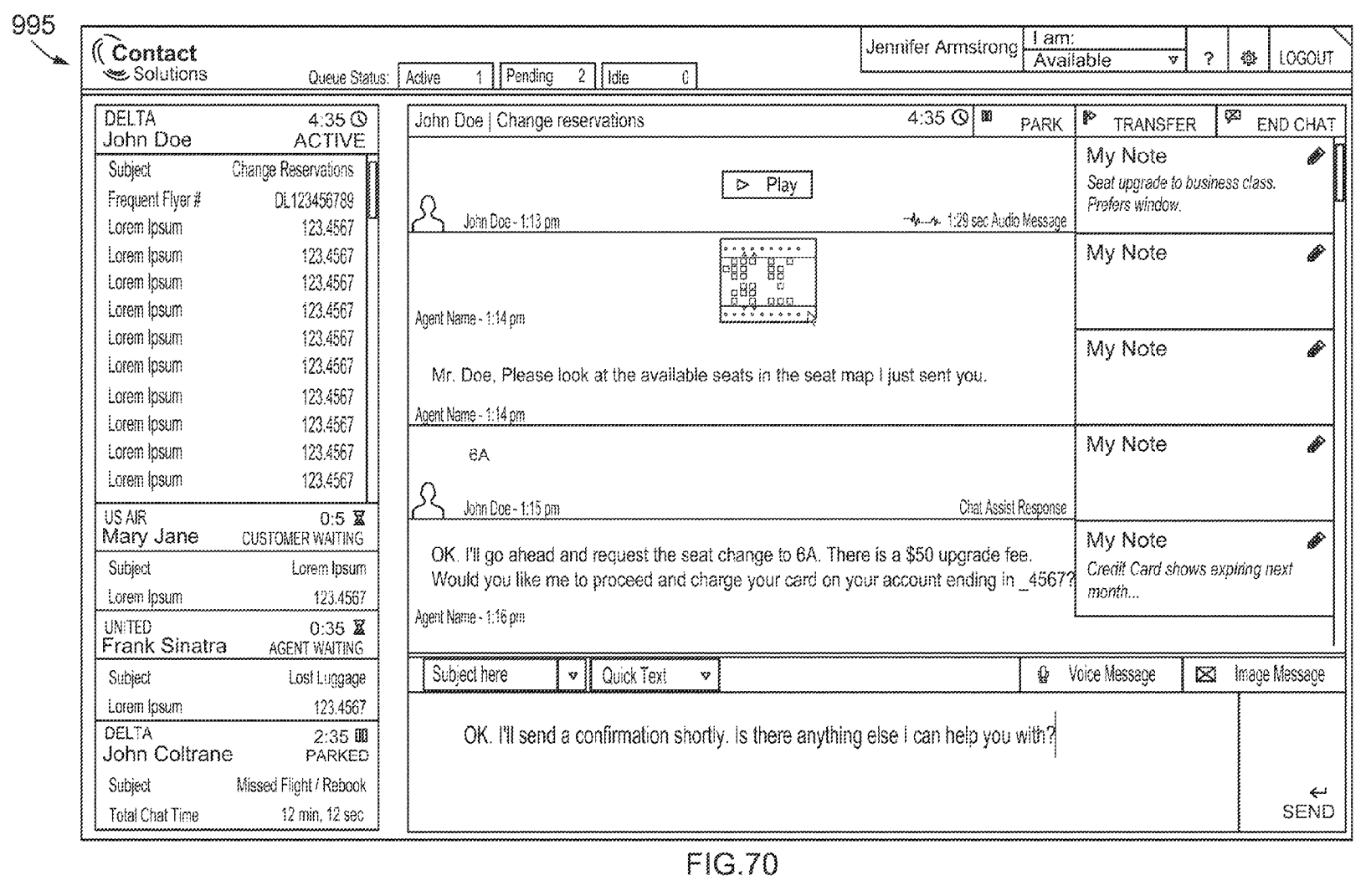

For example, as shown in FIG. 69, the application can display an agent desktop browser 995. In such embodiments, the agent desktop browser 995 can be configured to include one or more portions associated with any given category or process of a customer service communication. For example, in some embodiments, the agent desktop browser 995 can include a portion associated with a list of active chats, chats waiting on a customer, chats waiting on the agent, and/or inactive chats. Moreover, the agent desktop browser 995 also includes a conversation portion, an input portion, and a notes portion. As described above with reference to the conversations 765 discussed above, the conversation portion of the agent desktop browser displays a persistent list of any or all the communications between the agent and a user account, regardless of time differences and/or regardless of receiving communications from more than one electronic device. For example, the agent can select a conversation associated with a user account from the active chats list such that any or all communications between the agent and the user account are displayed, as shown in FIG. 70. Similarly, the notes portion can include any suitable note made by the agent associated with a user account.

Figure 71:
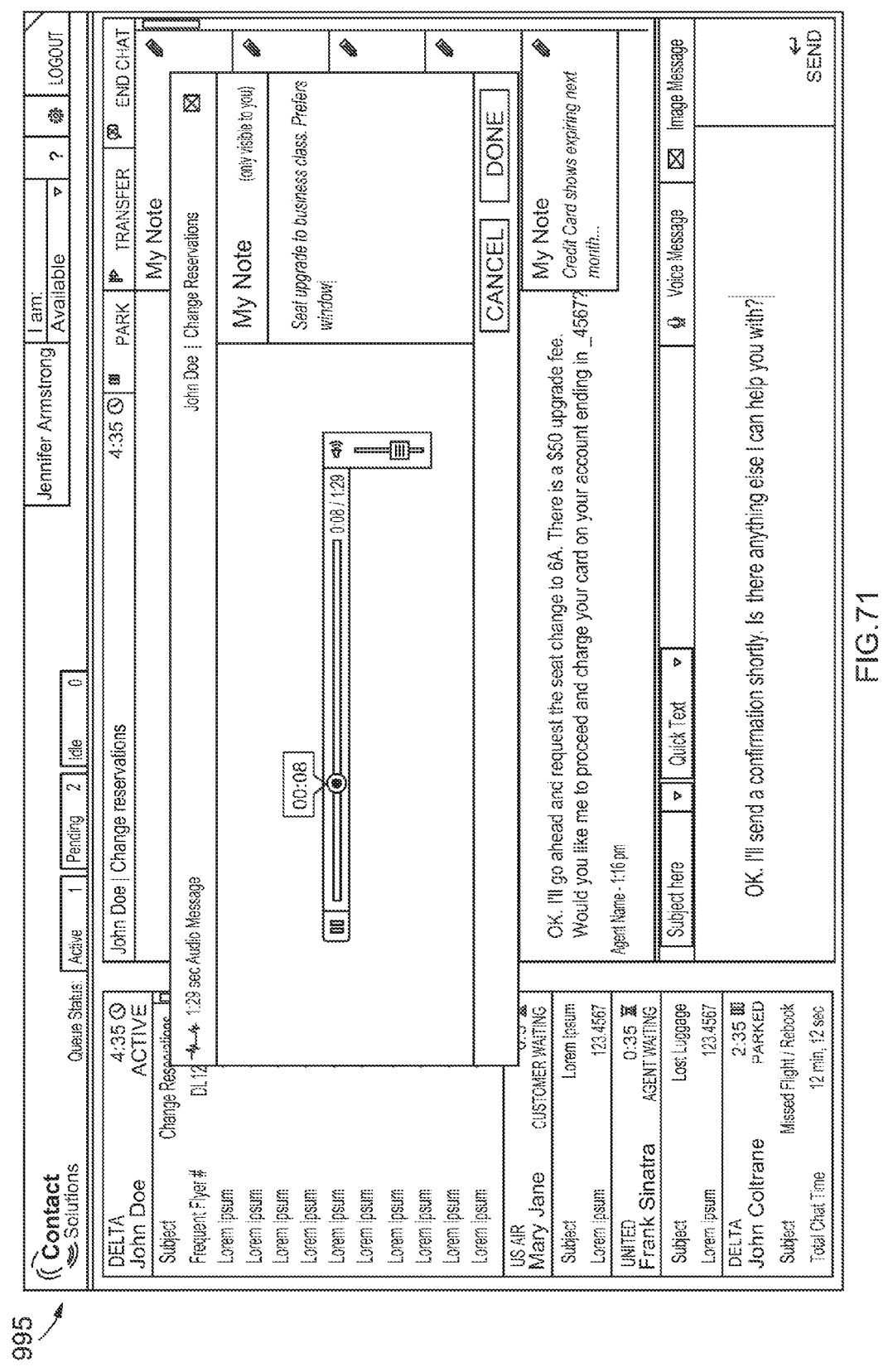
Figure 72:
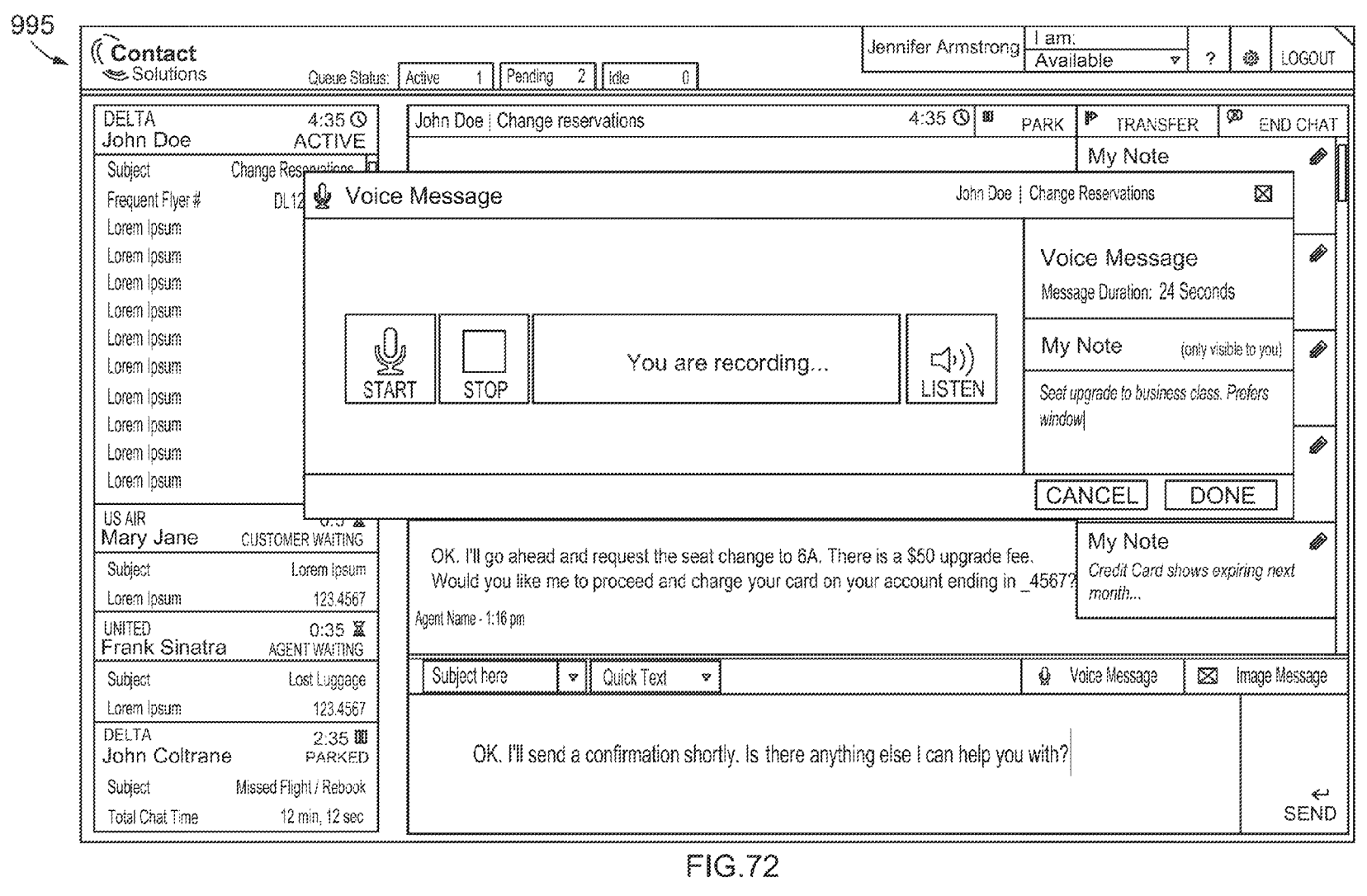
Figure 73:
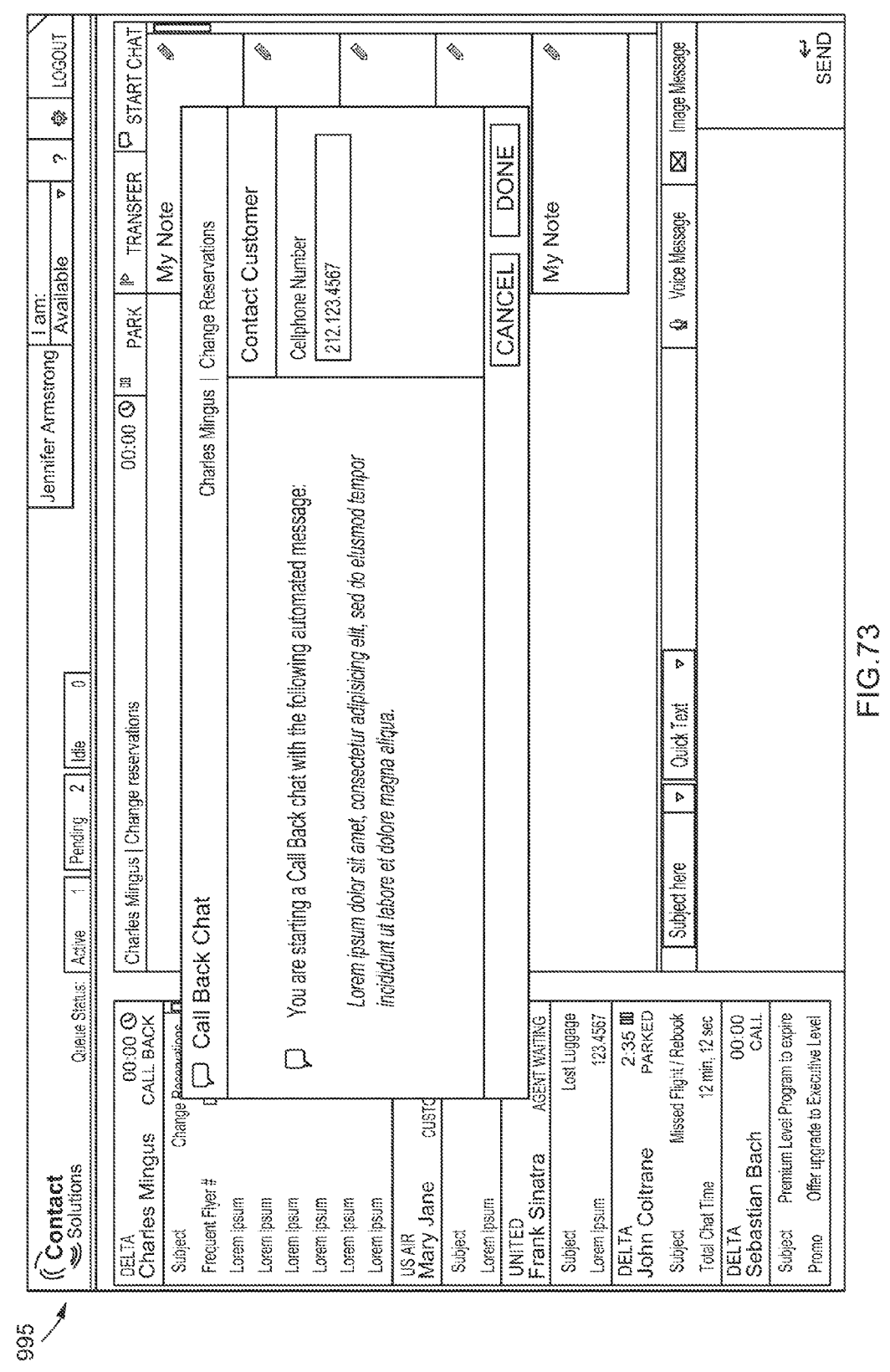
Figure 74:
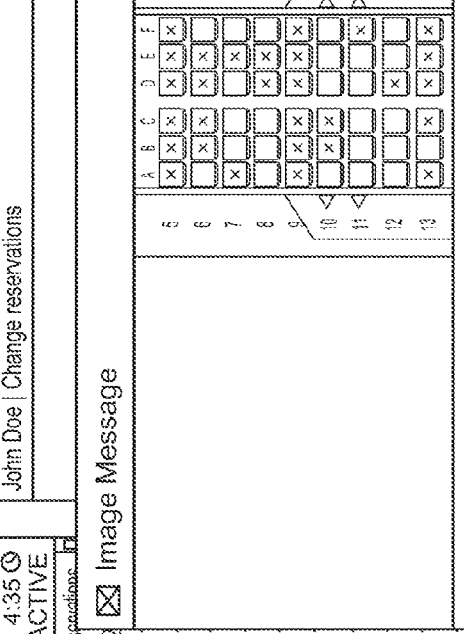
Figure 75:
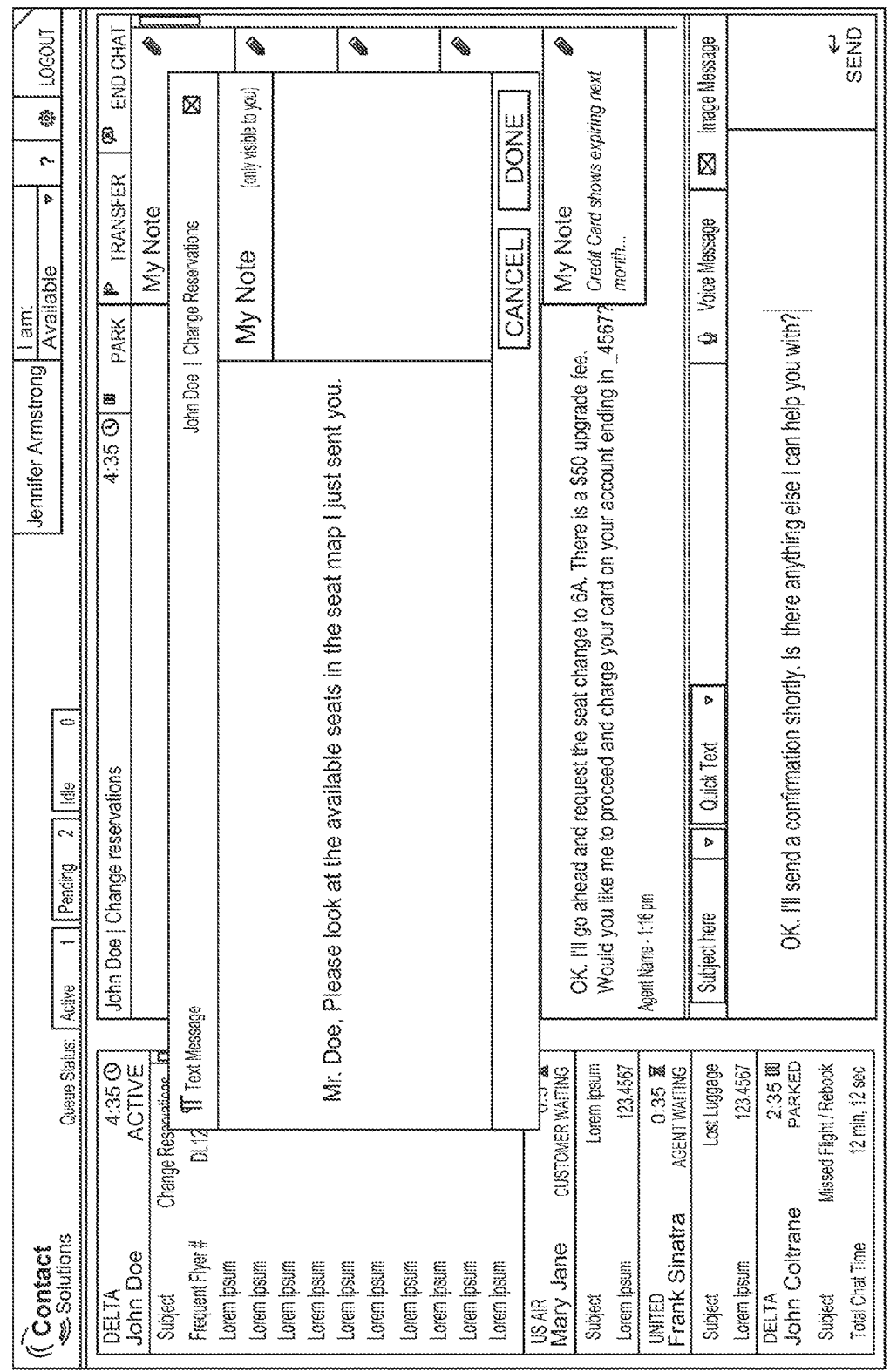

The input portion is configured to provide a user interface with which the agent can input a response to a communication sent from a user account. For example, in some instances, the agent can input a response in text to be sent to the user account (e.g., via SMS, email, instant messaging, etc.). In some embodiments, the agent can select the method of delivery based at least in part on a user preference. For example, a user can define a preference associated with receiving responses via a SMS message. In other embodiment, the response mode (e.g., text, voice, image, etc.) can be based at least in part on the previous communication mode received from the user account. For example, as shown in FIG. 71 the user can send a communication, from an electronic device, associated with or comprised of an audio recording. In such embodiments, the agent can play the audio recording and can take an action based at least in part on the audio recording. Moreover, as shown in FIG. 72, the agent can select a voice message link or button to record a response to the communication using the same communication mode (e.g., voice recording). In some embodiments, the response to the communication can be an automated message. For example, in some instances, an agent can record a message template associated with a frequently asked question. In such instances, the agent can receive an audio communication from the user associated with the message template. Thus, the agent can select and send the automated message in response to the communication from the user. As shown in FIGS. 73-75, in some embodiments, the agent desktop browser 995 can display a preview of a response prior to the response being sent to the user. In this manner, the agent can provide a customer service to active users included in the active chat portion.

As described above, the embodiments and methods herein can be employed on a mobile device such as, for example, an iPhone, an iPad, an Android device, a Windows Phone, or other tablet PC. In such embodiments, the systems described herein can be included in a mobile application configured to be run on such mobile device. In some embodiments, a third party application using an application programming interface (API) can be used by a user to interact with (e.g., view, update, add to, remove from, edit, and/or otherwise communicate with) the host device and/or specific customer service system. For example, a social networking site can use an API to access a portion of a user's information and to present the portion in the social networking site. Such an API provides integration of a customer service into other systems, programs, applications, websites, and/or the like.

In this manner, the electronic device can include an application icon displayable on, for example, a home screen or desktop. In some embodiments, the application can include a notification system alert the user of the electronic device to changes or updates associated with the customer service system. For example, the icon can display an indicator that can be incremented for each unread message (e.g., by using an API). Thus, the application can display notifications when new messages have been created by agents that are waiting to be downloaded. In some embodiments, messages and/or notifications can be pushed to the electronic device. In some embodiments, the messages and/or notifications can be fetched. In some embodiments, a notification banner can be displayed if the application (also referred to herein as "app") is running in the background, if the app is in foreground, but the associated conversation is not active. A notification banner can be suppressed if the app is in foreground, and the associated conversation is active. In some embodiments, the app can logout the user after a predetermine time period. In some embodiments, setting from the application (e.g., preferences) can be accessible in the settings menu of the electronic device.

In some embodiments, the app can track usage sessions starting when a user authenticates with a PIN and ending when the app is closed or moved to background. In some embodiments, the app can send undelivered usage session data to a host device when the app is sent to background. In some embodiments, the app can track errors related to connectivity and send error data to the host device when connectivity is re-established.

In some embodiments, a user can manipulate an electronic device (e.g., a mobile device) in an offline mode. In such embodiments, the electronic device may not receive a wireless signal or cellular signal sufficiently strong to connect to the customer service system (e.g., below a given bandwidth threshold). For example, in some instances, a mobile device can detect if there is no signal and no Wi-Fi connection (includes airplane mode). In some instances, a mobile device can ping a Mobile Gateway to detect poor bandwidth (e.g., response time). In some embodiments, all buttons that result in an API call or chat message are disabled and greyed out. In some embodiments, the user can manipulate the electronic device to access all personal data. In some embodiments, a user can leave a message in a general queue. In some embodiments, the user can manipulate the electronic device to view, for example, a user's favorites, favorite companies' contact information, favorite companies' transaction data, or the like. In some embodiments, the user can view the top 20 inbox conversations with preview. In other embodiments, the user can view all inbox entries that are not archived. In some embodiments, a user can view the last 20 messages in a conversation. In some embodiments, software development kits (SDK) can return codes to indicate when the electronic device is placed in an online mode.

In some embodiments, the systems can include any suitable performance and/or aesthetic feature. For example, in some embodiments, a home button need not require re-retrieval of information, whether application is minimized or maximized. In some embodiments, a working spinning icon is presented when accessing backend data. In some embodiments, chat messages are not scrolled across the window, as they are loaded. In some embodiments, active conversations are cached on the device. In some embodiments, whole conversations are not re-retrieved, rather only the next message need be retrieved.

In some embodiments, the systems described herein can be configured to gather information based on a user's behavior, preferences, or the like. Moreover, the systems can gather information associated with the effectiveness of a customer service transaction. For example, in some embodiments, the system (e.g., a host device) can integrate and capture task, goals and interaction points into automation. In some embodiments, the host device can determine a user performance rating (UPR) during automation. In some embodiments, the host device can determine a success index and/or a navigation index. In some embodiments, the host device can include, for example, adaptive playback control (APC), dynamic application smoothing (DAS), alternative message content (AMC), adaptive timeout control (ATC), best modality signaling (BMS), and/or proactive transfer alert (PTA) systems. In some embodiments, the host device can include an adaptive audio system such as, for example, those described in U.S. patent application Ser. No. 11/211,875, entitled "Adaptive Communication System," filed Aug. 26, 2005, Ser. No. 11/781,255, entitled "Adaptive Accent Voice Communication Systems," filed Jul. 22, 2007, Ser. No. 12/171,196, entitled "Advanced Adaptive Communication System," filed Jul. 10, 2008, and Ser. No. 12/475,681, entitled "Adaptive Human Computer Interface," filed Jun. 1, 2009, the disclosures of each of which is incorporated by reference herein in its entirety.

In some embodiments, the host device can perform a sentiment analysis (e.g., voice biometrics or the like) of the user during conversations with agent and/or prior to transferring to the agent. In some embodiments, the host device can determine changes in sentiment with particular agents and/or with interaction points in the automation flow. In some embodiments, the host device can perform text analytics to determine tasks and goals at interaction points during agent conversation.

In some embodiments, the host device can be configured to predict a user's preferences based at least in part on a user's behavior. For example, based at least in part on previous user behavior, the host device can be configured to personalize specific menus offered personalize specific inputs. In some embodiments, the host device can be configured to determine and store the effectiveness of the predictions. In some embodiments, the host device can predict and personalize menu options based on predefined user profiles. In some embodiments, the host device can be configured to predict and personalize menu options based on time of month or year. In some embodiments, the host device can be configured to predict and personalize menu options based on location. In some embodiments, the host device can be configured to predict and personalize notification recommendations based on transactions executed.

In some embodiments, additional information associated with a user can be sent to a host device when that user sends a process ID (or other messages) to the host device. For example, an indication of a geographic location of the user can be sent to the host device with a process ID. Such a geographic location can be determined using, for example, a GPS module of a communication device and/or any other suitable method. The host device can use the geographic location of the communication device to authenticate a user, to provide recommended products, services, coupons and/or promotions to a user, to verify that a user meets requirements for a particular promotion (e.g., must be in a specific geographic area to participate in a promotion), and/or the like. In other embodiments, any other information (e.g., time of day, day of week, purchase history, website history, etc.) can be sent to the host device when a user sends a process ID (or other message) to the host device.

In some embodiments, based on a user's interaction/transaction with a particular application, advertisements or offers that are based on and relevant to the transaction can be presented to the user. For example, if a user books a plane ticket, the user may receive offer(s) for rental car deals in the user's destination city. Similarly, the user may receive advertisements or offers from restaurants, hotels and/or other services in the destination city. In some embodiments, the user may receive deals from local taxi cabs or car services at the origin city. All of the information relevant to the user's travel planning is stored in the user's profile such that additional transactions can be completed with relative simplicity in an asynchronous manner.

If the user were to take advantage of the hotel offer, the user would not need to enter his or her credit card number, contact information, etc. Additionally, if the user was a frequent guest or rewards member of that particular hotel, such information would already be part of the user's profile and would not have to be separately provided. In some embodiments, the provider of the application (e.g., the owner of the database 128, described above) could receive compensation based on offers/advertisement through which a user makes a reservation or orders a particular product or service.

In some embodiments, because the user's information is aggregated in a single location, including the user's historical preferences and on-going interactions can be used in various situations. In some embodiments, if a user purchased an airline ticket through the system, if the flight is delayed or canceled, the user may receive a message indicating alternative flight options. As such, the user can re-book his flight at his convenience, and additional services (e.g., rental car, hotel, car service) will automatically be updated accordingly. In some embodiments, the user can receive messages from the additional service providers seeking confirmation of the modification. In some embodiments, if the user purchased, for example, tickets to a sporting event, but then modified their flight schedule such that the user was no longer able to attend the event, the user could receive a message asking if they would like to seek alternative events and/or if they would like to post their original tickets for sale on a ticket reseller site.

In some embodiments, the system learns the user's preferences and responds accordingly. For example, if each time a user interacts with the system, he first opts to book flights between Washington, D.C. and San Francisco, each time the user returns to the system he can be presented with the option to do so.

The system described herein can be implemented such that it is an aggregator for an unlimited number of customer service sites. In other words, the user's personal information that is stored through the system is linked to other sites. All of the various customer service options a user may need (e.g., airlines, hotels, rental cars, home improvement, groceries, restaurants, etc.) can be consolidated in a single location. In some embodiments, a user is presented with an unlimited number of potential providers.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

What is claimed:

1. A method, comprising:
receiving at a host device a first communication associated with a user interaction and sent from at least one electronic device from a plurality of electronic devices, the host device including at least a memory, a processor and a database, the first communication being received at a first time via a first communication mode of the at least one electronic device;
sending, from the host device to the at least one electronic device at a second time, a response to the first communication, the second time being later than the first time and independent of the first time;
receiving at the host device a second communication associated with the user interaction and sent from the at least one electronic device, the second communication being received at a third time, the first communication, the response to the first communication, and the second communication being displayable on at least one of the host device or the at least one electronic device in a persistent record of the user interaction regardless of a difference between the first time and the third time,
wherein the receiving the second communication includes receiving the second communication via a second communication mode of the at least one electronic device different from the first communication mode;
receiving a third communication associated with the user interaction, the third communication being received from a second electronic device from the plurality of electronic devices, the third communication being displayable in the persistent record of the user interaction on at least one of the host device or the at least one electronic device; and
receiving a fourth communication from a third electronic device from the plurality of electronic devices, the fourth communication being unrelated to the user interaction, the fourth communication being displayable in a record different than the persistent record of the user interaction.

2. The method of claim 1, wherein the sending the response to the first communication includes sending the response using at least one of the first communication mode, the second communication mode or a third communication mode different from the first communication mode and the second communication mode.

3. The method of claim 1, wherein the first communication mode is one of a voice message, an SMS message, text message, an e-mail or an instant message.

4. The method of claim 1, further comprising completing the user interaction at a fourth time, later than the third time and independent of the first time, the second time or the third time.

5. The method of claim 1, further comprising receiving identification information associated with the at least one electronic device.

6. The method of claim 1, wherein the first communication is associated with a first step of the user interaction, the second communication is associated with a second step of the user interaction, the memory configured to store the first communication and the second communication, the user interaction being a customer service transaction.

7. The method of claim 1, wherein the database includes data associated with the at least one electronic device, the database accessible to authenticate the at least one electronic device.

8. The method of claim 1, wherein the user interaction is completed asynchronously.

9. The method of claim 1, further comprising routing the first communication based at least in part on a content of the first communication.

10. A method, comprising:
sending from an electronic device to a host device a first communication associated with a first customer service transaction at a first time;
receiving at the electronic device from the host device a response to the first communication at a second time later than the first time and independent of the first time;
sending from the electronic device to the host device a second communication associated with the first customer service transaction at a third time, the first communication, the response and the second communication being displayable on at least one of the host device or the electronic device in a persistent record of the first customer service transaction regardless of a difference between the first time and the third time,
wherein the first communication is sent via a first communication mode of the electronic device and the second communication is sent via a second communication mode of the electronic device different from the first communication mode; and
sending from the electronic device to the host device a third communication associated with a second customer service transaction, the third communication being displayable in a record of the second customer service transaction different from the persistent record of the first customer service transaction.

11. The method of claim 10, wherein the first customer service transaction is completed asynchronously.

12. The method of claim 10, wherein the first communication is based on a pre-defined message presented on the electronic device.

13. The method of claim 10, further comprising storing data associated with the first customer service transaction and the second customer service transaction, the data accessible after the first customer service transaction and the second customer service transaction are completed.

14. The method of claim 10, wherein the response is based at least in part on one of a profile, a behavior, or a preference associated with a user of the electronic device.

15. A non-transitory processor-readable medium storing code representing instructions to cause a processor to:
receive at a host device a first communication associated with a transaction and sent from at least one electronic device from a plurality of electronic devices, the host device including at least a memory, a processor and a database, the first communication being received at a first time via a first communication mode of the at least one electronic device;
send, from the host device to the at least one electronic device at a second time, a response to the first communication, the second time being later than the first time and independent of the first time;
receive at the host device a second communication associated with the transaction and sent from the at least one electronic device, the second communication being received at a third time, the first communication, the response to the first communication, and the second communication being displayable on at least one of the host device or the at least one electronic device in a persistent record of the transaction regardless of a difference between the first time and the third time,
wherein the receiving the second communication includes receiving the second communication via a second communication mode of the at least one electronic device different from the first communication mode;
receive a third communication associated with the transaction, the third communication being received from a second electronic device from the plurality of electronic devices, the third communication being displayable in the persistent record of the transaction on at least one of the host device or the at least one electronic device; and
receive a fourth communication from a third electronic device from the plurality of electronic devices, the fourth communication being unrelated to the transaction, the fourth communication being displayable in a record different from the persistent record of the transaction.

* * * * *